United States Patent
Masuda et al.

(10) Patent No.: US 10,053,044 B2
(45) Date of Patent: Aug. 21, 2018

(54) FAR-SIDE AIRBAG APPARATUS

(71) Applicant: TOYODA GOSEI CO., LTD., Kiyosu-shi, Aichi-ken (JP)

(72) Inventors: Yasushi Masuda, Kiyosu (JP); Shigeyuki Suzuki, Kiyosu (JP); Akira Endo, Kiyosu (JP); Yuji Matsuzaki, Kiyosu (JP); Takayuki Umeyama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/229,345

(22) Filed: Aug. 5, 2016

(65) Prior Publication Data
US 2017/0036636 A1    Feb. 9, 2017

(30) Foreign Application Priority Data

Aug. 7, 2015 (JP) ................................ 2015-157380
Jul. 14, 2016 (JP) ................................ 2016-139365

(51) Int. Cl.
*B60R 21/207* (2006.01)
*B60R 21/231* (2011.01)
(Continued)

(52) U.S. Cl.
CPC .......... *B60R 21/207* (2013.01); *B60R 21/233* (2013.01); *B60R 21/235* (2013.01);
(Continued)

(58) Field of Classification Search
CPC .............. B60R 2021/2078; B60R 2021/23153
See application file for complete search history.

(56) References Cited

U.S. PATENT DOCUMENTS 8,628,111 B2 * 1/2014 Sugimoto ............. B60R 21/207
                                                          280/729
9,505,369 B2 * 11/2016 Iida ..................... B60R 21/2338
(Continued)

FOREIGN PATENT DOCUMENTS

EP    1 586 489 A1    10/2005
EP    2 952 392 A1    12/2015
(Continued)

OTHER PUBLICATIONS

Extended European Search Report dated Dec. 19, 2016 issued in corresponding EP patent application No. 16183007.0.
(Continued)

*Primary Examiner* — Nicole T Verley
(74) *Attorney, Agent, or Firm* — Posz Law Group, PLC

(57) ABSTRACT

A far-side airbag apparatus includes: an airbag which is fixed via a fixed portion set in a rear end portion of the airbag, and protects an upper body of an occupant, who sits on a vehicle seat positioned apart from a side wall portion of a vehicle in which multiple vehicle seats are provided side by side in a width direction, by deploying and inflating the airbag diagonally forward and upward from the fixed portion between adjacent vehicle seats via inflating gas which is supplied from a gas generator according to a side impact applied to the side wall portion of the vehicle, wherein a rear lower portion of the airbag is formed as a support portion that has a high rigidity and supports an upper portion positioned higher than the rear lower portion of the airbag.

14 Claims, 29 Drawing Sheets

(51) Int. Cl.
　　　*B60R 21/2338* (2011.01)
　　　*B60R 21/235* (2006.01)
　　　*B60R 21/237* (2006.01)
　　　*B60R 21/264* (2006.01)
　　　*B60R 21/233* (2006.01)
　　　*B60R 21/2346* (2011.01)
　　　*B60R 21/00* (2006.01)

(52) U.S. Cl.
　　　CPC ........ *B60R 21/237* (2013.01); *B60R 21/2338* (2013.01); *B60R 21/2346* (2013.01); *B60R 21/23138* (2013.01); *B60R 21/264* (2013.01); *B60R 2021/0006* (2013.01); *B60R 2021/23146* (2013.01); *B60R 2021/23161* (2013.01); *B60R 2021/23324* (2013.01); *B60R 2021/23509* (2013.01)

(56) References Cited

U.S. PATENT DOCUMENTS

| | | |
|---|---|---|
| 2005/0236819 A1 | 10/2005 | Riedel et al. |
| 2006/0043702 A1 | 3/2006 | Jamison |
| 2006/0131847 A1 | 6/2006 | Sato et al. |
| 2009/0302584 A1* | 12/2009 | Sugimoto ............. B60R 21/207 280/730.1 |
| 2013/0221640 A1 | 8/2013 | Gwon et al. |
| 2016/0159306 A1* | 6/2016 | Fujiwara ............. B60R 21/207 280/728.2 |
| 2016/0214558 A1* | 7/2016 | Koelsch ............. B60R 21/2342 |
| 2017/0008437 A1* | 1/2017 | Tanabe ............. B60N 2/68 |
| 2017/0036635 A1* | 2/2017 | Tanabe ............. B60R 21/207 |

FOREIGN PATENT DOCUMENTS

| | | | | |
|---|---|---|---|---|
| EP | 2979933 A1 | 2/2016 | | |
| EP | 3 012 158 A1 | 4/2016 | | |
| EP | 3072751 A1 | 9/2016 | | |
| JP | 2005-306377 A | 11/2005 | | |
| JP | 2008-037280 A | 2/2008 | | |
| JP | 2014-054956 A | 3/2014 | | |
| KR | 20150024411 A | * | 3/2015 | ........... B60R 21/207 |
| WO | 2006/049093 A1 | 5/2006 | | |
| WO | 2013/008999 A1 | 1/2013 | | |
| WO | 2013/159916 A1 | 10/2013 | | |
| WO | 2013/183130 A1 | 12/2013 | | |
| WO | 2014/098027 A1 | 6/2014 | | |
| WO | 2015/075984 A1 | 5/2015 | | |

OTHER PUBLICATIONS

"Side Air Bag System", Research Disclosure, Mason Publications, Hampshire, GB, No. 439, Nov. 1, 2000, p. 1896.

Extended EP Search Report dated Dec. 12, 2017 issued in corresponding EP patent application No. 16183007.0.

Office Action dated Jun. 7, 2018 issued in the corresponding EP patent application No. 16183007.0.

* cited by examiner

FAR-SIDE AIRBAG APPARATUS

CROSS-REFERENCE TO RELATED APPLICATION(S)

This application is based upon and claims the benefit of priority from Japanese Patent Application No. 2016-139365, filed on Jul. 14, 2016, and Japanese Patent Application No. 2015-157380, filed on Aug. 7, 2015, the entire contents of which are incorporated herein by reference.

BACKGROUND

1. Field of the Invention

The present invention relates to a far-side airbag apparatus that protects an occupant sitting on a vehicle seat apart from a side wall by deploying and inflating an airbag between adjacent vehicle seats in a case where a side impact is applied to the side wall portion of a vehicle such as a car.

2. Description of the Related Art

A far-side airbag apparatus may be mounted in a car in which multiple car seats are provided side by side in a car width direction. This type of airbag apparatus includes an airbag and a gas generator disposed inside the airbag. The airbag and the gas generator are assembled into a side portion of a seatback of a car seat, which is close to an adjacent car seat.

In a case where a side impact is applied to a side wall portion such as a side door of the car due to side collision or the like, inflating gas is ejected from the gas generator. The airbag is deployed and inflated between the car seat and the adjacent car seat due to the inflating gas. The upper body of an occupant, who sits on the car seat apart from the side wall portion to which the impact is applied, falls toward the side wall portion, is encountered by the airbag, and is protected from impact.

JP-A-2008-37280 discloses one form of the far-side airbag apparatus. The airbag of the far-side airbag apparatus includes a pair of fabric portions which are disposed in the car width direction. A partition portion is provided in the airbag, and partitions the airbag into multiple portions. Partition portions are formed such that both of the fabric portions are joined together by stitching both of the fabric portions while being in contact with each other. The partition portion restricts the inflation thickness of the airbag in the car width direction.

In the far-side airbag apparatus disclosed in JP-A-2008-37280, the partition portion extends close to a rear end portion of the airbag. A portion between a rear end portion of the partition portion and the rear end portion of the airbag does not have sufficiently high rigidity.

For this reason, when the airbag encounters the occupant who falls toward the side wall portion to which the impact is applied, a forward force is applied to the airbag, and a low rigidity portion of the airbag is folded due to the force. As a result, an effect of receiving the upper body of the occupant decreases, which is a problem.

SUMMARY

The present invention is made in light of such situations, and an object of the present invention is to provide a far-side airbag apparatus capable of appropriately receiving an occupant who falls sideward due to impact, and of improving performance of protecting the occupant from impact.

According to an aspect of the invention, there is provided a far-side airbag apparatus including: an airbag which is fixed via a fixed portion set in a rear end portion of the airbag, and protects an upper body of an occupant, who sits on a vehicle seat positioned apart from a side wall portion of a vehicle in which multiple vehicle seats are provided side by side in a width direction, by deploying and inflating the airbag diagonally forward and upward from the fixed portion between adjacent vehicle seats via inflating gas which is supplied from a gas generator according to a side impact applied to the side wall portion of the vehicle, wherein a rear lower portion of the airbag is formed as a support portion that has a high rigidity and supports an upper portion positioned higher than the rear lower portion of the airbag.

In this configuration, in a case where a side impact is applied to a side wall portion of the vehicle due to side collision or the like, an upper body of an occupant, who sits on a vehicle seat positioned apart from the side wall portion to which impact is applied, falls toward the side wall portion to which impact is applied.

In the far-side airbag apparatus, inflating gas is generated by the gas generator according to the side impact, and the inflating gas is supplied to the airbag. The airbag, which is fixed to the vehicle via the fixed portion of the rear end portion, is deployed and inflated diagonally forward and upward from the fixed portion between adjacent vehicle seats.

The airbag encounters the upper body of the occupant who falls toward the side wall portion to which impact is applied. At this time, a forward force is applied to the airbag. The support portion, which supports the upper portion positioned higher than the rear lower portion of the airbag, has a high rigidity. For this reason, the airbag is unlikely to be bent at the support portion. The state of a majority of the airbag, which has been deployed and inflated next to the upper body of the occupant, is maintained, and the airbag reliably encounters the upper body.

In the far-side airbag apparatus, as thickness restriction portions which restrict the inflation thickness of the airbag, multiple partition portions may be provided in the upper portion of the airbag, extend in a vertical direction, and partition the upper portion into multiple regions in a forward and rearward direction; the multiple partition portions may be provided in each of a front region and a rear region which are respectively positioned in front of and in back of a central portion of the upper portion in the forward and rearward direction; a lower end portion of the partition portion in the front region may be positioned at the same height as that of a lower end portion of the partition portion in the rear region, or at a location lower than the lower end portion; and rigidity of the support portion may be increased by not providing a partition portion in the support portion.

In this configuration, since the partition portions are provided, the inflation thickness of the airbag is restricted in the vicinity of the partition portions, and accordingly, rigidity of the vicinities of the partition portions decreases. In contrast, restriction to the inflation thickness of the airbag is unlikely to occur at locations positioned apart from the partition portions, and rigidity at the locations is high.

For this reason, a partition portion is not provided in the support portion of the airbag. The support portion of the airbag in which a partition portion is not provided has a higher rigidity in contrast to a case in which the partition portion is provided. For this reason, the airbag is unlikely to be bent at the support portion having a high rigidity.

As described above, the airbag has a smaller inflation thickness in the car width direction at locations at which the partition portions are provided, in contrast to other locations, and accordingly, rigidity at the locations is low. In a case where partition portions which extend in a vertical direction are provided at multiple locations, not only the vicinity of each of the partition portions but also a location between respective lower end portions of the adjacent partition portions have a small inflation thickness. For this reason, if the airbag is bent, bending is likely to occur at the location having a small inflation thickness between the respective lower end portions of the adjacent partition portions.

A lower end portion of the partition portion in the front region and a lower end portion of the partition portion in the rear region are located at positions meeting the above. For this reason, the upper portion of the airbag, which is positioned higher than a straight line which connects the lower end portion of the partition portion in the front region to the lower end portion of the partition portion in the rear region, is bent to a lower side which is close to an occupant, or is bent rearward and downward with respect to the straight line.

Accordingly, even if the airbag is bent, a majority of the airbag is positioned next to the occupant, and the airbag encounters the occupant who falls sideward due to impact.

In the far-side airbag apparatus, as thickness restriction portions which restrict the inflation thickness of the airbag, multiple partition portions may be provided in the upper portion of the airbag at three locations which are positioned apart from each other in a forward and rearward direction, extend in a vertical direction, and partition the upper portion into multiple regions in the forward and rearward direction; a lower end portion of a partition portion at a foremost position may be positioned at the same height as that of a lower end portion of a partition portion at a rearmost position, or at a location lower than the lower end portion; a lower end portion of a partition portion, which is positioned in a middle portion in the forward and rearward direction, is positioned on a straight line which connects the lower end portion of the partition portion at the foremost position to the lower end portion of the partition portion at the rearmost position, or may be positioned higher than the straight line; and rigidity of the support portion may be increased by not providing a partition portion in the support portion.

In this configuration, a partition portion is not provided in the support portion of the airbag. The support portion of the airbag in which a partition portion is not provided has a higher rigidity in contrast to a case in which the partition portion is provided and the inflation thickness of the airbag is restricted. For this reason, the airbag is unlikely to be bent at the support portion having a high rigidity.

If the airbag is bent, bending is likely to occur at the location having a small inflation thickness between the respective lower end portions of the adjacent partition portions.

Since multiple partition portions, which are provided at three locations which are positioned apart from each other in a forward and rearward direction, are located at positions meeting the above, a lower end portion of a partition portion at a foremost position is positioned at the same height as that of a lower end portion of a partition portion at a rearmost position, or at a location lower than the lower end portion. A lower end portion of a partition portion, which is positioned in a middle portion in the forward and rearward direction, is positioned on a straight line which connects the lower end portion of the partition portion at the foremost position to the lower end portion of the partition portion at the rearmost position, or is positioned higher than the straight line. For this reason, the upper portion of the airbag positioned higher than the straight line is bent to a lower side which is close to an occupant or is bent rearward and downward with respect to the straight line.

Accordingly, even if the airbag is bent, a majority of the airbag is positioned next to the occupant, and the airbag encounters the occupant who falls sideward due to impact.

In the far-side airbag apparatus, tensile force may be generated due to the airbag becoming rigid when being deployed and inflated, and a pulling member which pulls the airbag rearward may be not provided.

If a pulling member such as a strap is provided, tensile force is generated due to the pulling member becoming rigid when the airbag is deployed and inflated. Due to the tensile force, the airbag is pulled rearward, and bending of the airbag is prevented. In contrast, the entire structure of the far-side airbag apparatus becomes complicated due to addition of pulling means.

In a case where the form of the airbag is changed to a compact accommodated form in which the airbag is suitably accommodated in the vehicle when being fixed to the vehicle, the form of the pulling member is also changed. When the form of the airbag is changed to an accommodated form, the size of the airbag increases due to addition of the pulling member.

In this configuration, it is possible to prevent the airbag from being bent forward without using a pulling member. For this reason, the structure of the far-side airbag apparatus becomes simpler in contrast to a case in which a pulling member is used.

Since a pulling member is not provided, when the form of the airbag is changed to an accommodated form, the airbag becomes more compact in contrast to a case where the pulling member is added, and the airbag can be easily accommodated.

In the far-side airbag apparatus, the airbag may include a pair of fabric portion which are disposed in the vehicle width direction; and the partition portions may be formed integrally with both of the fabric portions, and both of the fabric portions may be joined together while being in contact with each other.

It is also possible to partition the upper portion of the airbag into front and rear sections by providing a fabric piece (tether fabric) across a gap between a pair of partition portions as a partition portion.

In a case where the form of the airbag is changed to a compact accommodated form in which the airbag is suitably accommodated in the vehicle when being fixed to the vehicle, the form of the partition portion which is the fabric piece (tether fabric) is changed. When the form of the airbag is changed to an accommodated form, the size of the airbag increases due to use of the fabric piece (tether fabric) as a partition portion.

In this configuration, the partition portions are formed integrally with both of the fabric portions, and both of the fabric portions are joined together while being in contact with each other. Since a fabric piece (tether fabric) as a partition portion is not used, when the form of the airbag is changed into an accommodated form, the airbag becomes more compact in contrast to a case where the fabric piece (tether fabric) is used, and the airbag can be easily accommodated.

In the far-side airbag apparatus, the fixed portion of the airbag may be attached to the vehicle together with the gas generator; an inner tube may be disposed inside the airbag, extend in a vertical direction in a state where the inner tube surrounds at least a gas ejection portion of the gas generator; openings may be formed with the inner tube in a plurality portions located at the vertical direction; and rigidity of the support portion may be increased by extending at least one end portion of the upper end portion and the lower end portion of the inner tube to an outer circumferential portion of the airbag, and joining the one end portion to the outer circumferential portion.

In this configuration, in a case where inflating gas is ejected from the gas generator, the inner tube is inflated into a cylindrical shape. The inflating gas is distributed to flow upward and downward along a wall surface of the inner tube. The upward distributed inflating gas flows to the airbag from the opening of the upper end portion of the inner tube. The downward distributed inflating gas flows to the airbag from the opening of the lower end portion of the inner tube. The airbag, to which inflating gas has been supplied from the respective openings of both of the upper and lower end portions of the inner tube, is deployed and inflated diagonally forward and upward from the fixed portion of the rear end portion of the airbag between adjacent vehicle seats.

The airbag encounters an upper body of an occupant who falls toward the side wall portion to which impact is applied. At this time, a forward force is applied to the airbag. The airbag is attached to the vehicle together with the gas generator via the fixed portion of the rear end portion of the airbag, and a portion of the support portion of the airbag in the vicinity of the fixed portion has a high rigidity.

Since the inner tube is inflated into a cylindrical shape by inflating gas, the inner tube has a high rigidity. Accordingly, rigidity of the support portion of the airbag, which is a location in the vicinity of the inner tube, increases.

Since at least one end portion of the upper end portion and the lower end portion of the inner tube extends to an outer circumferential portion of the airbag, and is joined to the outer circumferential portion, rigidity of the support portion increases.

For this reason, the airbag is unlikely to be bent at the support portion having a high rigidity. The state of a majority of the airbag, which has been deployed and inflated next to the upper body of the occupant, is maintained, and the airbag encounters the upper body.

In the far-side airbag apparatus, the gas generator may be disposed at a location that is biased upward or downward from a central portion of the inner tube in the vertical direction; and rigidity of the support portion may be increased by extending an end portion, which is positioned apart from the gas generator between the upper end portion and the lower end portion of the inner tube, to the outer circumferential portion of the airbag, and joining the end portion to the outer circumferential portion.

In this configuration, in a case where the gas generator is disposed at a location that is biased upward or downward from a central portion of the inner tube in the vertical direction, an effect of increasing the rigidity of the support portion via the fixed portion of the airbag decreases as the distance of the support portion from the fixed portion in the vertical direction becomes larger.

An end portion, which is positioned apart from the gas generator between the upper end portion and the lower end portion of the inner tube, extends to the outer circumferential portion of the airbag, and is joined to the outer circumferential portion, serves to increase rigidity of the support portion. For this reason, a location of the support portion of the airbag, which is spaced away from the gas generator in the vertical direction, has a high rigidity, and the airbag is unlikely to be bent at the location of the support portion.

In the far-side airbag apparatus, an inner tube, which becomes slimmer from one end portion toward the other end portion of the inner tube in the vertical direction, may be used as the inner tube, and only a slim end portion may be joined to the outer circumferential portion of the airbag.

In this configuration, in a case where an inner tube, which becomes slimmer from one end portion toward the other end portion of the inner tube, is used as the inner tube, when the inner tube is inflated into a cylindrical shape by inflating gas, a slim end portion has rigidity higher than that of a thick end portion.

As described above, rigidity of the support portion of the airbag, which is a location in the vicinity of the inner tube, is increased by the inner tube. An increase in the rigidity of the vicinity of the thick end portion of the inner tube is large, and an increase in the rigidity of the vicinity of the slim end portion is small.

Accordingly, if the thick end portion of the inner tube is joined to the outer circumferential portion of the airbag, rigidity of the support portion is considerably changed in the vertical direction. Between the upper and lower end portions of the support portion, rigidity of an end portion, to which the thick end portion of the inner tube is joined, increases, and rigidity of an opposite end portion decreases.

More specifically, between the upper and lower end portions of the support portion, rigidity of an end portion, to which the thick end portion of the inner tube is joined, is increased primarily by a high rigidity of the inner tube, and by joining the end portion to the inner tube. As a result, the rigidity of the end portion of the support portion increases.

In contrast, between the upper and lower end portions of the support portion, rigidity of an end portion, to which the inner tube is not joined, is increased primarily only by a low rigidity of the inner tube. As a result, the rigidity of the end portion of the support portion decreases.

As such, rigidity of the support portion is considerably changed in the vertical direction.

In contrast, in a case where the slim end portion of the inner tube is joined to the outer circumferential portion of the airbag, a change in the rigidity of the support portion in the vertical direction is small.

More specifically, between the upper and lower end portions of the support portion, rigidity of an end portion, to which the slim end portion of the inner tube is joined, is increased primarily by a low rigidity of the inner tube, and by joining the end portion to the inner tube. In contrast, between the upper and lower end portions of the support portion, rigidity of an end portion, to which the inner tube is not joined, is increased primarily by a high rigidity of the inner tube. As such, a change in the rigidity of the support portion in the vertical direction is small.

In the far-side airbag apparatus, the vehicle may be provided with an attaching portion to which the gas generator is attached together with the fixed portion of the airbag; an additional attaching portion may be provided on at least one of an upper side and a lower side of the attaching portion, and a portion of the airbag may be attached to the additional attaching portion; and rigidity of the support portion may be increased by the attaching portion and the additional attaching portion.

In this configuration, in a case where inflating gas is ejected from the gas generator, and is supplied to the airbag, the airbag is deployed and inflated diagonally forward and upward from the fixed portion of the rear end portion of the airbag between adjacent vehicle seats.

The airbag encounters an upper body of an occupant who falls toward a side wall portion to which impact is applied. At this time, a forward force is applied to the airbag. The airbag is attached to the attaching portion of the vehicle together with the gas generator via the fixed portion of the rear end portion of the airbag. In addition, a portion of the fixed portion of the airbag is attached to the additional attaching portion which is provided on at least one of the upper side and the lower side of the attaching portion. The attaching portion and the additional attaching portion serve to increase rigidity of the support portion of the rear lower portion of the airbag.

For this reason, the airbag is unlikely to be bent at the support portion having a high rigidity. The state of a majority of the airbag, which has been deployed and inflated next to the upper body of the occupant, is maintained, and the airbag encounters the upper body.

In the far-side airbag apparatus, the gas generator may include an inflator that ejects inflating gas; the gas generator may be attached to the attaching portion in a state where the inflator is biased toward one of an upper side and a lower side from a central portion of a rear end portion of the airbag in the vertical direction; and the additional attaching portion may be provided on only one side of an upper side and a lower side of the attaching portion to which the inflator is not biased.

In this configuration, in a case where the inflator of the gas generator is disposed at a location that is biased upward or downward from a central portion of the rear end portion of the airbag in the vertical direction, the attaching portion, to which the gas generator has been attached, is disposed at a location of the rear end portion of the airbag which is biased in the same direction as a direction in which the inflator is biased. In a case where a portion of the fixed portion of the airbag is attached to the attaching portion together with the gas generator, rigidity of a portion of the support portion of the airbag in the vicinity of the attaching portion increases.

An effect of increasing the rigidity of the support portion of the airbag via the attaching portion decreases as the vertical distance of the support portion from the attaching portion becomes larger in the direction in which the inflator is not biased.

The additional attaching portion is provided on only the one side of the upper and lower sides of the attaching portion, to which the inflator is not biased, and thus, the additional attaching portion serves to increase rigidity of the support portion. In a case where a portion of the airbag is attached to the additional attaching portion, rigidity at a location of the support portion of the rear lower portion of the airbag in the vicinity of the additional attaching portion increases. Rigidity of the support portion equally increases over the entire vertical length of the support portion, and the airbag is unlikely to be bent at the support portion.

In the far-side airbag apparatus, the gas generator may be attached to the attaching portion and the additional attaching portion with a fixing member that extends toward a rear side of the vehicle.

In this configuration, a forward force is applied to the airbag that encounters an upper body of an occupant who falls toward a side wall portion to which impact is applied. This force is transmitted to the attaching portion and the additional attaching portion via the gas generator and fixing members.

All of the fixing members extend rearward from the gas generator. An extension direction of the fixing members is opposite to a direction in which this force is applied (direction in which resistance against this force is applied). For this reason, a forward force applied to the airbag is more firmly encountered by the attaching portion and the additional attaching portion in contrast to a case in which the gas generator is attached with fixing members which extend in another direction. As a result, rigidity of the support portion of the airbag increases effectively.

In the far-side airbag apparatus, as thickness restriction portions which restrict the inflation thickness of the airbag, one or multiple partition portions may be provided in the upper portion of the airbag such that the one or the multiple partition portions extend in the vertical direction and partition the upper portion into front and rear inflated portions, and an upper communication path may be provided between an upper end portion of the partition portion and a front upper end portion of the airbag such that the inflated portions adjacent to each other via the partition portion communicate with each other via the upper communication path.

In the airbag, of which the upper portion is partitioned into the front and rear inflated portions by the partition portion, inflating gas from the gas generator flows forward and upward inside the inflated portions. If the upper end portion of the partition portion is connected to the front upper end portion of the airbag, when the inflating gas, which flows forward and upward inside the inflated portions, reaches front end portions of the inflated portions, the inflating gas is not capable of flowing in the same direction, and the flow direction is reversed. The reason for this is that the front end portions of the inflated portions are blocked. The inflating gas, of which the direction has been changed, flows rearward and downward along the partition portion inside the inflated portions, and then flows into the adjacent inflated portions. When the deployment and inflation of the airbag is complete, a difference in inner pressure between multiple inflated portions occurs. Inflated portions having a low inner pressure may be pulled toward inflated portions having a high inner pressure, and the airbag may vibrate, which is a problem.

In the aforementioned configuration in which the upper communication path is provided between the upper end portion of the partition portion and the front upper end portion of the airbag, the inflated portions adjacent to each other via the partition portion communicate with each other on the upper side of the partition portion. For this reason, inflating gas, which has reached the front end portions of the inflated portions, is capable of flowing into the adjacent inflated portions by flowing through the upper communication path without changing the flow direction to a rearward and downward direction.

As a result, when the deployment and inflation of the airbag is complete, a difference in inner pressure between the inflated portions is unlikely to occur, and the airbag is unlikely to vibrate.

In the far-side airbag apparatus, a lower communication path may be provided in the airbag at a location adjacent to a lower side in a lower end portion of the partition portion such that the inflated portions adjacent to each other via the partition portion communicate with each other via the lower communication path.

In the aforementioned configuration in which the lower communication path is provided at a location adjacent to the lower side in the lower end portion of the partition portion, the inflated portions adjacent to each other via the partition portion communicate with each other on the lower side of the partition portion in addition to the upper side of the partition portion. For this reason, inflating gas of the inflated portions is capable of flowing into the adjacent inflated portions by flowing through the lower communication path in addition to flowing through the upper communication path.

As a result, when the deployment and inflation of the airbag is complete, a difference in inner pressure between the adjacent inflated portions are more unlikely to occur, and the airbag is more unlikely to vibrate.

In the far-side airbag apparatus, the flow path area of each of the upper communication path and the lower communication path may be set to such a size that when the deployment and inflation of the airbag is complete, the inner pressures of the inflated portions adjacent to each other via the partition portion become equal.

Inflating gas is capable of flowing between the inflated portions, which are adjacent to each other via the partition portion, via the upper communication path and the lower communication path. The amount of inflating gas flowing through each of the upper communication path and the lower communication path, or the inner pressure of each of the inflated portions adjacent to each other via the partition portion is determined by the flow path areas thereof.

Since the flow path area of each of the upper communication path and the lower communication path is set to the size satisfying the aforementioned condition, when the deployment and inflation of the airbag is complete, the inner pressures of the inflated portions adjacent to each other via the partition portion are likely to be become equal, and the airbag is unlikely to vibrate.

In the far-side airbag apparatus, the partition portion may be provided at a location at which the volumes of the inflated portions adjacent to each other via the partition portion become equal.

In this configuration, since the partition portion is provided at the location satisfying the aforementioned condition, the volumes of the inflated portions adjacent to each other via the partition portion becomes equal. For this reason, when the deployment and inflation of the airbag is complete, a difference in inner pressure between the inflated portions are more unlikely to occur, and the airbag is more unlikely to vibrate.

In the far-side airbag apparatus, the airbag may be folded into an accommodated form in which the size of the airbag is smaller than that in a non-inflated but deployed state in which the airbag is deployed flat without being filled with inflating gas, and the folded airbag may be accommodated in a lower portion of a side portion of a seatback of a vehicle seat which is close to an adjacent vehicle seat, and may be fixed to the seatback via the fixed portion; and when the airbag is deployed and inflated, the support portion may be disposed next to a waist portion of an occupant sitting on the vehicle seat, and an upper end of the airbag may be disposed at a location higher than a head portion of the occupant.

In this configuration, the airbag is folded into an accommodated form, and the folded airbag is accommodated in a lower portion of a side portion of a seatback of a vehicle seat which is close to an adjacent vehicle seat. The airbag is fixed to the seatback via the fixed portion of the rear end portion of the airbag.

In a case where a side impact is applied to a side wall portion of the car due to side collision or the like, in the far-side airbag apparatus, inflating gas is generated by the gas generator, and the inflating gas is supplied to the airbag. The airbag is deployed and inflated diagonally forward and upward from the fixed portion between adjacent vehicle seats.

The support portion of the airbag, which has been deployed and inflated as described above, is positioned next to a waist portion of an occupant who sits on a vehicle seat, and an upper end of the airbag is positioned at a location higher than a head portion of the occupant.

The airbag encounters the occupant who falls toward the side wall portion to which impact is applied. At this time, a forward force is applied to the airbag. The support portion has a high rigidity. For this reason, the airbag is unlikely to be bent at the support portion, and a majority portion of the airbag is positioned next to the occupant, and the airbag encounters the occupant who falls sideward due to impact.

The far-side airbag apparatus suitably encounters an occupant who falls sideward due to impact, and thus, performance of protecting the occupant from impact can be improved.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 18A is a side view illustrating the airbag module with folding lines before the airbag is folded, and FIG. 18B is a sectional view taken along line 18b-18b in FIG. 18A;

DETAILED DESCRIPTION OF THE INVENTION

First Embodiment

Hereinafter, a first embodiment of a far-side airbag apparatus will be described with reference to FIGS. 1 to 6.

In the following description, a forward moving direction of a car is referred to as a front side, and a rearward moving direction is referred to as a rear side. A vertical direction represents a vertical direction of the car, and a rightward and leftward direction represent a width direction of the car (car width direction), and coincides with a rightward and leftward direction when the car travels forward. In order to define the car width direction, a position close to an occupant with reference to the occupant may be referred to as an "occupant side", and a position apart from the occupant with reference to the occupant may be referred to as a "non-occupant side". An occupant having the same build as a dummy for a collision test is assumed to sit in the car.

Figure 1:
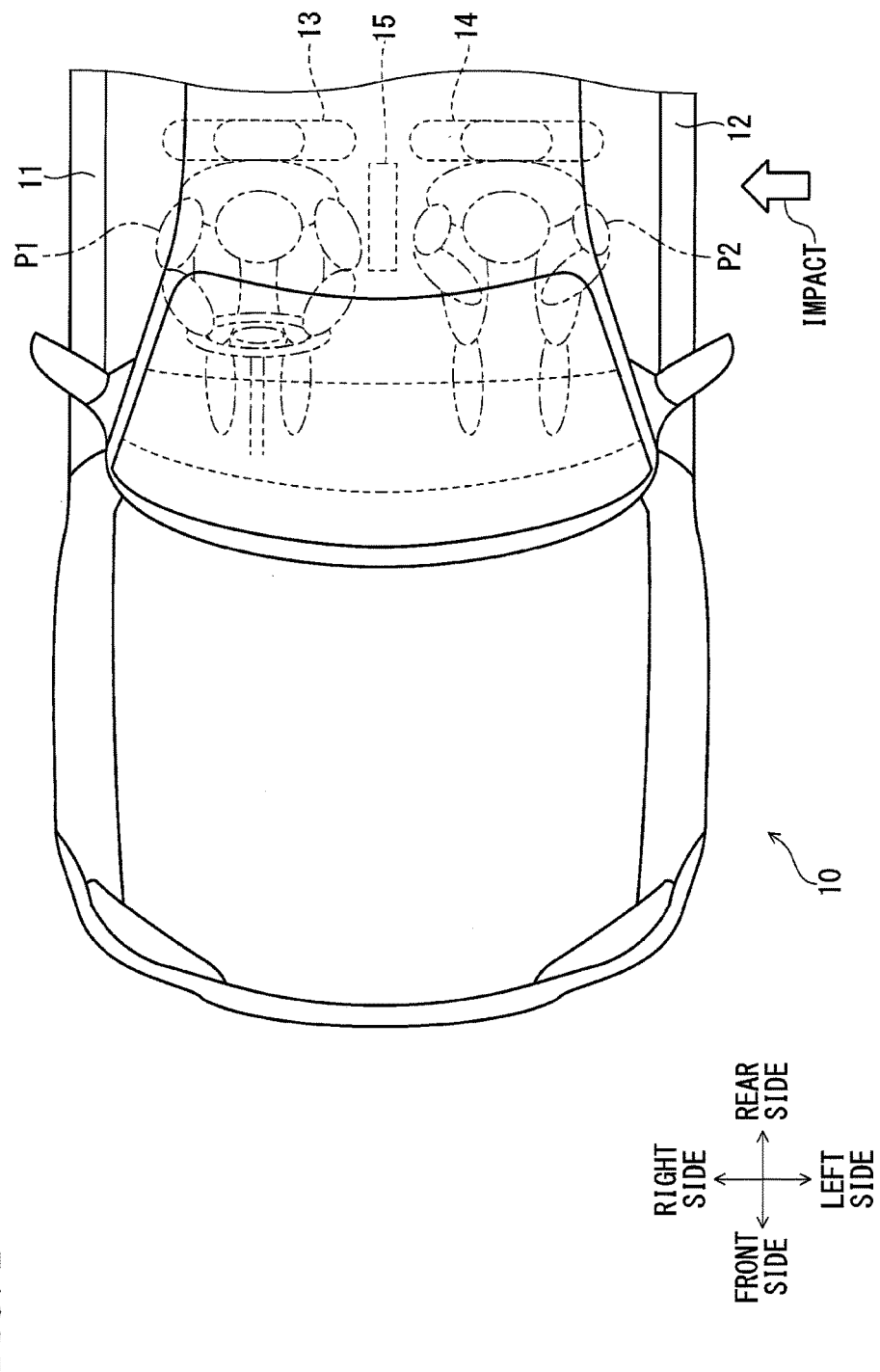
FIG. 1 is a view illustrating a first embodiment of a far-side airbag apparatus for a car, and is a partial top view of a car in which the airbag apparatus is mounted.

As illustrated in FIG. 1, both side portions of a car 10 as a vehicle in the car width direction are respectively formed as side wall portions 11 and 12, each of which is made up of a door, pillars, and the like. A pair of car seats 13 and 14 are disposed inside a compartment (car compartment) of car 10 in a state where the pair of car seats 13 and 14 are positioned side by side in the car width direction. The car seat 13 close to the side wall portion 11 serves as a driver's seat, and an occupant P1 sits on the car seat 13. The car seat 14 close to the side wall portion 12 serves as a co-driver's seat, and an occupant P2 sits on the car seat 14. A center console box 15 is disposed between both of the car seats 13 and 14 inside the car compartment. The car seat 13 has the same configuration as that of the car seat 14. For this reason, only the car seat 13 will be described, and description of the car seat 14 will be omitted. This point is the same for far-side airbag apparatuses which are respectively provided in the car seats 13 and 14.

Figure 2:
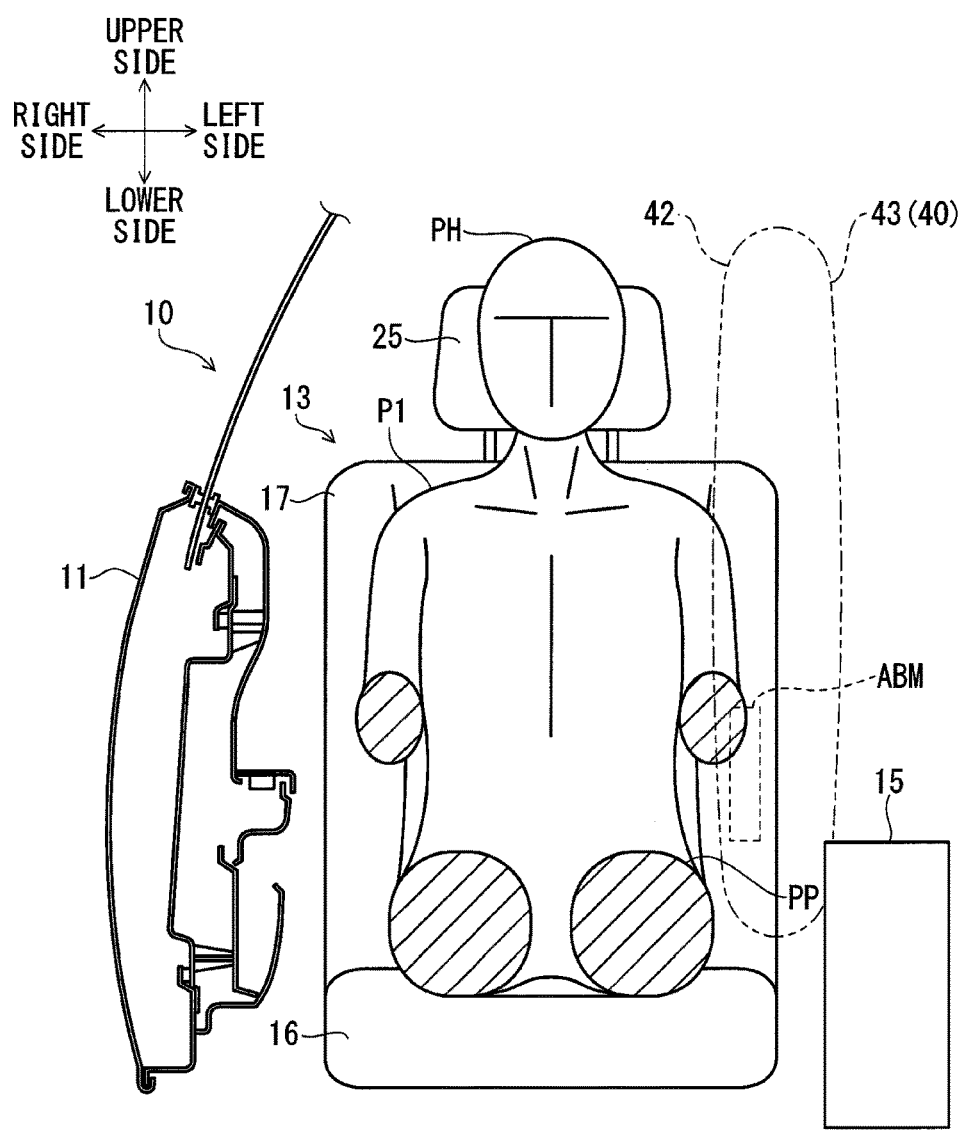
FIG. 2 is a front sectional view illustrating a positional relationship among a car seat, an airbag, an occupant, a center console box, and a side wall portion in the first embodiment viewed from a front side of the car.
Figure 4:
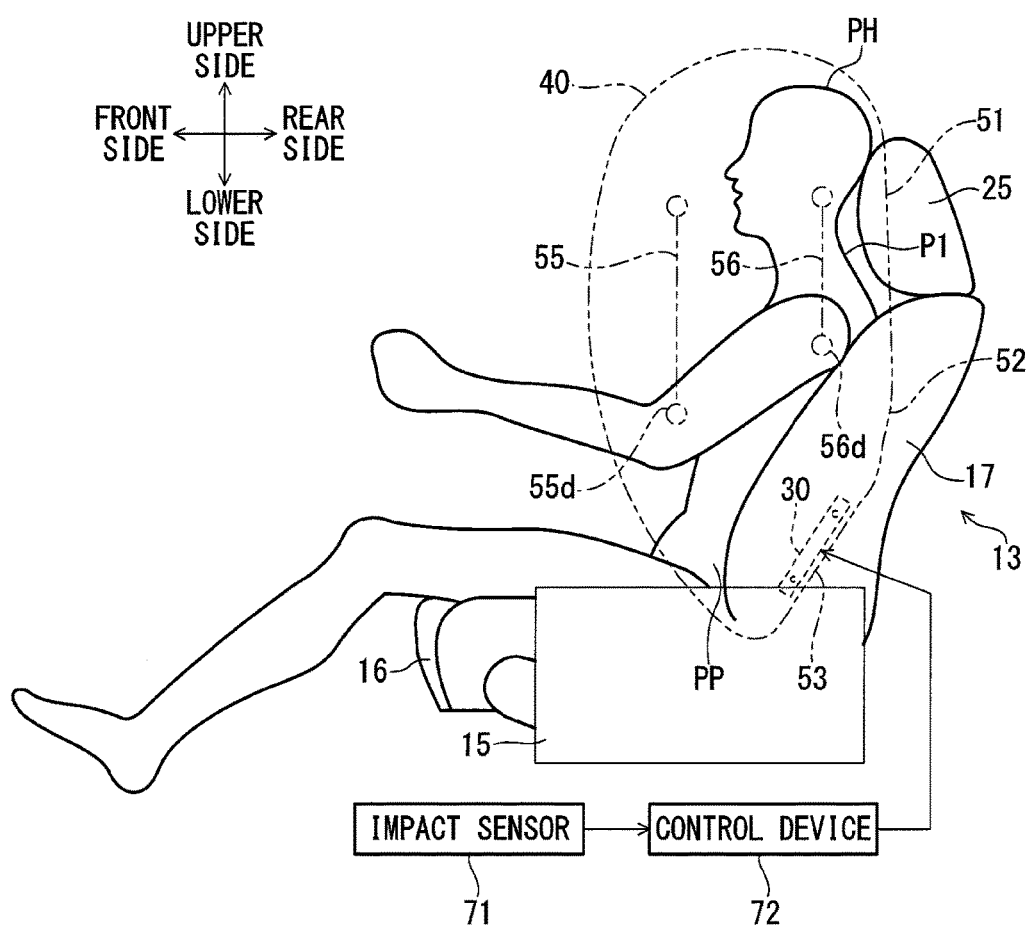
FIG. 4 is a side view illustrating the car seat in which the far-side airbag apparatus is provided; the occupant; and the center console box in the first embodiment.

As illustrated in FIGS. 2 and 4, the car seat 13 includes a seat cushion 16; a seatback 17 configured to be erected from a rear side of the seat cushion 16 and to be capable of adjusting an inclination angle; and a headrest 25 disposed above the seatback 17.

Hereinafter, the internal structure of a side portion of the seatback 17 of the car seat 13, which is close to the adjacent car seat 14, will be described.

Figure 3:
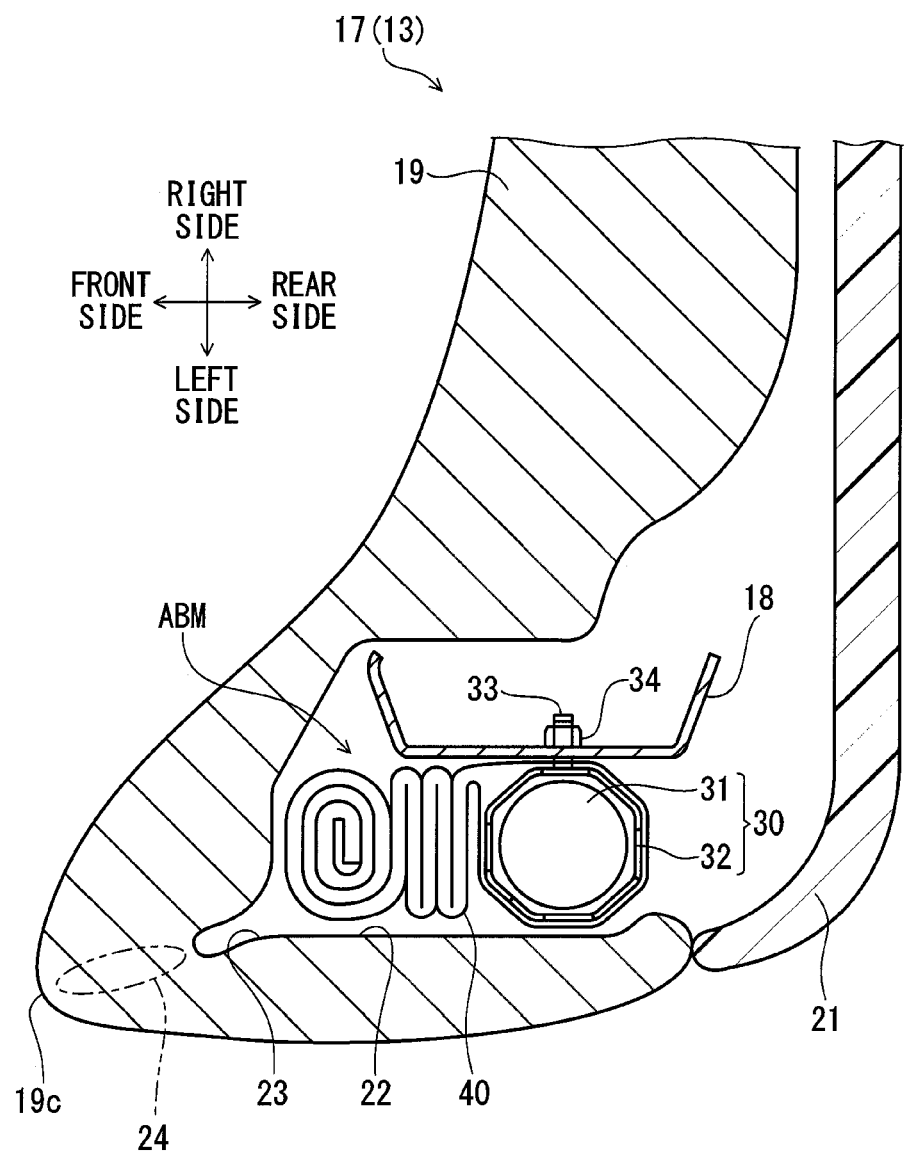
FIG. 3 is a partial top sectional view illustrating the internal structure of a side portion of a seatback into which an airbag module is assembled, in the first embodiment.

A seat frame is disposed inside the seatback 17, and forms the frame of the seatback 17. As illustrated in FIG. 3, a portion of the seat frame is disposed inside the side portion of the seatback 17 which is close to the car seat 14, and the portion (hereinafter, referred to as a "side frame portion 18") is formed by bending a metal plate. A seat pad 19 made of an elastic material such as urethane foam is disposed in front of the seat frame including the side frame portion 18. A hard backboard 21 made of synthetic resin or the like is disposed in back of the seat frame. The seat pad 19 is covered with a seat cover, and the seat cover is not illustrated in FIG. 3. This point is the same for FIG. 13 which will be illustrated later.

An accommodation portion 22 is provided in a region inside the seat pad 19, which is closer to the adjacent car seat 14 than the side frame portion 18. An airbag module ABM which is a main portion of the far-side airbag apparatus is assembled into the accommodation portion 22. The far-side airbag apparatus protects the occupant P1 sitting on the car seat 13 by supplying inflating gas to an airbag 40 and deploying and inflating the airbag 40 between the car seat 13 and the adjacent car seat 14 in a case where impact is applied from the outside to the side wall portion 12 apart from the car seat 13 due to side collision or the like.

A slit 23 extends diagonally forward from a corner of a front portion of the accommodation portion 22, which is located near the adjacent car seat 14, toward a direction approaching the car seat 14. A portion (portion surrounded by a frame illustrated by a two-dot chain line in FIG. 3) interposed between a front corner 19c of the seat pad 19, which is located near the adjacent car seat 14, and the slit 23 forms a tear-planned portion 24 that is to be torn by the airbag 40.

The airbag module ABM includes a gas generator 30 and the airbag 40 as main configuration members. Hereinafter, each of the configuration members will be described.

<Gas Generator 30>

The gas generator 30 includes an inflator 31, and a retainer 32 that covers the inflator 31. A so-called pyrotechnic inflator is adopted as the inflator 31. The inflator 31 has a substantially columnar shape, and a gas generating agent (not illustrated) to generate inflating gas is accommodated in the inflator 31. The inflator 31 includes a gas ejection portion (not illustrated) in an upper end portion of the inflator 31. A wireharness (not illustrated) for input of operation signals into the inflator 31 is connected to a lower end portion of the inflator 31.

Instead of a pyrotechnic inflator using the aforementioned gas generating agent, a hybrid type inflator may be used as the inflator 31 which ejects inflating gas by tearing a partition wall of a high-pressure gas cylinder, which is filled with high-pressure gas, using gunpowder or the like.

The retainer 32 serves as a diffuser that controls an ejection direction of inflating gas, and is a member that serves to tighten the inflator 31 and the airbag 40 to the side frame portion 18. A majority portion of the retainer 32 is formed into a substantially cylindrical shape by bending a plate such as a metal plate. Multiple (two in the embodiment) bolts 33 are fixed to the retainer 32 as fixing members that attach the retainer 32 to the side frame portion 18, and the multiple bolts 33 extend toward the occupant side. The gas generator 30 may be configured such that the inflator 31 is formed integrally with the retainer 32.

<Airbag 40>

As illustrated in FIG. 2, the airbag 40 includes a pair of fabric portions which are disposed in the car width direction. In order to distinguish one fabric portion from another fabric portion, a fabric portion positioned close to the occupant P1 is referred to as an "occupant side fabric portion 42", and a fabric portion positioned apart from the occupant P1 is referred to as an "non-occupant side fabric portion 43". In the first embodiment, the airbag 40 is woven into a bag shape such that the occupant side fabric portion 42 is formed integrally with the non-occupant side fabric portion 43.

As illustrated in FIG. 4, the occupant side fabric portion 42 and the non-occupant side fabric portion 43 are formed to have such a shape and size as to be capable of occupying a space next to the upper body of the occupant P1 which corresponds to the entire upper body, that is, a portion of the occupant P1 from a waist portion PP to a head portion PH, when the airbag 40 is deployed and inflated.

The installation position and height dimension of the airbag 40 is set such that, when the airbag 40 is deployed and inflated, a lower end of the airbag 40 is positioned lower than an upper end of the center console box 15 and an upper end of the airbag 40 is positioned higher than the head portion PH of the occupant P1.

Figure 5:
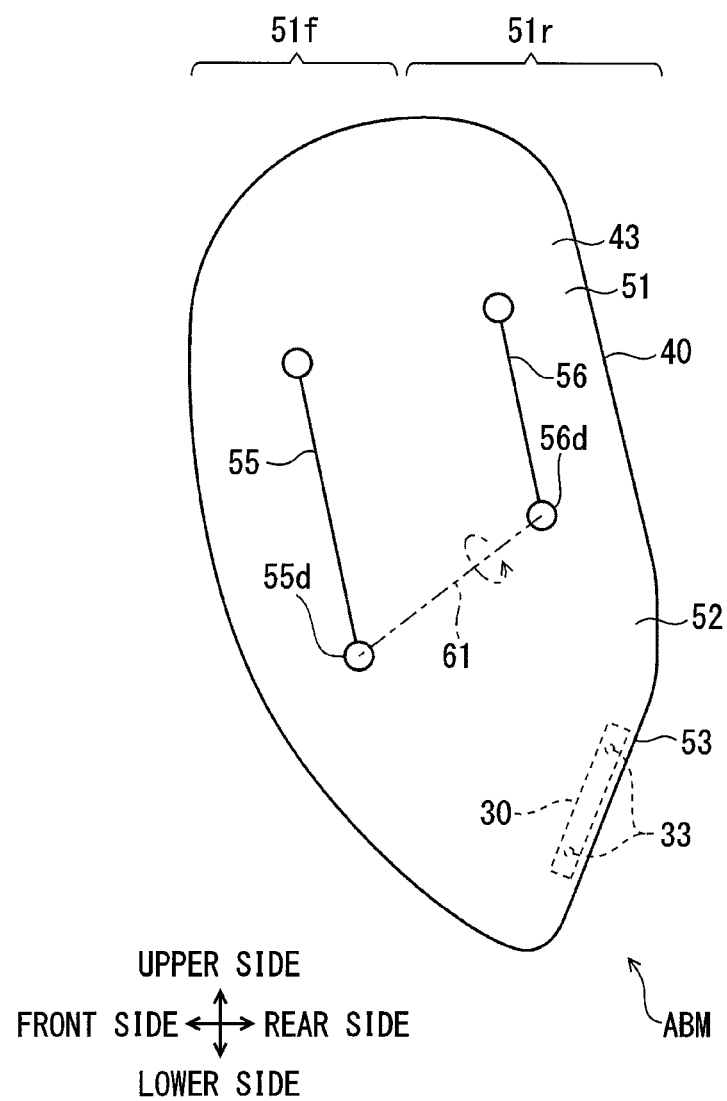
FIG. 5 is a side view of the airbag module in the first embodiment in which an airbag is not inflated, but is deployed.

FIG. 5 illustrates a state (non-inflated but deployed state) in which the airbag 40 of the airbag module ABM is deployed flat without being filled with inflating gas. As illustrated in FIG. 5, a rear lower portion of the airbag 40 is formed as a support portion 52 that has a high rigidity and supports an upper portion 51 positioned higher than the rear lower portion of the airbag 40.

More specifically, as thickness restriction portions which restrict an inflation thickness in the car width direction, partition portions 55 and 56 are provided in the upper portion 51 of the airbag 40 at two locations positioned apart from each other in a forward and rearward direction. The partition portions 55 and 56 extend in the vertical direction, and partition the upper portion 51 into front and rear sections.

The partition portion 55 is provided in a region 51*f* that is positioned in front of a central portion of the upper portion 51 in the forward and rearward direction. The partition portion 56 is provided in a rear region 51*r*. A lower end portion 55*d* of the front partition portion 55 and a lower end portion 56*d* of the rear partition portion 56 are formed into a circular shape. The front lower end portion 55*d* is positioned at a location lower than the rear lower end portion 56*d*.

The partition portions 55 and 56 are not provided in the support portion 52 which is the lower end portion of the airbag 40. Since the partition portions 55 and 56 are not provided, the inflation thickness of the support portion 52 in the car width direction is ensured, and rigidity of the support portion 52 increases.

In the process of weaving the airbag 40 into a bag shape, the partition portions 55 and 56 are respectively formed integrally with the occupant side fabric portion 42 and the non-occupant side fabric portion 43, and the occupant side fabric portion 42 and the non-occupant side fabric portion 43 are joined together while being in contact with each other.

As illustrated in FIG. 4, when the airbag 40 is deployed and inflated, a part of the support portion 52 is positioned next to the waist portion PP of the occupant P1, and an upper end of the upper portion 51 is positioned at a location higher than the head portion PH of the occupant P1. In other words, the support portion 52 is positioned beside a lower portion of the seatback 17. At least a portion of the support portion 52 is positioned next to the center console box 15. The upper end of the upper portion 51 is positioned at a location higher than an upper end of the headrest 25.

In the far-side airbag apparatus, tensile force is generated due to the airbag 40 becoming rigid when being deployed and inflated, and a pulling member (for example, strap) which pulls the airbag 40 rearward is not provided.

A fixed portion 53 is set in a rear end portion of the airbag 40. The gas generator 30 is postured to extend substantially in the vertical direction via the fixed portion 53, and the bolts 33 are inserted into the occupant side fabric portion 42, and thus, the gas generator 30 is positioned and locked with respect to the airbag 40.

As illustrated in FIG. 3, the airbag module ABM is collapsed into a compact form (hereinafter, referred to as an "accommodated form") by folding the airbag 40 (refer to FIG. 5) in a non-inflated but deployed state. This is to adjust the size of the airbag module ABM to a suitable size in which the airbag module ABM can be accommodated in the accommodation portion 22 having a limited size in the side portion of the seatback 17. For example, roll-folding and accordion-folding are methods suitable for use when the airbag 40 is folded. The roll-folding is a folding method in which other portions of the airbag 40 are wrapped around one end portion of the airbag 40. The accordion-folding is a folding method in which the airbag 40 is folded over itself by a predetermined width while the folding directions are alternated.

If a pulling member such as a strap is provided, in a case where the form of the airbag is changed to an accommodated form, the form of the pulling member is also changed. When the form of the airbag is changed to an accommodated form, the size of the airbag increases due to addition of the pulling member.

In contrast, in the first embodiment, as described above, since a pulling member is not added, when the form of the airbag is changed to an accommodated form, the airbag becomes more compact in contrast to a case where the pulling member is added, and the airbag can be easily accommodated.

In a case where a pulling member is provided as described above, the structure of the airbag module ABM becomes complicated due to addition of the pulling member. In contrast, in the first embodiment, since a pulling member is not used, the structure of the airbag module ABM becomes simpler in contrast to a case where the pulling member is used.

It is also possible to partition the upper portion 51 of the airbag 40 into front and rear sections by providing a fabric piece (tether fabric) across a gap between the occupant side fabric portion 42 and the non-occupant side fabric portion 43 of the airbag 40 as a partition portion.

In a case where the form of the airbag 40 is changed to an accommodated form, the form of the partition portion which is the fabric piece (tether fabric) is changed. When the form of the airbag 40 is changed to an accommodated form, the size of the airbag 40 increases due to use of the fabric piece (tether fabric) as a partition portion.

In the first embodiment, the airbag 40 including the partition portions 55 and 56 is woven into a bag shape. The partition portions 55 and 56 are respectively formed integrally with the occupant side fabric portion 42 and the non-occupant side fabric portion 43, and the occupant side fabric portion 42 and the non-occupant side fabric portion 43 are joined together while being in contact with each other. Since a fabric piece (tether fabric) as a partition portion is not used, when the form of the airbag 40 is changed into an accommodated form, the airbag 40 becomes more compact in contrast to a case where the fabric piece (tether fabric) is used, and the airbag 40 can be easily accommodated.

As illustrated in FIG. 3, the airbag module ABM including the airbag 40 in an accommodated form is accommodated in the accommodation portion 22 of a lower portion of the side portion (close to the adjacent car seat 14) of the seatback 17 of the car seat 13. The bolts 33, which have extended from the gas generator 30 and have been inserted into the fixed portion 53 of the occupant side fabric portion 42 of the airbag 40, are inserted into the side frame portion 18, and nuts 34 are tightened to the inserted bolts 33. Due to the tightening, the gas generator 30 is attached to the side frame portion 18, together with the fixed portion 53 of the airbag 40. As described above, the gas generator 30 is fixed to the side frame portion 18 of the airbag 40 with the bolts 33.

The gas generator 30 may be attached to the side frame portion 18 via a fixing member other than the bolts 33 and the nuts 34. The inflator 31 may be directly attached to the side frame portion 18 without using the retainer 32.

The far-side airbag apparatus includes an impact sensor 71 and a control device 72 illustrated in FIG. 4 in addition to the airbag module ABM. The impact sensor 71 is an acceleration sensor, is provided in the side wall portion 12 or the like, and detects a side impact applied to the side wall portion 12 or the like. The control device 72 controls the operation of the gas generator 30 (the inflator 31) based on detection signals from the impact sensor 71.

In addition, the car 10 is provided with a side airbag apparatus (also referred to as a near-side airbag apparatus) (not illustrated) that restrains the occupant P1 and protects the occupant P1 from impact by deploying and inflating an airbag between the side wall portion 11 and the car seat 13 in a case where a side impact is applied to the side wall portion 11 close to the car seat 13.

A seat belt apparatus (not illustrated) is provided in the car compartment, and restrains the occupant P1, who sits on the car seat 13, in the car seat 13.

Hereinafter, the operation of the aforementioned configuration in the first embodiment will be described.

In a case where the impact sensor 71 does not detect that a predetermined or higher side impact is applied to the side wall portion 12, the control device 72 does not output operation signals for operating the gas generator 30 (the inflator 31) to the gas generator 30, and inflating gas is not ejected. As shown in FIG. 3, the airbag 40 in an accommodated form is continuously accommodated in the accommodation portion 22.

As illustrated in FIG. 1, in a case where impact is applied to the side wall portion 12 due to side collision or the like, the upper body of the occupant P1, who sits apart from the side wall portion 12 to which the impact is applied, falls toward the side wall portion 12.

In a case where the impact sensor 71 detects that the predetermined or higher side impact is applied to the side wall portion 12, the control device 72 outputs operation signals for operating the gas generator 30 (the inflator 31) to the gas generator 30 based on detection signals. Inflating gas is ejected from the inflator 31 according to the operation signals, and is supplied to the airbag 40 in an accommodated form, and deployment and inflation of the airbag 40 is started.

During the deployment and inflation, the airbag 40 presses a portion of the seat pad 19 in the vicinity of the accommodation portion 22, and the tear-planned portion 24 (refer to FIG. 3) of the seat pad 19 is torn. The airbag 40 comes forward out of the accommodation portion 22 in a state where a portion (the fixed portion 53 and a portion in the vicinity of the fixed portion 53) of the airbag 40 remains inside the accommodation portion 22. The airbag 40 is deployed and inflated diagonally forward and upward from the fixed portion 53 between the adjacent car seats 13 and 14.

When deployment and inflation are complete, the airbag 40 is positioned between the occupants P1 and P2 who sit on the respective car seat 13 and the car seat 14.

A part of the support portion 52 of the airbag 40 is positioned next to the waist portion PP of the occupant P1, and the upper end of the airbag 40 is positioned at a location higher than the head portion PH of the occupant P1. The lower end of the airbag 40 is positioned between the occupant P1 sitting on the car seat 13 and the center console box 15 (refer to FIGS. 2 and 4).

The airbag 40 encounters the upper body of the occupant P1 who falls toward the side wall portion 12 to which impact is applied. At this time, a forward force is applied to the airbag 40 as a component of a side force applied to the airbag 40.

Figure 6:
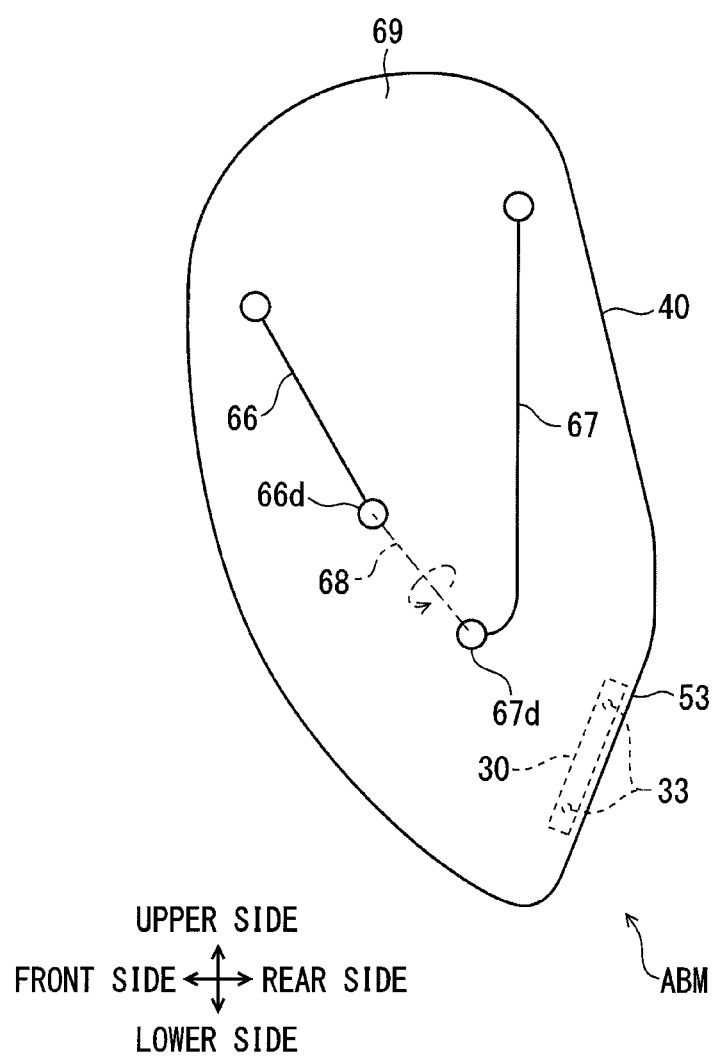
FIG. 6 is a side view of an airbag module in a comparative example in which an airbag is not inflated, but is deployed.

In a comparative example of the airbag 40, as illustrated in FIG. 6, a pair of front and rear partition portions 66 and 67 are provided.

The front partition portion 66 is inclined such that the rear side of the front partition portion 66 is lowered.

The rear partition portion 67 extends further downward from the front partition portion 66. A lower end portion 67d of the rear partition portion 67 is positioned at a location lower than a lower end portion 66d of the front partition portion 66. The lower end portion 67d of the rear partition portion 67 is proximate to the fixed portion 53 of the airbag 40 that is fixed to the side frame portion 18 together with the gas generator 30. A gap between the lower end portion 67d and the fixed portion 53 is narrow. A straight line 68 connects the lower end portion 66d of the front partition portion 66 to the lower end portion 67d of the rear partition portion 67. The straight line 68 is inclined such that the rear side of the straight line 68 is lowered.

The airbag 40 has a smaller (zero) inflation thickness in the car width direction at locations at which the partition portions 66 and 67 are provided, in contrast to other locations, and accordingly, rigidity at the locations is low. Similarly, the inflation thickness of the vicinity of each of the partition portions 66 and 67 is restricted, and thus, rigidity is low. Restriction to the inflation thickness of the airbag 40 in the car width direction is unlikely to occur at locations spaced a sufficient distance from the partition portions 66 and 67, and rigidity at the locations is high.

In the comparative example, the lower end portion 67d of the rear partition portion 67 is proximate to the fixed portion 53, and a region therebetween is small. This region has a small inflation thickness in the car width direction, and has a low rigidity.

The airbag 40 has a small inflation thickness in the car width direction not only in the vicinities of the partition portions 66 and 67, but also in the region between the respective lower end portions 66d and 67d of the partition portions 66 and 67. The region between the lower end portions 66d and 67d is a low rigidity.

For this reason, as described above, in a case where a forward force is applied to the airbag 40, as illustrated by a chain line, a region 69 positioned in back of the straight line 68 and the front partition portion 66 is bent forward around the straight line 68 and the partition portion 66 which are a pivot point, and moves away from the occupant P1. To that extent, the size of a portion of the airbag 40, which is positioned next to the occupant P1, decreases, and the effect of receiving the occupant P1 decreases, which is a problem.

In contrast, as illustrated in FIG. 5, in the first embodiment, in the rear lower portion of the airbag 40, the partition portions 55 and 56 are not provided in the support portion 52 that supports the upper portion 51 positioned higher than the rear lower portion, and the support portion 52 has a high rigidity. The reason for this is that the inflation thickness of the support portion 52 in the car width direction is not restricted by the partition portions 55 and 56 and is sufficiently large.

Further, the support portion 52 of the airbag 40 has an area larger than that in the comparative example. Because, the fixed portion 53 of the airbag 40 is disposed to incline such that the upper side of the fixed portion 53 is positioned close to the rear side. Further, the lower end portion 56d of the rear partition portion 56 is positioned at a location higher than the lower end portion 55d of the front partition portion 55. A straight line 61, which connects the lower end portion 55d to the lower end portion 56d, is inclined such that the rear side of the straight line 61 is raised. Accordingly, the reason for this is that both of the lower end portions 55d and 56d are positioned apart from the fixed portion 53. According to the above, since the support portion 52 has the large area, rigidity of the support portion 52 further increases.

For this reason, the airbag 40 is unlikely to be bent at the support portion 52. The state of a majority of the airbag 40, which has been deployed and inflated next to the upper body of the occupant P1, is maintained, and the airbag 40 reliably encounters the upper body.

In the first embodiment, in the upper portion 51 of the airbag 40, the partition portion 55 is provided in the front region 51f, and the partition portion 56 is provided in the rear region 51r. The lower end portion 55d of the front partition portion 55 is positioned at a location lower than the lower end portion 56d of the partition portion 56. The airbag 40 has a small inflation thickness in the car width direction not only in the partition portions 55 and 56, and in the vicinities of the partition portions 55 and 56, but also in a region between the respective lower end portions 55d and 56d of the partition portions 55 and 56. The region between both of the lower end portions 55d and 56d has a low rigidity.

For this reason, in a case where the airbag 40 is bent, as illustrated in a chain line in FIG. 5, a portion positioned higher than the straight line 61 (connecting the lower end portion 55d to the lower end portion 56d) is bent rearward and downward around the straight line 61 which is a pivot point, and approaches the occupant P1.

As a result, even though the airbag 40 is bent as described above, since a majority of the airbag 40 is positioned next to the occupant P1, the airbag 40 encounters the occupant P1 who falls sideward due to impact, and impact applied to the occupant P1 is reduced.

It is also possible to prevent bending of the airbag by providing a pulling member such as a strap. That is, in a case where a pulling member such as a strap is provided, tensile force is generated due to the airbag becoming rigid when being deployed and inflated. Due to the tensile force, the airbag is pulled rearward, and bending of the airbag is prevented. In contrast, in the first embodiment, as described above, bending of the airbag is prevented without using a pulling member.

A case in which a side impact is applied to the side wall portion 11 has not been described, but when the same operation is performed, the occupant P2 who sits on the car seat 14 is protected from impact.

In the first embodiment described above in detail, the following effects can be obtained.

(1) The rear lower portion of the airbag 40 is formed as the support portion 52 that has a high rigidity and supports the upper portion 51 positioned higher than the rear lower portion of the airbag 40 (refer to FIG. 5).

For this reason, it is possible to prevent bending of the airbag 40 via the support portion 52. It is possible to maintain the state of a majority of the airbag 40 which has been deployed and inflated next to the upper body of the occupant P1, and to reliably encounter the upper body via the airbag 40.

(2) The upper portion 51 of the airbag 40 is divided into the front region 51f and the rear region 51r which are respectively positioned in front of and in back of the central portion of the airbag 40 in the forward and rearward direction. The partition portions 55 and 56 which extend in the vertical direction are respectively provided in the front region 51f and the rear region 51r. The lower end portion 55d of the partition portion 55 in the front region 51f is positioned at a location lower than the lower end portion 56d of the partition portion 56 in the rear region 51r. Rigidity of the support portion 52 is increased by not providing the partition portions 55 and 56 (FIG. 5).

For this reason, it is possible to prevent bending of the airbag 40 via the support portion 52 having an increased rigidity.

Even though the airbag 40 is bent, the upper portion 51 positioned higher than the straight line 61 can be bent rearward and downward about the straight line 61 which is a pivot point. It is possible to position a majority portion of the airbag 40 next to the occupant P1, and to encounter the occupant P1, who falls sideward due to impact, via the airbag 40.

(3) Tensile force is generated due to the airbag 40 becoming rigid when being deployed and inflated, and thus, a pulling member (strap) which pulls the airbag 40 rearward is not provided.

For this reason, it is possible to further simplify the structure of the far-side airbag apparatus (the airbag module ABM) in contrast to a case in which a pulling member is provided. When the form of the airbag 40 is changed to an accommodated form, the airbag 40 becomes more compact, and can be easily accommodated (refer to FIG. 3).

(4) In manufacturing of the airbag 40, the partition portions 55 and 56 are respectively formed integrally with the occupant side fabric portion 42 and the non-occupant side fabric portion 43, and the occupant side fabric portion 42 and the non-occupant side fabric portion 43 are joined together via the partition portions 55 and 56 while being in contact with each other (FIGS. 2 and 5).

For this reason, when the form of the airbag 40 is changed to an accommodated form, the airbag 40 becomes more compact and the airbag 40 can be more easily accommodated, in contrast to a case in which a fabric piece (tether fabric) is used as a partition portion (FIG. 3).

Second Embodiment

Hereinafter, a second embodiment of the far-side airbag apparatus for a car will be described with reference to FIG. 7.

The point of difference of the second embodiment from the airbag 40 in the first embodiment is that one partition portion 57 is added to a central portion between both of the partition portions 55 and 56. The partition portion 57 extends in parallel with both the front partition portion 55 and the rear partition portion 56. A lower end portion 57d of the partition portion 57 is positioned on a straight line 62 that connects the lower end portion 55d of the front partition portion 55 to the lower end portion 56d of the rear partition portion 56.

The rest of the configuration is the same as that in the first embodiment. For this reason, the same reference signs are assigned to the same elements described in the first embodiment, and duplicated description will be omitted.

In the aforementioned configuration of the second embodiment, when the airbag 40 is deployed and inflated, the airbag 40 has a small inflation thickness in the car width direction not only in the partition portions 55, 57, and 56, and in the vicinities of the partition portions 55, 57, and 56, but also in a region between the lower end portions 55d and 57d and in a region between the lower end portions 57d and 56d. Accordingly, in the airbag 40, the region between the lower end portions 55d and 57d has a low rigidity, and the region between the lower end portions 57d and 56d has a low rigidity.

Figure 7:
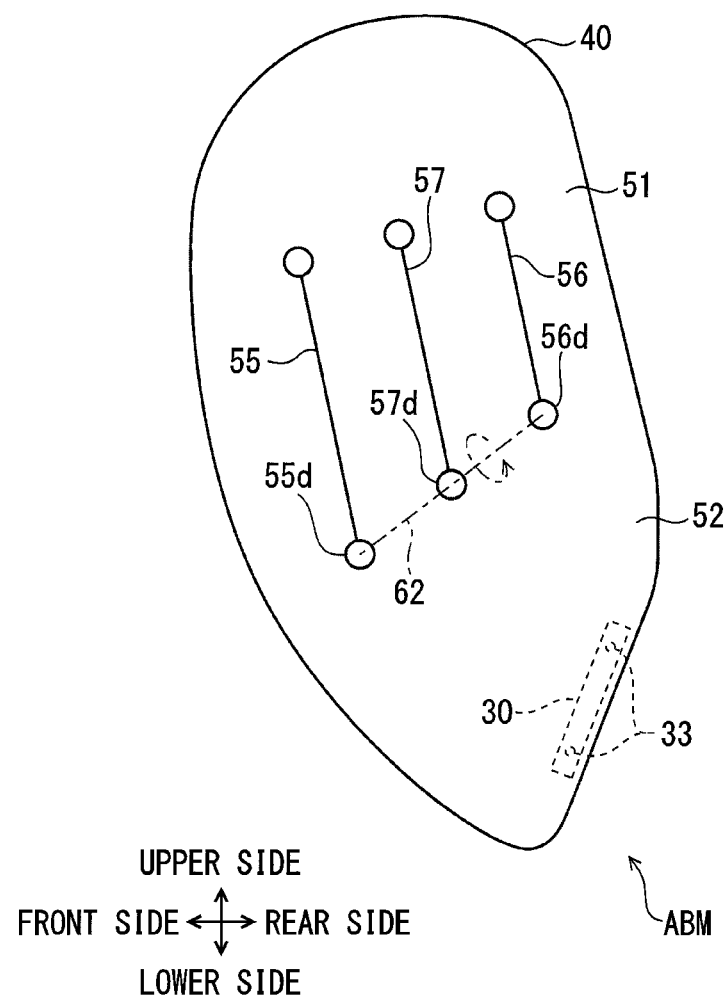
FIG. 7 is a view illustrating a second embodiment of a far-side airbag apparatus for a car, and is a side view corresponding to FIG. 5.

For this reason, in a case where the airbag 40 is bent, as illustrated in a chain line in FIG. 7, the upper portion 51 positioned higher than the straight line 62 (connecting together the lower end portions 55d, 57d, and 56d) is bent rearward and downward around the straight line 62 which is a pivot point, and approaches the occupant P1.

Since a majority portion of the airbag 40 is positioned next to the occupant P1, the airbag 40 encounters the occupant P1 who falls sideward due to impact, and impact applied to the occupant P1 is reduced.

As a result, in the second embodiment, in addition to being capable of obtaining the same effects described in (1), (3), and (4), the following effect can be obtained instead of the effect described in (2).

(5) Three partition portions 55, 57, and 56 are provided in the upper portion 51 of the airbag 40 while being spaced apart from each other in the forward and rearward direction. The lower end portion 55d of the partition portion 55 at a foremost position is positioned at a location lower than the lower end portion 56d of the partition portion 56 at a rearmost position. The lower end portion 57d of the partition portion 57 positioned in the central portion in the forward and rearward direction is positioned on the straight line 62 which connects the lower end portion 55d of the partition portion 55 at the foremost position to the lower end portion 56d of the partition portion 56 at the rearmost position.

Rigidity of the support portion 52 is increased by not providing the partition portions 55, 57, and 56.

For this reason, it is possible to prevent bending of the airbag 40 via the support portion 52 having an increased rigidity.

Even though the airbag 40 is bent, the upper portion 51 positioned higher than the straight line 62 can be bent rearward and downward about the straight line 62 which is a pivot point. As such, it is possible to position a majority portion of the airbag 40 next to the occupant P1, and to encounter the occupant P1, who falls sideward due to impact, via the airbag 40.

Third Embodiment

Hereinafter, a third embodiment of the far-side airbag apparatus for a car will be described with reference to FIG. 8.

The point of difference of the third embodiment from the airbag 40 in the second embodiment is that the lower end portion 57d of the partition portion 57, which is positioned in the central portion in the forward and rearward direction, is provided higher than the straight line 62 that connects the lower end portion 55d of the partition portion 55 at the foremost position to the lower end portion 56d of the partition portion 56 at the rearmost position.

The rest of the configuration is the same as that in the second embodiment. For this reason, the same reference signs are assigned to the same elements described in the second embodiment, and duplicated description will be omitted.

In the aforementioned configuration of the third embodiment, when the airbag 40 is deployed and inflated, the airbag 40 has a small inflation thickness in the car width direction not only in the partition portions 55, 57, and 56, and in the vicinities of the partition portions 55, 57, and 56, but also in a region between the lower end portions 55d and 57d and in a region between the lower end portions 57d and 56d. Accordingly, in the airbag 40, the region between the lower end portions 55d and 57d has a low rigidity, and the region between the lower end portions 57d and 56d has a low rigidity. The region between the lower end portions 55d and 56d has a low rigidity.

Figure 8:
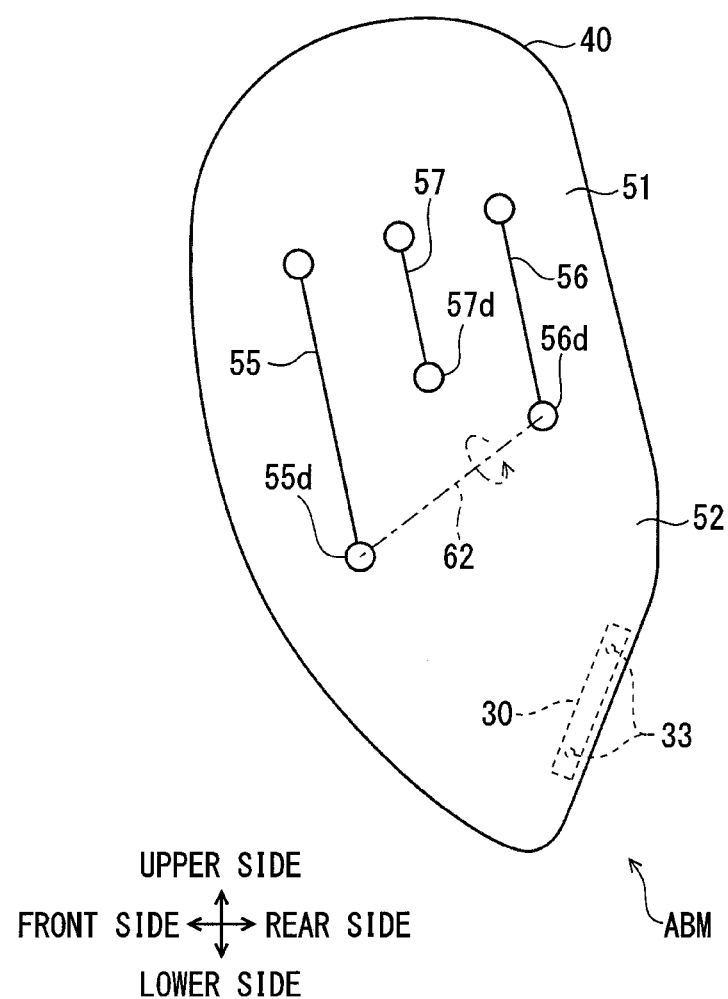
FIG. 8 is a view illustrating a third embodiment of a far-side airbag apparatus for a car, and is a side view corresponding to FIG. 5.

For this reason, in a case where the airbag 40 is bent, as illustrated in a chain line in FIG. 8, the upper portion 51 positioned higher than the straight line 62 (connecting the lower end portion 55d to the lower end portion 56d) is bent rearward and downward around the straight line 62 which is a pivot point, and approaches the occupant P1.

Also, in this case, since a majority portion of the airbag 40 is positioned next to the occupant P1, the airbag 40 encounters the occupant P1 who falls sideward due to impact, and impact applied to the occupant P1 is reduced.

As a result, in the third embodiment, even though the lower end portion 57d of the partition portion 57, which is positioned in the central portion in the forward and rearward direction, is positioned higher than the straight line 62, the same effects described in (1) and (3) to (5) can be obtained.

Fourth Embodiment

Hereinafter, a fourth embodiment of the far-side airbag apparatus for a car will be described with reference to FIG. 9.

Two partition portions 58 and 59 are added to the point of difference of the fourth embodiment from the airbag 40 in the first embodiment.

One (front) added partition portion 58 is provided in the front region 51f at a location proximate to the front side of the front partition portion 55. The partition portion 58 extends in parallel with the partition portion 55, and a lower end portion 58d of the partition portion 58 is positioned at a location slightly higher than the lower end portion 55d of the partition portion 55.

The other (rear) added partition portion 59 is provided in the rear region 51r at a location proximate to the rear side of the rear partition portion 56. The added partition portion 59 extends in parallel with the partition portion 56, and a lower end portion 59d of the partition portion 59 is positioned at a location slightly higher than the lower end portion 56d of the partition portion 56.

The respective lower end portions 55d and 58d of the partition portions 55 and 58 in the front region 51f are positioned at location lower than the respective lower end portions 56d and 59d of the partition portions 56 and 59 in the rear region 51r.

The rest of the configuration is the same as that in the first embodiment. For this reason, the same reference signs are assigned to the same elements described in the first embodiment, and duplicated description will be omitted.

In the aforementioned configuration of the fourth embodiment, when the airbag 40 is deployed and inflated, the airbag 40 has a small inflation thickness in the car width direction in the partition portions 58 and 55, in the vicinities of the partition portions 58 and 55 in the forward and rearward direction, in the partition portions 56 and 59, and in the vicinities of the partition portions 56 and 59 in the forward and rearward direction. The inflation thickness is small in a region between the respective lower end portions 58d and 55d of the partition portions 58 and 55, in a region between the respective lower end portions 56d and 59d of the partition portions 56 and 59, and in a region between the respective lower end portions 55d and 56d of the partition portions 55 and 56. Accordingly, in the airbag 40, the region between the lower end portions 58d and 55d has a low rigidity, the region between the lower end portions 55d and 56d has a low rigidity, and the region between the lower end portions 56d and 59d has a low rigidity.

Figure 9:
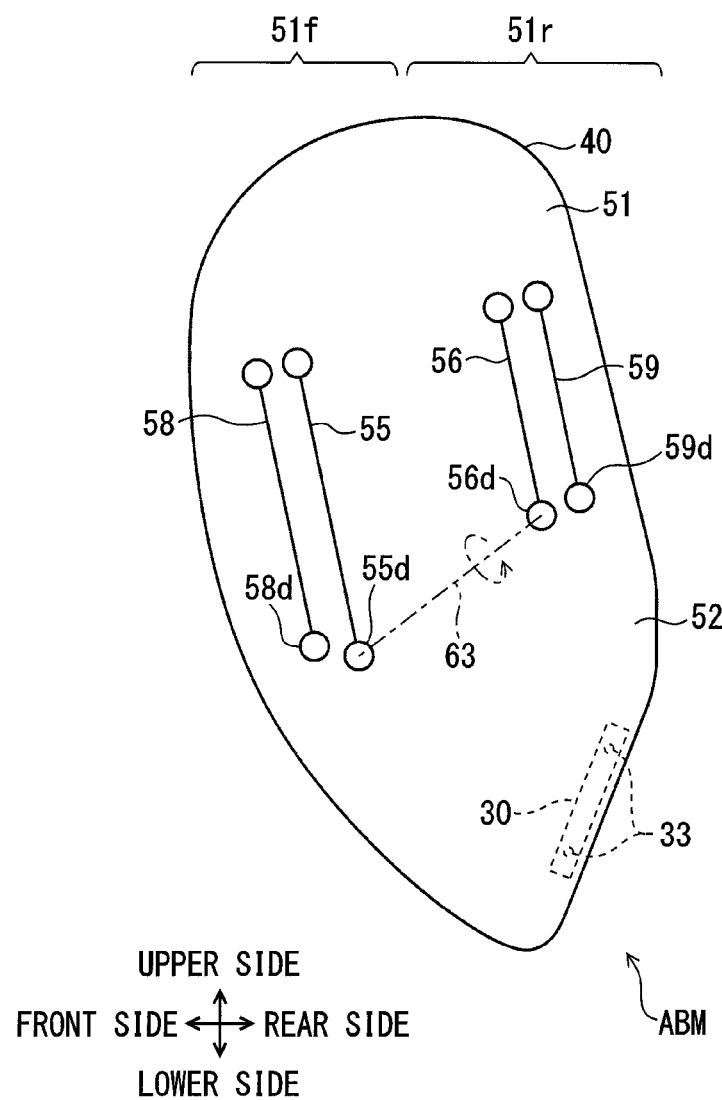
FIG. 9 is a view illustrating a fourth embodiment of a far-side airbag apparatus for a car, and is a side view corresponding to FIG. 5.

For this reason, in a case where the airbag 40 is bent, as illustrated in a chain line in FIG. 9, an upper portion 51 positioned higher than a straight line 63 (primarily connecting the lower end portions 55d to the lower end portion 56d) is bent rearward and downward around the straight line 63 which is a pivot point, and approaches the occupant P1.

As a result, since a majority portion of the airbag 40 is positioned next to the occupant P1, the airbag 40 encounters the occupant P1 who falls sideward due to impact, and impact applied to the occupant P1 is reduced.

As such, in the fourth embodiment, since the partition portion 58 is added to the front vicinity of the partition portion 55, and the partition portion 59 is added to the rear vicinity of the partition portion 56, but the lower end portions 55d and 58d in the front region 51f are positioned at locations lower than the lower end portions 56d and 59d in the rear region 51r, the same effects described in (1) to (4) can be obtained.

Fifth Embodiment

Hereinafter, a fifth embodiment of the far-side airbag apparatus for a car will be described with reference to FIGS. 10 to 21.

Figure 13:
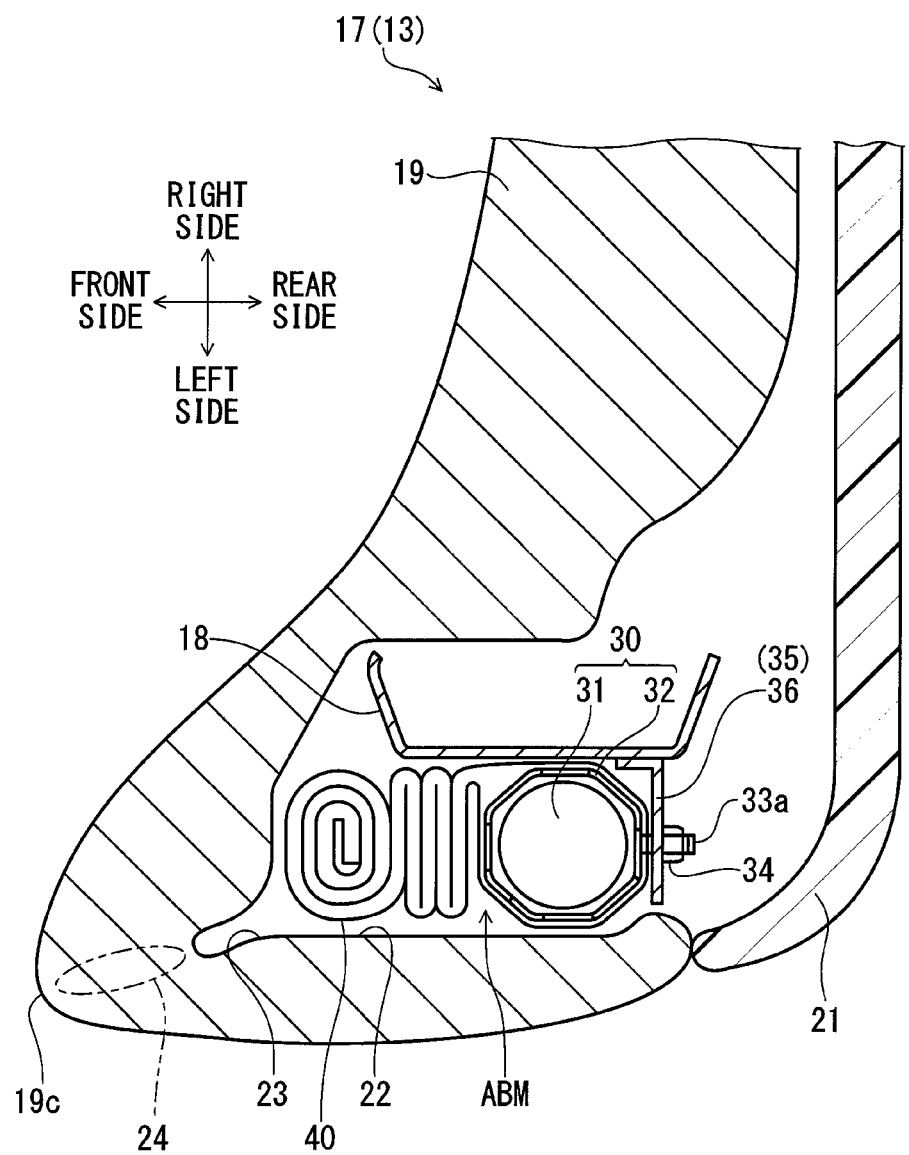
FIG. 13 is a partial top sectional view illustrating the internal structure of a side portion of a seatback, into which the airbag module is assembled, in the fifth embodiment.

FIG. 13 is a view corresponding to FIG. 3, and illustrates the internal structure of the side portion of the seatback 17 which is close to the adjacent car seat 14.

As illustrated in FIG. 13, a main portion of the side frame portion 18 has a plate shape which extends in the forward and rearward direction and the vertical direction. A bracket 35 is fixed to a rear portion of the main portion. The bracket 35 includes a plate-shaped attaching portion 36 that extends in the forward and rearward direction and the vertical direction. Two bolt holes pass through the attaching portion 36, and are spaced apart from each other in the vertical direction.

Figure 10:
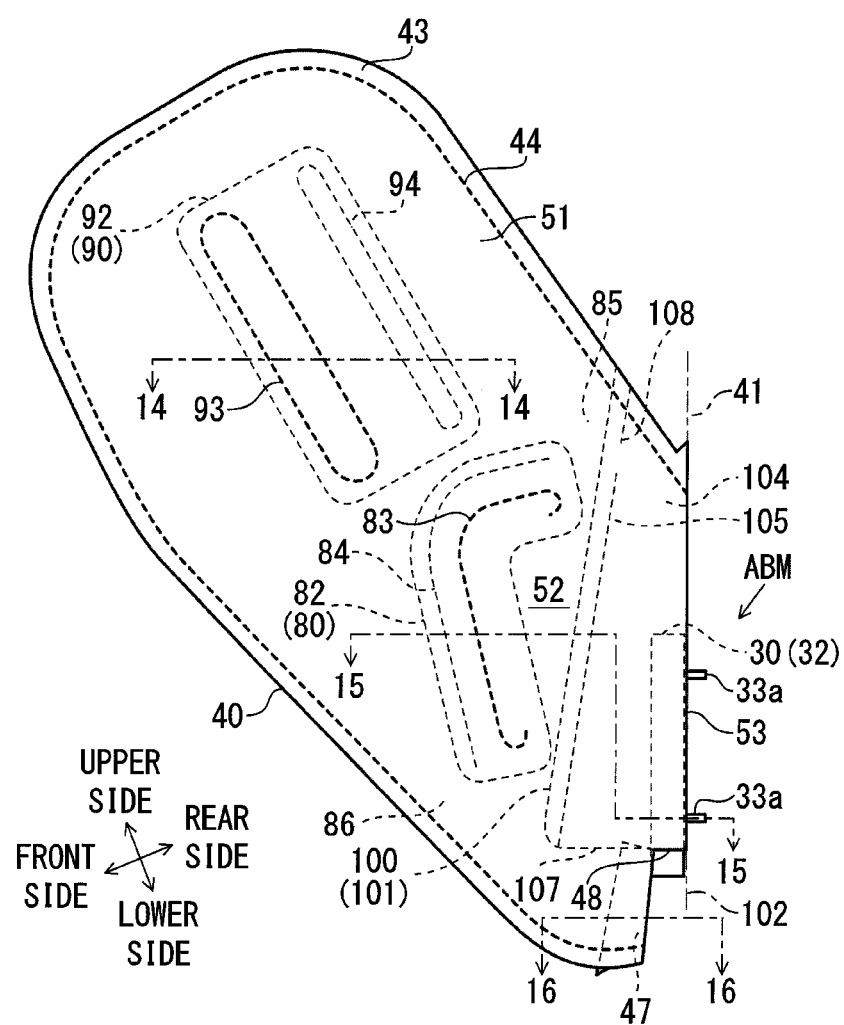
FIG. 10 is a view illustrating a fifth embodiment of a far-side airbag apparatus for a car, and is a side view of an airbag module in which an airbag is not inflated, but is deployed.
Figure 12:
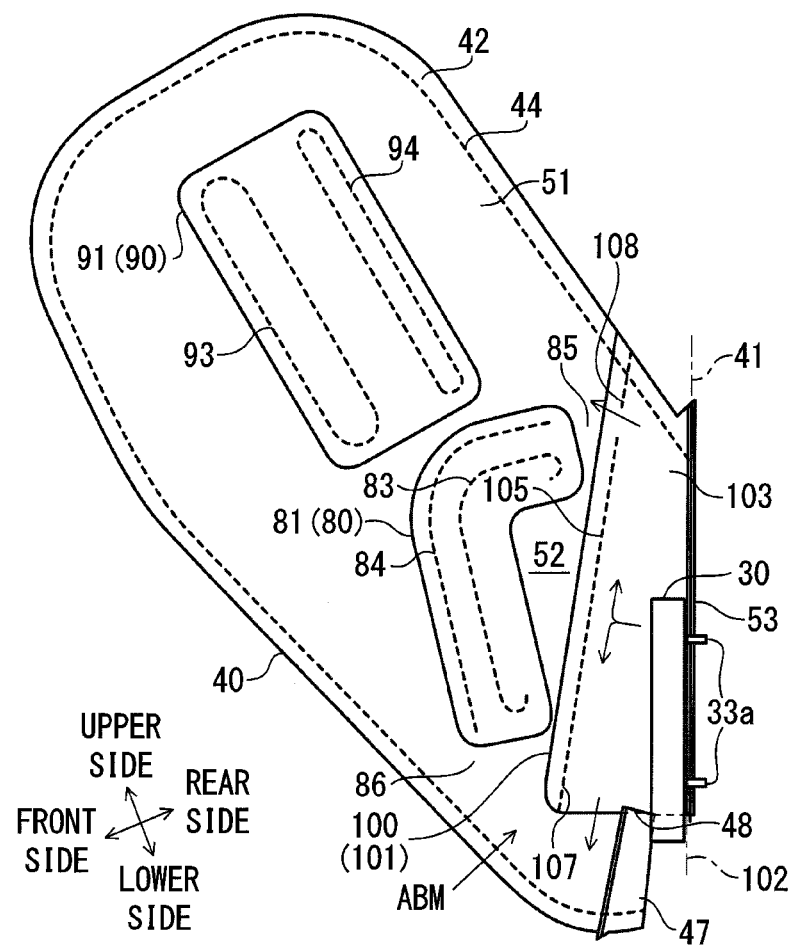
FIG. 12 is a side sectional view illustrating the internal structure of the airbag module illustrated in FIG. 10.
Figure 17:
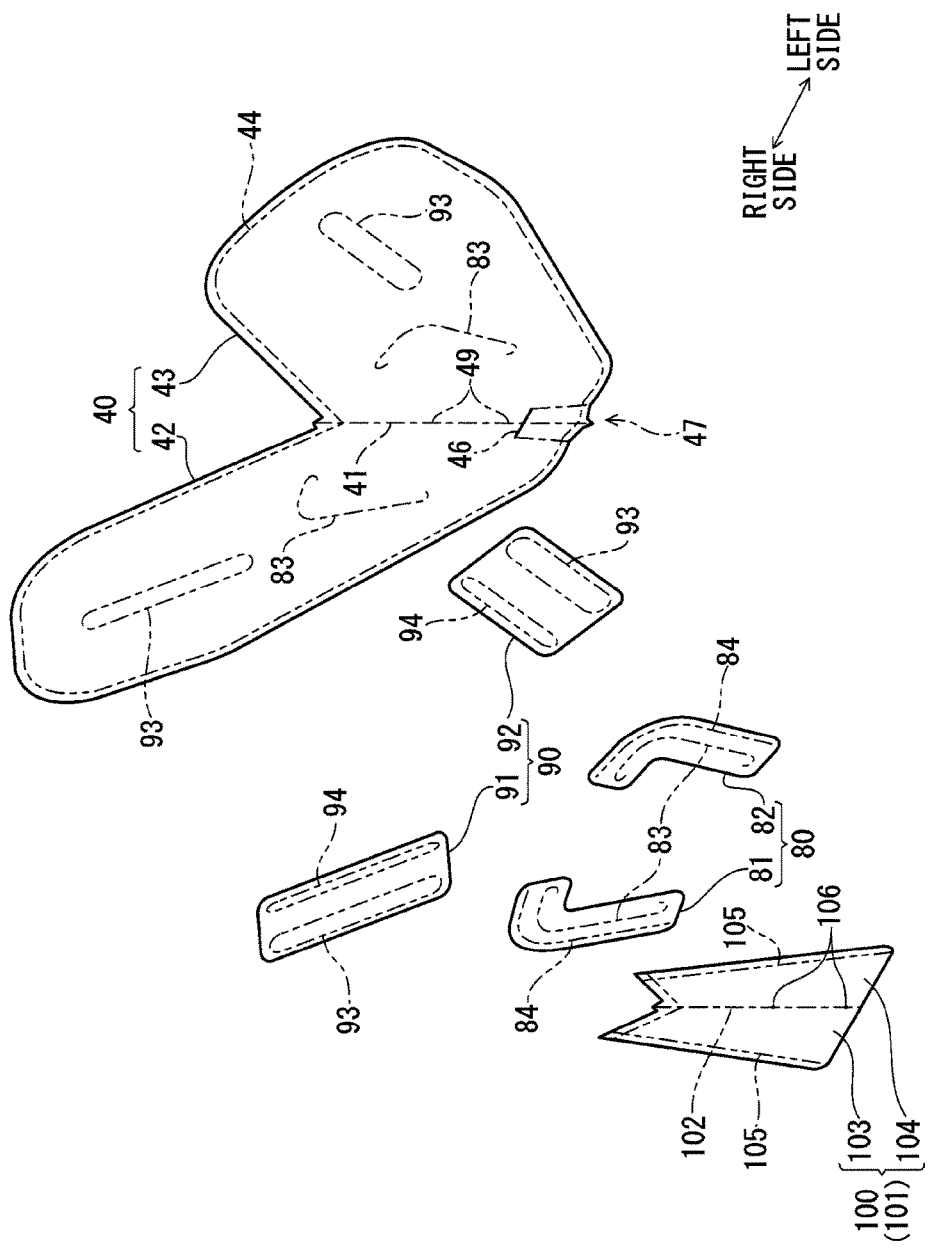
FIG. 17 is an exploded perspective view illustrating a state in which a principal portion of configuration members of the far-side airbag apparatus is deployed, in the fifth embodiment.

FIG. 10 illustrates the airbag module ABM in which the airbag 40 is not inflated, but is deployed. FIG. 17 illustrates a state in which a principal portion of configuration members of the airbag module ABM including the airbag 40 is deployed. FIG. 12 illustrates a state in which a central portion of the airbag 40 in FIG. 10 in the car width direction is cut to illustrate the internal structure of the airbag module ABM.

In FIGS. 10 and 12, for illustrative purposes, each portion of the airbag module ABM is illustrated in a state in which the gas generator 30 is postured to extend in a perpendicular direction. This point also is the same for FIGS. 18A, 19A, 20A and 21.

As shown in FIGS. 10, 12 and 17, the airbag 40 is formed such that one fabric piece (basic fabric, and also referred to as a panel fabric) is folded forward in half along a folding line 41 set in a central portion of the one fabric piece, folded fabric portions overlap each other in the car width direction, and the overlapping portions are joined together in a bag shape. The folding line 41 is illustrated by a chain line. In order to distinguish two overlapping portions of the airbag 40 from each other, an overlapping fabric portion positioned close to the occupant P1 is referred to as the "occupant side fabric portion 42", and an overlapping fabric portion positioned apart from the occupant P1 is referred to as the "non-occupant side fabric portion 43". When the airbag 40 is not inflated, but is deployed, a rear end edge of the airbag 40 forms a straight line which extends substantially in the vertical direction.

In the fifth embodiment, a fabric piece is folded in half such that the folding line 41 is positioned in the rear end portion of the airbag 40; however, a fabric piece may be folded in half such that the folding line 41 is positioned in other end portions such as a front end portion, an upper end portion, and a lower end portion. The airbag 40 may be formed of two fabric pieces into which the airbag 40 is divided along the folding line 41. In this case, the airbag 40 is formed such that the two fabric pieces are set to overlap each other in the car width direction, and both the fabric pieces are joined together along the entire circumference thereof. At least one of the occupant side fabric portion 42 and the non-occupant side fabric portion 43 may be formed of two or more fabric pieces.

Figure 11:
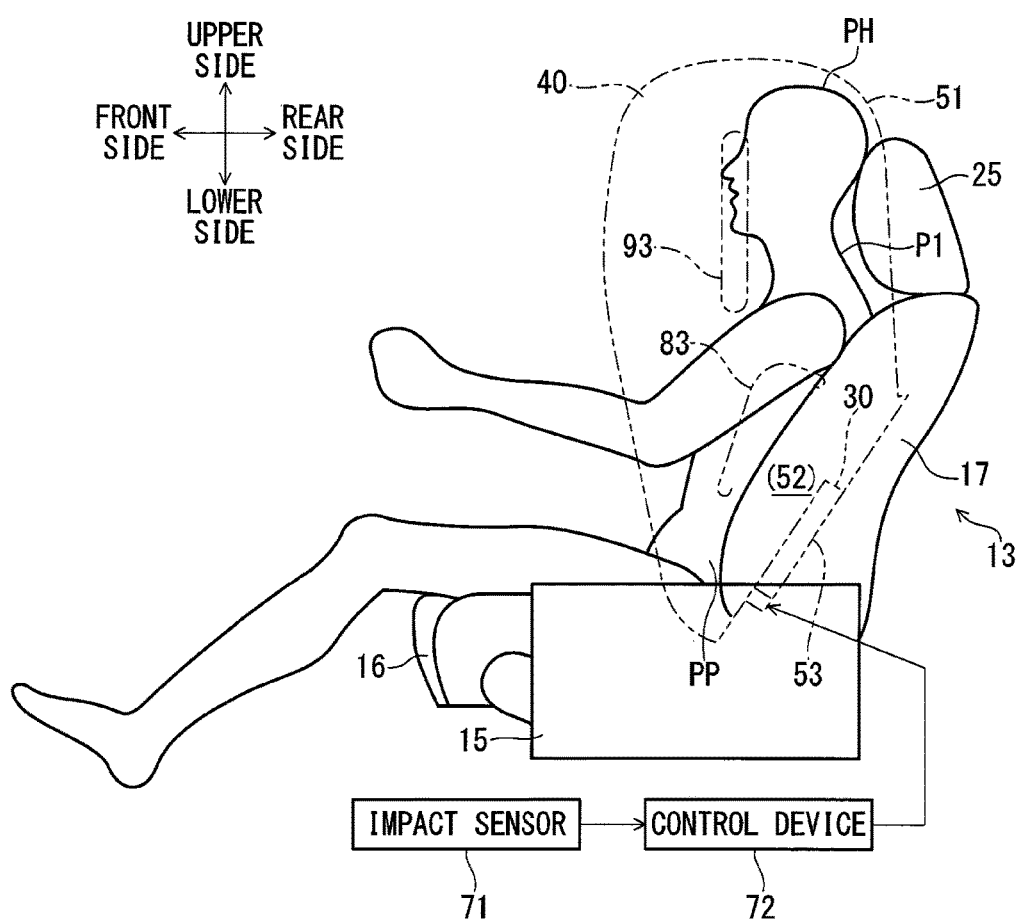
FIG. 11 is a side view illustrating a car seat in which the far-side airbag apparatus is provided; an occupant; and a center console box, in the fifth embodiment.

In the airbag 40, the occupant side fabric portion 42 and the non-occupant side fabric portion 43 are reflection-symmetrical in exterior shape with respect to the folding line 41 which is an axis of symmetry. As illustrated in FIG. 11, the occupant side fabric portion 42 and the non-occupant side fabric portion 43 are formed to have such a shape and size as to be capable of occupying a space next to the upper body of the occupant P1 which corresponds to the entire upper body, that is, a portion of the upper body from the waist portion PP to the head portion PH, when the airbag 40 is deployed and inflated.

As illustrated in FIGS. 10 to 12, a material suitable for use in the occupant side fabric portion 42 and the non-occupant side fabric portion 43 is a woven fabric or the like made of polyester yarn, polyamide yarn, or the like which has a high strength and stretch resistance properties, but is flexible and can be easily folded.

The joining of the occupant side fabric portion 42 and the non-occupant side fabric portion 43 is performed along a circumferential edge joint portion 44 provided along circumferential edge portions of the occupant side fabric portion 42 and the non-occupant side fabric portion 43. The circumferential edge joint portion 44 is formed by sewing portions (stitching together portions with sewing thread) except for rear end portions (the vicinity of the folding line 41) in the circumferential edge portions of the occupant side fabric portion 42 and the non-occupant side fabric portion 43. This point also is the same for joint portions 83, 84, 93, 94, and 105 (to be described later).

In sewing, in FIGS. 10, 12 and 18A to 20B, sewn portions are illustrated by three types of lines. This is the same as FIG. 23 corresponding to the sixth embodiment to be described and FIGS. 24, 25 and 29 corresponding to the seventh embodiment.

A first type of line is a line in which bold lines having a predetermined length are intermittently placed side by side, and illustrates the state of sewing thread viewed from the side (refer to the circumferential edge joint portion 44, joint portions 83 and 93, and the like in FIG. 10). A second type of line is a line in which thin lines having a predetermined length (length larger than the length of a typical dotted line) are placed side by side, and illustrates the state of sewing thread that is positioned inside a fabric piece and cannot be directly seen (is hidden) (refer to joint portions 84, 94, and 105 etc. in FIG. 10). A third type of line is a line in which dots are placed side by side while being spaced a predetermined gap therebetween, and illustrates the section of sewing thread which is a plane passing through a sewn portion (refer to the circumferential edge joint portion 44, and the joint portions 84, 94, and 105 etc. in FIG. 12).

The circumferential edge joint portion 44 may be formed via means other than stitching with such sewing thread, for example, via adhesion using an adhesive agent. This point is the same for the above joint portions 83, 84, 93, 94, and 105.

A portion in a space, which is positioned between the occupant side fabric portion 42 and the non-occupant side fabric portion 43 and is surrounded by the circumferential edge joint portion 44 and the folding line 41, is an inflated portion deployed and inflated by inflating gas.

As illustrated in FIGS. 10 and 17, a slit 46 is formed in the airbag 40, and extends in a direction perpendicular to the folding line 41. A lower portion of the occupant side fabric portion 42 and the non-occupant side fabric portion 43, which is positioned lower than the slit 46, is an inward-folded portion 47 that is interposed between other portions while being bent inward (refer to FIG. 16). A lower end portion of the inward-folded portion 47 is sewn together to and joined to other portions of the occupant side fabric portion 42 and the non-occupant side fabric portion 43 via the circumferential edge joint portion 44. The slit 46 is open via formation of the inward-folded portion 47, and the insertion port 48 for the gas generator 30 is formed.

Bolt holes 49 for inserting bolts 33*a* of the gas generator 30 are formed on the folding line 41 of the airbag 40 at multiple locations (two locations) higher than the slit 46.

As thickness restriction portions which restrict the inflation thickness of the airbag 40 in the car width direction, partition portions 80 and 90 are provided in the airbag 40 at two locations which are positioned apart from the circumferential edge joint portion 44 and are apart from each other. The partition portions 80 and 90 partition the airbag 40 into multiple regions (inflated portions). Both of the partition portions 80 and 90 have the same configuration as that of an element which is typically called a tether.

Figure 15:
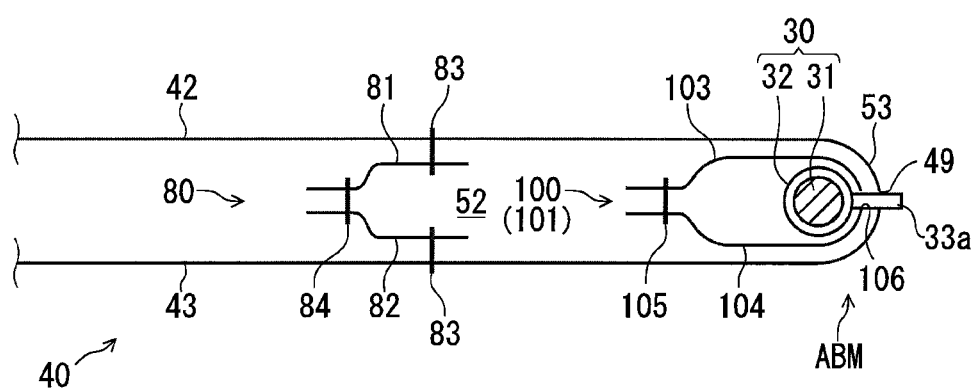
FIG. 15 is a sectional view taken along line 15-15 in FIG. 10.
Figure 16:
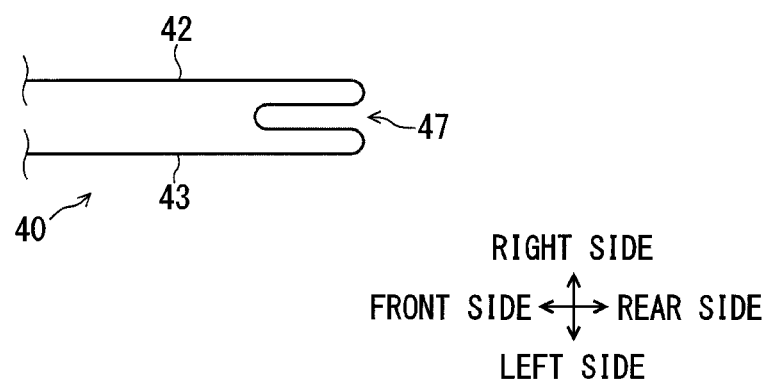
FIG. 16 is a sectional view taken along line 16-16 in FIG. 10.

As illustrated in FIGS. 10, 12, and 15, the partition portion 80 is disposed in the front vicinity of the gas generator 30. The partition portion 80 includes a pair of fabric portions 81 and 82 made of the same material as that of the airbag 40. When the airbag 40 is not inflated, but is deployed, both of the fabric portions 81 and 82 overlap each other in the car width direction. In this state, middle portions of both of the fabric portions 81 and 82 in the car width direction are curved in such a way as to be inflated diagonally forward and upward.

The occupant side fabric portion 81 is joined to the occupant side fabric portion 42 adjacent thereto via the joint portion 83. Similarly, the non-occupant side fabric portion 82 is joined to the non-occupant side fabric portion 43 adjacent thereto via the joint portion 83. Both of the fabric portions 81 and 82 are joined together via the joint portion 84 that is provided at a location apart from both of the joint portion 83. In such a joint pattern, the partition portion 80 is provided across a gap between the occupant side fabric portion 42 and the non-occupant side fabric portion 43 of the airbag 40. When both of the fabric portions 81 and 82 become tense, the inflation thickness of the vicinity of the partition portion 80 in the airbag 40 in the car width direction is restricted.

A space, which is formed inside the airbag 40 between an upper end portion of the partition portion 80 and a rear upper end portion that is a nearest location of the circumferential edge joint portion 44, is formed as an upper passage 85. The inflated portions in back of and in front of the partition portion 80 communicate with each other via the upper passage 85 positioned higher than the partition portion 80. A space, which is formed inside the airbag 40 between a lower end portion of the partition portion 80 and a rear lower end portion that is a nearest location of the circumferential edge joint portion 44, is formed as a front passage 86. The inflated portions in back of and in front of the partition portion 80 communicate with each other via the front passage 86 positioned lower than the partition portion 80.

Figure 14:
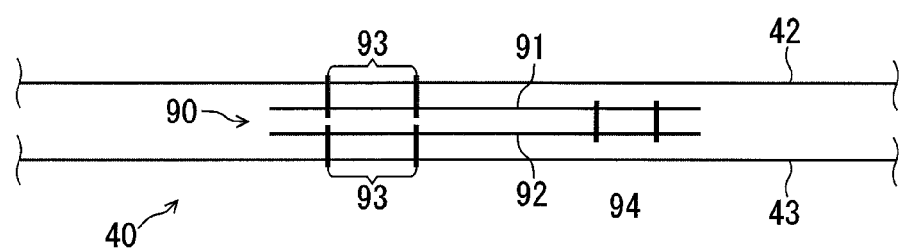
FIG. 14 is a sectional view taken along line 14-14 in FIG. 10.

As illustrated in FIGS. 10, 12, and 14, the partition portion 90 is disposed at a location spaced upwardly forward and away from the partition portion 80. The partition portion 90 is formed of a pair of fabric portions 91 and 92 made of the same material as that of the airbag 40. Both of the fabric portions 91 and 92 have a rectangular shape, and when the airbag 40 is not inflated, but is deployed, both of the fabric portions 91 and 92 overlap each other in the car width direction.

The occupant side fabric portion 91 is joined to the occupant side fabric portion 42 adjacent thereto via the joint portion 93. Similarly, the non-occupant side fabric portion 92 is joined to the non-occupant side fabric portion 43 adjacent thereto via the joint portion 93. Both of the fabric portions 91 and 92 are joined together via the joint portion 94 that is provided at a location spaced rearward away from both of the joint portions 93. In such a joint pattern, the partition portion 90 is provided across a gap between the occupant side fabric portion 42 and the non-occupant side fabric portion 43 of the airbag 40. When both of the fabric portions 91 and 92 become tense, the inflation thickness of the vicinity of the partition portion 90 in the airbag 40 in the car width direction is restricted.

The rear lower portion of the airbag 40, in other words, a portion in back of the partition portion 80 forms the support portion 52 that supports the upper portion 51 positioned higher than the rear lower portion.

As illustrated in FIGS. 10, 12, and 15, an inner tube 100 is disposed inside the support portion 52 of the airbag 40, and extends in the vertical direction in a state where the inner tube 100 surrounds at least a gas ejection portion of the gas generator 30. The inner tube 100 serves to distribute (rectify) inflating gas, which is ejected from the gas ejection portion of the gas generator 30, to the upper side and the lower side.

The inner tube 100 is formed of the same material as that of the airbag 40, and is formed of one fabric piece 101 having a shape in which the width of the one fabric piece 101 increases toward the lower side (refer to FIG. 17). A lower end portion of the fabric piece 101 is spaced upward away from a lower end portion of the support portion 52 of the airbag 40. The vertical position of the lower end portion of the fabric piece 101 is set to the same height as that of an insertion port 48 of the airbag 40.

The fabric piece 101 is folded forward in half along a folding line 102 (refer to FIG. 17) that is set in a central portion of the fabric piece 101 in the car width direction. Folded portions overlap each other in the car width direction. In order to distinguish two overlapping portions of the inner tube 100 from each other, an overlapping fabric portion positioned close to the occupant is referred to as a fabric portion 103, and an overlapping fabric portion positioned apart from the occupant is referred to as a fabric portion 104.

Front end portions of a pair of the fabric portions 103 and 104 are joined together via the joint portion 105 that extends in the vertical direction. As described above, the fabric piece 101 having a trapezoidal shape is used to form the inner tube 100. For this reason, when the airbag 40 is not inflated, but is deployed, the joint portion 105 formed along respective front ends of the fabric portions 103 and 104 is inclined with respect to a rear end edge (the folding line 102) of the inner tube 100 such that a gap between the front ends and the rear end edge (the folding line 102) increases toward the lower side. Accordingly, when inflating gas is supplied to the inner tube 100 from the gas generator 30, the inner tube 100 is inflated into a cylindrical shape in which the inner tube 100 becomes slimmer from a lower end portion toward an upper end portion of the inner tube 100.

As described above, both of the fabric portions 103 and 104 include lower end portions which are not joined together and are spaced upward from the lower end portion of the support portion 52 of the airbag 40. A location at which joining is not performed forms an opening 107 of the lower end portion of the inner tube 100.

The upper end portion of the inner tube 100, which is a slim end portion, extends to the rear upper end portion as an outer circumferential portion on the upper side of the airbag 40, and is joined (sewn together) to the rear upper end portion via the circumferential edge joint portion 44. Rigidity of the support portion 52 of the airbag 40 is increased via this joining (sewing together).

The joining of both of the fabric portions 103 and 104 via the joint portion 105 is not performed at a location in the upper end portion of the inner tube 100. The location at which joining via the joint portion 105 is not performed forms an opening 108 of the upper portion of the inner tube 100. In the first embodiment, the upper opening 108 is smaller than the lower opening 107.

As illustrated in FIGS. 15 and 17, bolt holes 106 for inserting the bolts 33a of the gas generator 30 are formed at multiple locations on the folding line 102 of the inner tube 100.

The inner tube 100 is joined to the airbag 40 via joining means (not illustrated) such as stitching, in a state where the bolt holes 106 are aligned with the bolt holes 49 of the airbag 40.

The inner tube 100 may be folded in half such that the folding line 102 is positioned in the front end portion of the inner tube 100. In this case, respective rear end portions of the pair of the fabric portions 103 and 104 of the inner tube 100 may be joined together, and may be sewn together to the rear end portions of the occupant side fabric portion 42 and the non-occupant side fabric portion 43 of the airbag 40 via the circumferential edge joint portion 44. The fabric portions 103 and 104 of the inner tube 100 may be separated from each other along the folding line 102.

As fixing members for attaching the gas generator 30 to the attaching portion 36, a pair of the bolts 33a which extend rearward are fixed to the retainer 32 of the gas generator 30 at two locations which are positioned apart from each other in the vertical direction.

As illustrated in FIGS. 10 and 12, in a state where the gas generator 30 is postured to extend substantially in the vertical direction, a majority portion of the gas generator 30 except for a lower portion thereof is inserted into the cylindrical inner tube 100 inside the rear end portion of the airbag 40 from substantially the lower side through the insertion port 48. The bolts 33a are inserted into the bolt holes 106 and the bolt holes 49 (refer to FIG. 15) such that the gas generator 30 is positioned and locked with respect to the inner tube 100 and the airbag 40.

The locked gas generator 30 is positioned at a location biased downward from a central portion of the inner tube 100 in the vertical direction.

In order to increase rigidity of the support portion 52 in the airbag 40, between the upper and lower end portions of the inner tube 100, the upper end portion, which extends to the outer circumferential portion (rear upper end portion) of the airbag 40 and is jointed to the outer circumferential portion, is an end portion apart from the gas generator 30.

Figure 21:
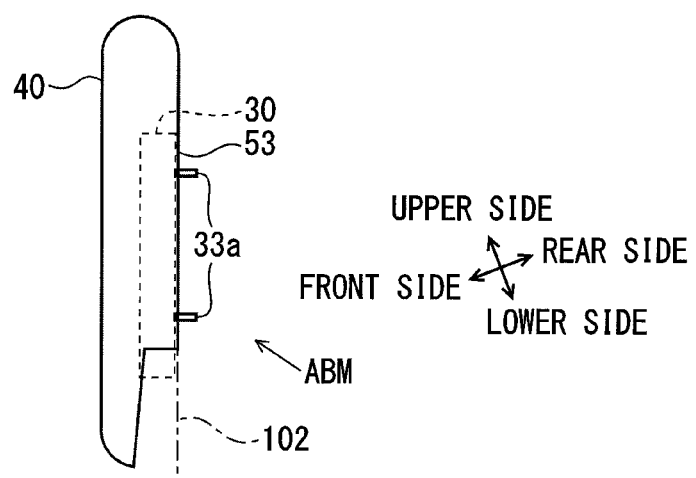
FIG. 21 is a side view of the airbag module in which the airbag in FIG. 20A is accordion-folded into an accommodated form.

As illustrated in FIG. 21, the airbag module ABM including the gas generator 30 and the airbag 40 as main configuration members is collapsed into a compact form (hereinafter, referred to as an "accommodated form") by folding the airbag 40. This operation is to adjust the size of the airbag module ABM to a suitable size in which the airbag module ABM can be accommodated in the accommodation portion 22 of the seatback 17.

The airbag 40 is collapsed into an accommodated form illustrated in FIG. 21 by folding the airbag 40 in a non-inflated but deployed state illustrated in FIG. 10 in a manner illustrated in FIGS. 18A to 20B. Hereinafter, a step of folding the airbag 40 will be described.

Figure 18A:
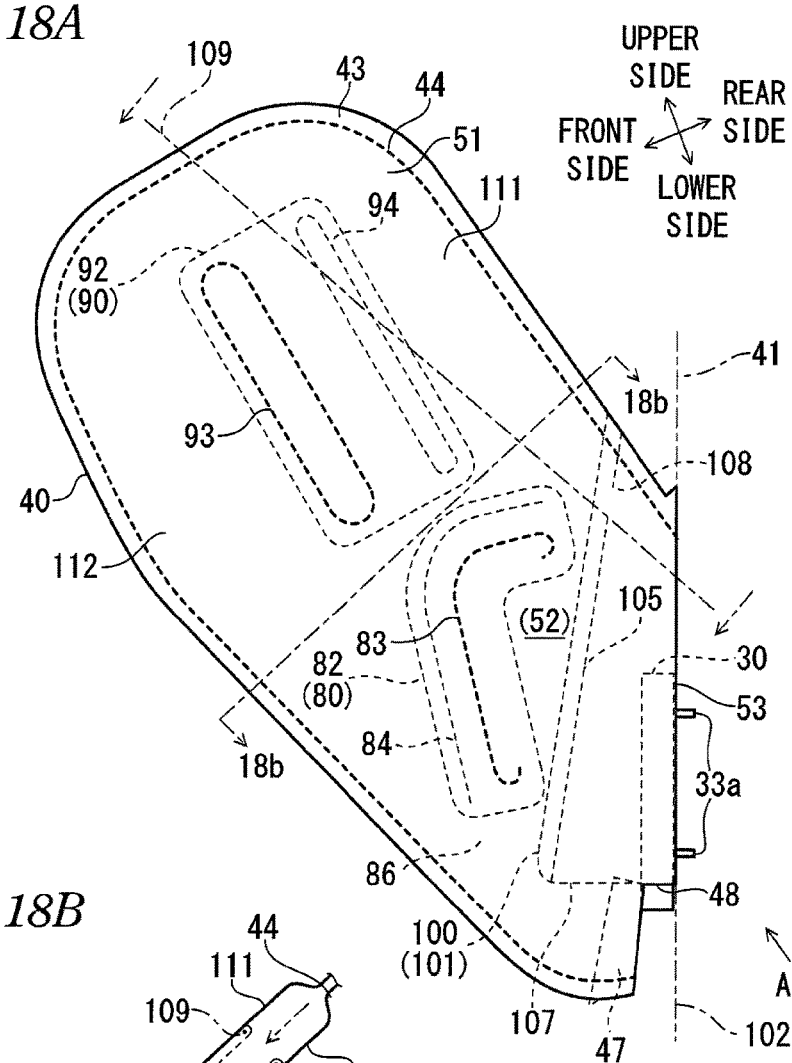
FIGS. 18A and 18B are views illustrating the fifth embodiment.

A folding line 109 set in upper portions of the occupant side fabric portion 42 and the non-occupant side fabric portion 43 of the airbag 40 in a non-inflated but deployed state illustrated in FIG. 18A is inclined such that the front side of the folding line 109 is raised.

Figure 18B:
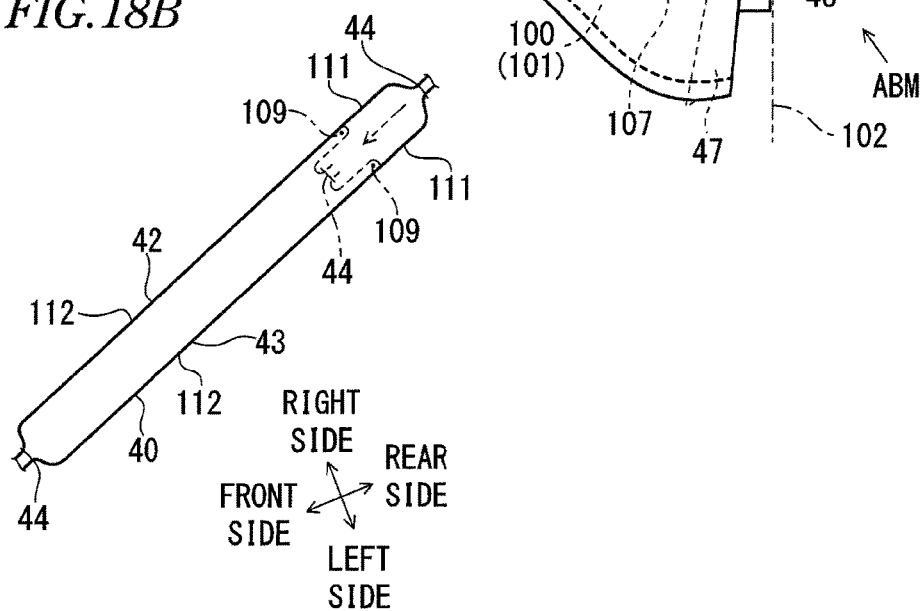

As illustrated by a two-dot chain line arrow in FIGS. 18A and 18B, the airbag 40 is folded over itself (also referred to as center folding, inward folding, or the like) along the folding line 109 such that an upper portion 111 (positioned higher than the folding line 109) is positioned inside of a lower portion 112 (positioned lower than the folding line 109) in the occupant side fabric portion 42 and the non-occupant side fabric portion 43. As illustrated by a two-dot chain line in FIG. 18B, the upper portion 111 overlaps the lower portion 112 in the car width direction via folding. Accordingly, the vertical dimension of the airbag 40 is slightly decreased from that before the airbag 40 is folded inward.

Figures 19A, 19B:
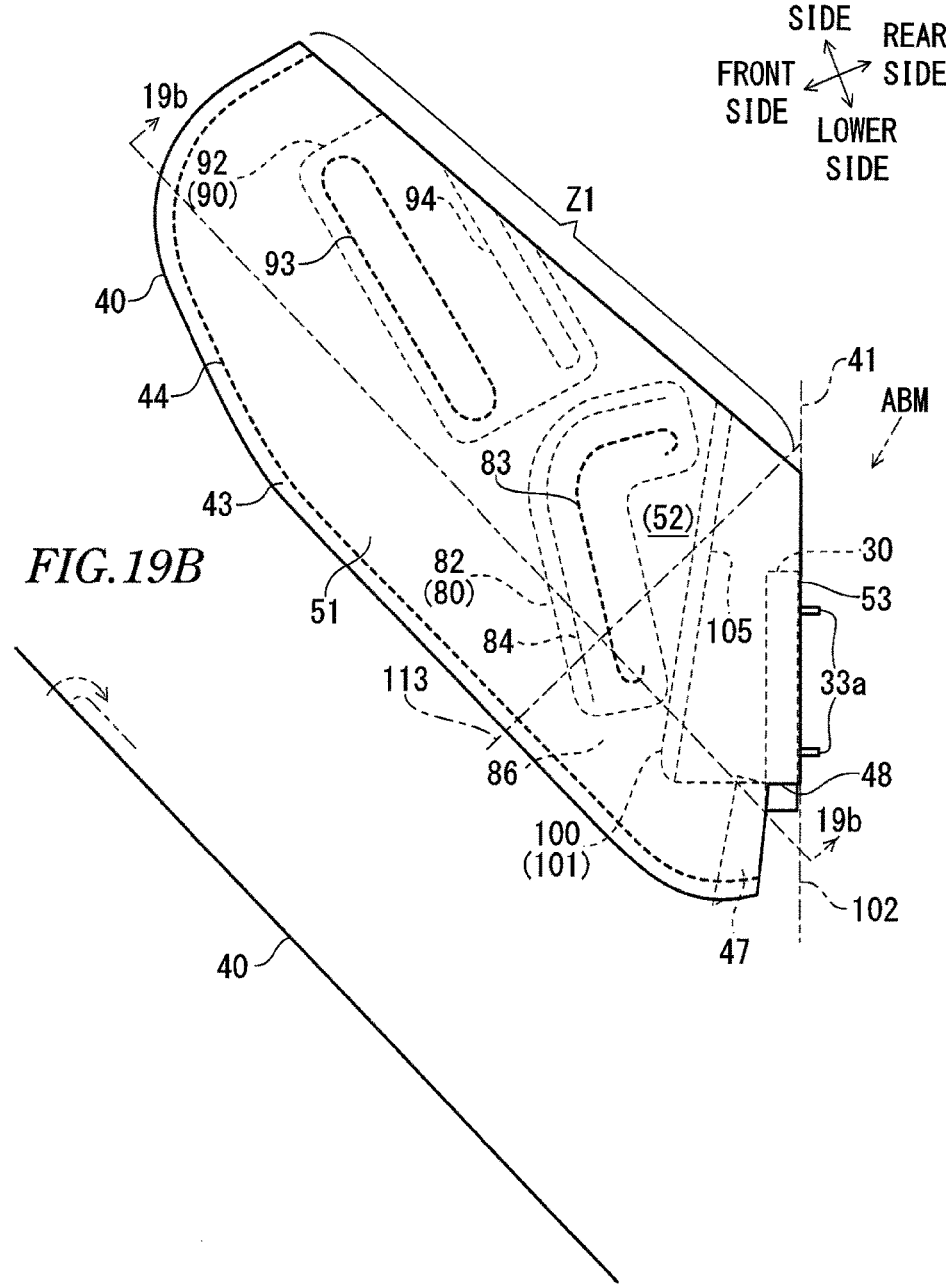
FIG. 19A is a side view of the airbag module in which the airbag in FIG. 18A is folded inward.
FIG. 19B is a sectional view taken along line 19b-19b in FIG. 19A.
Figure 20A:
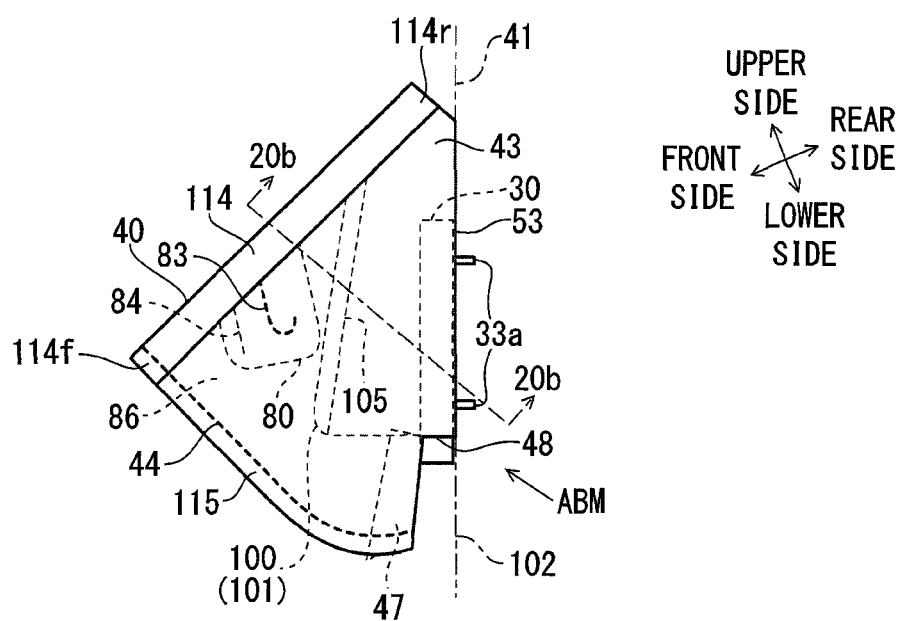
FIG. 20A is a side view of the airbag in which the airbag in FIG. 19A is roll-folded.
Figure 20B:
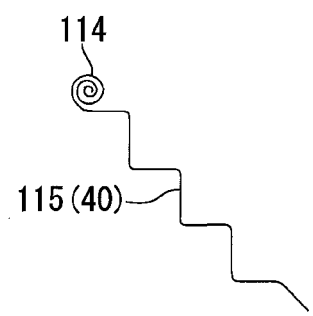
FIG. 20B is a sectional view taken along line 20b-20b in FIG. 20A.

Subsequently, as illustrated in FIGS. 19A and 19B, in the inward-folded airbag 40, a region (region in front of an imaginary line 113 set in the front vicinity of the gas generator 30) Z1 in front of the gas generator 30 is roll-folded toward the gas generator 30. As illustrated in FIGS. 20A and 20B, the dimension of the airbag 40 in the forward and rearward direction is decreased by performing the roll-folding.

Subsequently, between end portions of a portion 114 which is folded into a bar shape via roll-folding, a remaining fan-shaped portion 115 is folded toward the rear side of the car via accordion-folding with respect to a rear end portion 114r as a center close to a portion of the airbag 40 in which the gas generator 30 is accommodated. That is, the fan-shaped portion 115 is accordion-folded such that a front end portion 114f, which is the other end portion of the bar-shaped portion 114, approaches the gas generator 30. The airbag 40 is collapsed into an accommodated form illustrated in FIG. 21 via folding. Thereafter, the airbag 40 is maintained in an accommodated form via maintaining means such as binding tape (not illustrated).

The dimension of the airbag module ABM, in which the airbag 40 is folded into an accommodated form, decreases in the vertical direction and the forward and rearward direction, and becomes a suitable dimension in which the airbag module ABM can be accommodated in the narrow accommodation portion 22 of the seatback 17.

As illustrated in FIG. 13, the airbag module ABM in an accommodated form is accommodated in the accommodation portion 22. The bolts 33a, which have extended from the gas generator 30 and have been inserted into the bolt holes 106 of the inner tube 100 and the bolt holes 49 of the airbag 40, are inserted into bolt holes of the bracket 35 from the front side, and are tightened with the nuts 34 from the rear side. The gas generator 30 is fixed to the bracket 35 together with the rear end portion (fixed portion) of the airbag 40 and the inner tube 100 via tightening.

The gas generator 30 may be attached to the bracket 35 with a member other than the bolts 33a and the nuts 34.

In the fifth embodiment, the same reference signs are assigned to the same elements described in the first embodiment, and duplicated description will be omitted.

Hereinafter, the operation of the aforementioned configuration in the fifth embodiment will be described.

In a case where a side impact is applied to the side wall portion 12 due to side collision or the like, and the impact sensor 71 detects the impact, the control device 72 outputs operation signals to the gas generator 30 based on detection signals. Inflating gas is ejected from the gas ejection portion of the gas generator 30 according to the operation signals.

As illustrated in FIG. 12, the inflating gas is distributed (rectified) to flow upward and downward along a wall surface of the inner tube 100. The upward distributed inflating gas flows forward from the opening 108 of the upper portion of the inner tube 100. The downward distributed inflating gas flows downward from the opening 107 of the lower end portion of the inner tube 100. Since the opening 107 is larger than the opening 108, the amount of inflating gas flowing into the lower side of the inner tube 100 is larger than that flowing into the front side of the inner tube 100.

A portion of inflating gas (ejected from the gas generator 30) flows forward, comes into contact with a front end edge (the joint 105) of the inner tube 100, and is distributed to flow upward and downward. In the fifth embodiment, the front end edge (the joint portion 105) of the inner tube 100 is inclined with respect to the rear end edge (the folding line 102) such that a gap between the front end edge and the rear end edge (the folding line 102) increases toward the lower side.

Inflating gas flowing upward encounters resistance higher than that applied to inflating gas flowing downward. For this reason, after a portion of inflating gas (ejected from the gas ejection portion of the gas generator 30) flows forward, and comes into contact with the front end edge (the joint 105) of the inner tube 100, a larger amount of inflating gas than the amount of inflating gas flowing upward flows downward. As a result, coupled with the fact that the opening 107 of the lower end portion of the inner tube 100 is larger than the opening 108, the amount of inflating gas flowing from the opening 107 is larger than that flowing from the opening 108.

A larger amount of inflating gas than the amount of inflating gas supplied to the upper passage 85, located vicinity to the front of the upper opening 108, is supplied to the front passage 86, located vicinity to the front of the lower opening 107.

A portion of inflating gas of the support portion 52 flows substantially upward through the upper passage 85. A portion of inflating gas of the support portion 52 flows substantially forward through the front passage 86.

Inflating gas is supplied to each portion of the airbag 40 partitioned by the partition portions 80 and 90, and thus, pressure (inner pressure) increases, and the airbag 40 is deployed and inflated in a reverse sequence of a folding sequence described with reference to FIGS. 18A to 20B.

First, as illustrated in FIGS. 20A and 20B, the fan-shaped portion 115, which has been folded via accordion-folding, is unfolded, and the airbag 40 is deployed and inflated. For this reason, the airbag 40 is deployed and inflated toward the front side of the car. In the process of deployment and inflation of the airbag 40 toward the front side of the car, the tear-planned portion 24 (shown in FIG. 13) of the seatback 17 is torn, and the airbag 40 bursts out of the side portion of the seatback 17 toward the front side of the car. Since the vertical dimension of the airbag 40 is decreased via inward-folding, compared to an airbag which is not folded inward, the airbag 40 is unlikely to be caught by a torn portion of the seatback 17, and is easily deployed and inflated forward while being burst out from the torn portion.

Subsequently, as illustrated in FIGS. 19A and 19B, the portion 114, which has been folded into a bar shape via roll-folding, is unfolded, and the airbag 40 is deployed and inflated diagonally forward and upward. In the process of deployment and inflation, as illustrated in FIGS. 18A and 18B, an inward-folded portion encounters pressure from inflating gas flowing upward, and is pushed out straight upward. The airbag 40 is more quickly deployed and inflated without any needless operation in contrast to a case in which another folding method is adopted, for example, a case in which the airbag 40 is folded outward.

The airbag 40 is deployed and inflated diagonally forward and upward from the fixed portion 53 of the rear end portion of the airbag 40 between the adjacent car seats 13 and 14. As described above, since a larger amount of inflating gas than the amount of inflating gas supplied to the upper passage 85 is supplied to the front passage 86, forward deployment and inflation of the airbag 40 is more accelerated than upward deployment and inflation of the airbag 40.

When the airbag 40 is completely deployed and inflated, the airbag 40 is positioned between the occupants P1 and P2 who respectively sit on both of the car seats 13 and 14 (refer to FIG. 1).

As shown in FIG. 11, a part of the support portion 52 of the airbag 40 is positioned next to the waist portion (the lower portion of the seatback 17) PP of the occupant P1, and the upper end of the airbag 40 is positioned at a location higher than the head portion (the upper end of the headrest 25) PH of the occupant P1. The lower end of the airbag 40 is positioned between the occupant P1 sitting on the car seat 13 and the center console box 15.

The airbag 40 encounters the upper body of the occupant P1 who falls toward the side wall portion 12 to which impact is applied. At this time, a forward force is applied to the airbag 40 as a component of a side force applied to the airbag 40.

As illustrated in FIGS. 12 and 13, the airbag 40 is attached to the bracket 35 together with the gas generator 30 via the fixed portion 53 of the rear end portion of the airbag 40, and thus, the support portion 52 of the rear lower portion of the airbag 40 has a high rigidity in the vicinity of the fixed portion 53.

Since the inner tube 100 is inflated into a cylindrical shape by inflating gas, rigidity of the inner tube 100 increases. Accordingly, rigidity of the support portion 52 of the airbag 40, which is a location in the vicinity of the inner tube 100, increases.

Between the upper and lower end portions of the inner tube 100, the upper end portion, which extends to and is joined to the outer circumferential portion (rear upper end portion) of the airbag 40 via the circumferential edge joint portion 44, serves to increase rigidity of the support portion 52.

Particularly, as described in the fifth embodiment, in a case where the gas generator 30 is disposed at a location biased downward from the central portion of the inner tube 100 in the vertical direction, an effect of increasing the rigidity of the support portion 52 via the fixed portion 53 of the airbag 40 decreases as the upward distance of the support portion 52 from the fixed portion 53 becomes larger.

In contrast, between the upper and lower end portions of the inner tube 100, the upper end portion, which is an end portion apart from the gas generator 30, extends to the outer circumferential portion (rear upper end portion) of the airbag 40 and is joined to the outer circumferential portion (rear upper end portion) via the circumferential edge joint portion 44, and thus, rigidity of the support portion 52 increases. For this reason, a location of the support portion 52 of the airbag 40, which is spaced upward away from the gas generator 30, has a high rigidity.

As described in the fifth embodiment, in a case where an inner tube, which becomes slimmer from one end portion toward the other end portion of the inner tube, is used as the inner tube 100, when the inner tube 100 is inflated into a cylindrical shape by inflating gas, the slim end portion has rigidity lower than that of the thick end portion.

As described above, rigidity of the support portion 52 of the airbag 40, which is a location in the vicinity of the inner tube 100, is increased by the inner tube 100. An increase in the rigidity of the vicinity of the thick end portion of the inner tube 100 is large, and an increase in the rigidity of the vicinity of the slim end portion is small.

Accordingly, if the thick end portion of the inner tube 100 is joined to the outer circumferential portion of the airbag 40, rigidity of the support portion 52 is considerably changed in the vertical direction. Between the upper and lower end portions of the support portion 52, rigidity of an end portion, to which the thick end portion of the inner tube 100 is joined, increases, and rigidity of an opposite end portion decreases.

More specifically, between the upper and lower end portions of the support portion 52, rigidity of an end portion, to which the thick end portion of the inner tube 100 is joined, is increased primarily by the rigidity of the inner tube 100, and by joining the end portion to the inner tube 100. As a result, the rigidity of the end portion of the support portion 52 increases.

In contrast, between the upper and lower end portions of the support portion 52, rigidity of an end portion, to which the inner tube 100 is not joined, is increased primarily only by the rigidity of the inner tube 100. As a result, the rigidity of the end portion of the support portion 52 decreases. As such, rigidity of the support portion 52 is considerably changed in the vertical direction.

However, in the fifth embodiment, the slim end portion of the inner tube 100 is joined to the outer circumferential portion (rear upper end portion) of the airbag 40. For this reason, a change in the rigidity of the support portion 52 in the vertical direction is small.

More specifically, between the upper and lower end portions of the support portion 52, rigidity of an end portion, to which the slim end portion of the inner tube 100 is joined, is increased primarily by the rigidity of the inner tube 100, and by joining the end portion to the inner tube 100. In contrast, between the upper and lower end portions of the support portion 52, rigidity of an end portion, to which the inner tube 100 is not joined, is increased primarily by a rigidity of the inner tube 100. As such, a change in the rigidity of the support portion 52 in the vertical direction is small.

For this reason, the airbag 40 is unlikely to be bent at the support portion 52 having a high rigidity.

As a result, in the fifth embodiment, in addition to being capable of obtaining the same effect described in (1), the following effects can be obtained.

(6) The fixed portion 53 of the airbag 40 is attached to the bracket 35 together with the gas generator 30. The inner tube 100, which extends in the vertical direction in a state where the inner tube 100 surrounds at least the gas ejection portion of the gas generator 30 and a plurality portions, located at the vertical direction, of the inner tube 100 include the respective openings 108 and 107, is disposed inside the airbag 40. Rigidity of the support portion 52 is increased by extending the upper end portion of the inner tube 100 to the outer circumferential portion (rear upper end portion) of the airbag 40, and joining the upper end portion to the outer circumferential portion (rear upper end portion) (refer to FIGS. 12 and 13).

As a result, it is possible to prevent bending of the airbag 40 at the support portion 52 having a high rigidity, and to encounter the upper body of the occupant P1 via the airbag 40 by maintaining the state of a majority of the airbag 40 which has been deployed and inflated next to the upper body of the occupant P1.

(7) The gas generator 30 is disposed at a location biased downward from the central portion of the inner tube 100 in the vertical direction. Rigidity of the support portion 52 is increased by extending the upper end portion, which is an end portion apart from the gas generator 30 between the upper and lower end portions of the inner tube 100, to the outer circumferential portion (rear upper end portion) of the airbag 40, and joining the upper end portion to the outer circumferential portion (rear upper end portion) (refer to FIG. 12).

As a result, it is possible to increase rigidity of a location of the support portion 52 of the airbag 40 which is spaced upward away from the gas generator 30, and to prevent bending of the airbag 40 at that location.

(8) An inner tube, which becomes slimmer from the lower end portion toward the upper end portion of the inner tube, is used as the inner tube 100. Only the slim end portion (upper end portion) of the inner tube 100 is joined to the outer circumferential portion (rear upper end portion) of the airbag 40.

For this reason, it is possible to reduce a change in the rigidity of the support portion 52 in the vertical direction.

Sixth Embodiment

Hereinafter, a sixth embodiment of the far-side airbag apparatus for a car will be described with reference to FIGS. 22 to 23.

In the inner tube 100 adopted in the sixth embodiment, the upper end portion is spaced downward away from the outer circumferential portion (rear upper end portion) of the airbag 40. The upper end portion of the inner tube 100 is open without being joined to the outer circumferential portion (rear upper end portion) of the airbag 40. The upper end portion of the inner tube 100 forms the opening 108.

Upper and lower pair of bolt holes 37 pass through the attaching portion 36 of the bracket 35.

As fixing members for attaching the gas generator 30 to the attaching portion 36, a pair of the bolts 33a which extend rearward are fixed to the retainer 32 of the gas generator 30 at two locations which are positioned apart from each other in the vertical direction.

The inflator 31 of the gas generator 30 is disposed at a location biased downward from a central portion of the rear end portion of the airbag 40 in the vertical direction. Both of the bolts 33a are inserted into the bolt holes 106 of the inner tube 100 and the bolt holes 49 of the airbag 40, and the pair of bolt holes 37 of the attaching portion 36 from the front side. The airbag 40 is attached to the attaching portion 36 of the bracket 35 together with the inner tube 100 and the gas generator 30 by tightening the bolts 33a with the nuts 34. The attaching portion 36 serves to increase rigidity of the support portion 52 of the airbag 40 (refer to FIG. 13).

In the sixth embodiment, since the bracket 35 extends to the upper side of the upper and lower sides of the attaching portion 36, to which the inflator 31 is not biased, an additional attaching portion 38 can be formed on the upper side of the attaching portion 36. One bolt hole 39 passes through the additional attaching portion 38.

The retainer 32 of the gas generator 30 extends further upward than that in the fifth embodiment. One bolt 33b which extends rearward is provided in an extending portion (hereinafter, referred to as an "extension portion 32a") which is a fixing member for attaching the gas generator 30 to the additional attaching portion 38. Accordingly, the gas generator 30 includes the bolts 33a and 33b at three locations which are positioned apart from each other in the vertical direction.

A bolt hole (not illustrated) is formed on each of the folding line 102 of the inner tube 100 and the folding line 41 of the airbag 40, and the additional bolt 33b is inserted into the bolt holes.

The bolt 33b of the extension portion 32a, which has been inserted into the respective bolt holes of the inner tube 100 and the airbag 40, is inserted into the bolt hole 39 of the additional attaching portion 38 from the front side. The airbag 40 is also attached to the attaching portion 38 of the bracket 35 together with the inner tube 100 and the gas generator 30 by tightening the bolt 33b with a nut (not illustrated). The attaching portion 38 serves to increase rigidity of the support portion 52 of the airbag 40.

The rest of the configuration is the same as that in the fifth embodiment. For this reason, the same reference signs are assigned to the same elements described in the fifth embodiment, and duplicated description will be omitted.

In the aforementioned configuration of the sixth embodiment, when a side impact is applied to the side wall portion 12 due to side collision or the like, and inflating gas is ejected from the gas ejection portion of the gas generator 30, similar to the fifth embodiment, the airbag 40 is deployed and inflated diagonally forward and upward from the fixed portion 53 of the airbag 40 between the adjacent car seats 13 and 14.

The airbag 40 encounters the upper body of the occupant P1 who falls toward the side wall portion 12 to which impact is applied. At this time, a forward force is applied to the airbag 40. A portion of the fixed portion 53 of the rear end portion of the airbag 40 is attached to the attaching portion 36 of the bracket 35 together with the gas generator 30. In addition, a portion of the fixed portion 53 of the airbag 40 is attached to the additional attaching portion 38 provided on the upper side of the attaching portion 36. The attaching portion 36 and the additional attaching portion 38 serve to increase rigidity of the support portion 52 of the rear lower portion of the airbag 40.

For this reason, the airbag 40 is unlikely to be bent at the support portion 52 having a high rigidity. The state of a majority of the airbag 40, which has been deployed and inflated next to the upper body of the occupant P1, is maintained, and the airbag 40 encounters the upper body.

As described in the sixth embodiment, in a case where the inflator 31 is disposed at a location that is biased downward from the central portion of the rear end portion of the airbag 40 in the vertical direction, the attaching portion 36, to which the gas generator 30 has been attached, is disposed at a location of the rear end portion of the airbag 40 which is biased in the same direction as a direction in which the inflator 31 is biased. In a case where a portion of the fixed portion 53 of the airbag 40 is attached to the attaching portion 36 together with the gas generator 30, rigidity of a portion of the rear lower portion of the airbag 40 in the vicinity of the attaching portion 36 increases.

An effect of increasing the rigidity of the rear lower portion of the airbag 40 via the attaching portion 36 decreases as the vertical distance of the rear end portion from the attaching portion 36 becomes larger in the direction in which the inflator 31 is not biased.

The additional attaching portion 38 is provided on only the upper side of the upper and lower sides of the attaching portion 36, to which is the inflator 31 is not biased, and thus, the additional attaching portion 38 serves to increase rigidity of the support portion 52. In a case where a portion of the airbag 40 is attached to the additional attaching portion 38 by attaching the extension portion 32a to the additional attaching portion 38 by the bolt 33b and nut, rigidity at a location of the support portion 52 of the rear lower portion of the airbag 40 in the vicinity of the additional attaching portion 38 increases, and the airbag 40 is unlikely to be bent at that location.

A forward force is applied to the airbag 40 that encounters the upper body of the occupant P1 who falls toward the side wall portion 12 to which impact is applied. This force is transmitted to the attaching portion 36 and the additional attaching portion 38 via the gas generator 30 and the bolts 33*a* and 33*b*.

All of the bolts 33*a* and 33*b* extend rearward from the gas generator 30. An extension direction of the bolts 33*a* and 33*b* is opposite to a direction in which this force is applied (direction in which resistance against this force is applied). For this reason, a forward force applied to the airbag 40 is more firmly encountered by the attaching portion 36 and the additional attaching portion 38 in contrast to a case in which the gas generator 30 is attached to the side frame portion 18 with bolts which extend in another direction. As a result, rigidity of the rear lower portion of the airbag 40 increases effectively.

As a result, in the sixth embodiment, in addition to being capable of obtaining the same effect described in (1), the following effects can be obtained.

(9) The bracket 35 is provided with the attaching portion 36 to which the gas generator 30 is attached together with the fixed portion 53 of the airbag 40. The additional attaching portion 38 is provided on the upper side of the attaching portion 36 in the bracket 35, and a portion of the airbag 40 is attached to the additional attaching portion 38. Rigidity of the support portion 52 is increased by the attaching portion 36 and the additional attaching portion 38 (refer to FIG. 22).

As a result, it is possible to prevent bending of the airbag 40 at the support portion 52 having a high rigidity, and to encounter the upper body of the occupant P1 via the airbag by maintaining the state of a majority of the airbag which has been deployed and inflated next to the upper body of the occupant P1.

Figure 22:
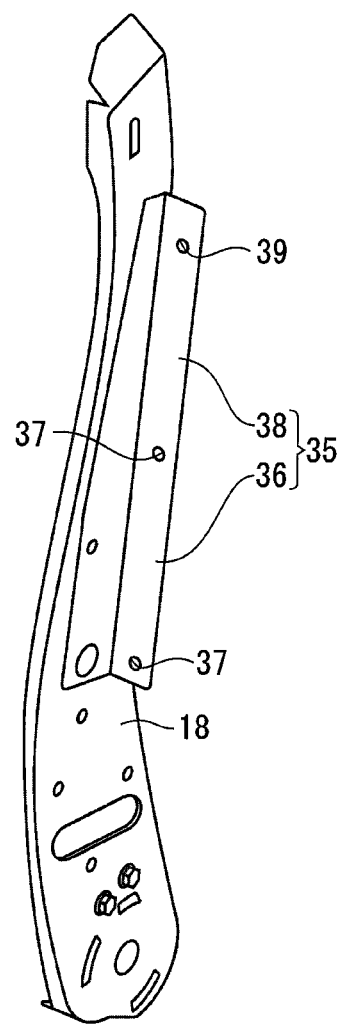
FIG. 22 is a view illustrating a sixth embodiment of a far-side airbag apparatus for a car, and is a perspective view of a side frame portion to which a bracket is attached.

(10) In the far-side airbag apparatus in which the gas generator 30 is attached to the attaching portion 36 while the inflator 31 is disposed at a location that is biased downward from the central portion of the rear end portion of the airbag 40 in the vertical direction, the additional attaching portion 38 is provided in only the upper side of the upper and lower sides of the attaching portion 36 to which the inflator 31 is not biased (refer to FIG. 22).

As a result, it is possible to equally increase the rigidity of the support portion 52 over the entire vertical length of the support portion 52, and to prevent bending of the support portion 52 of the airbag 40.

Figure 23:
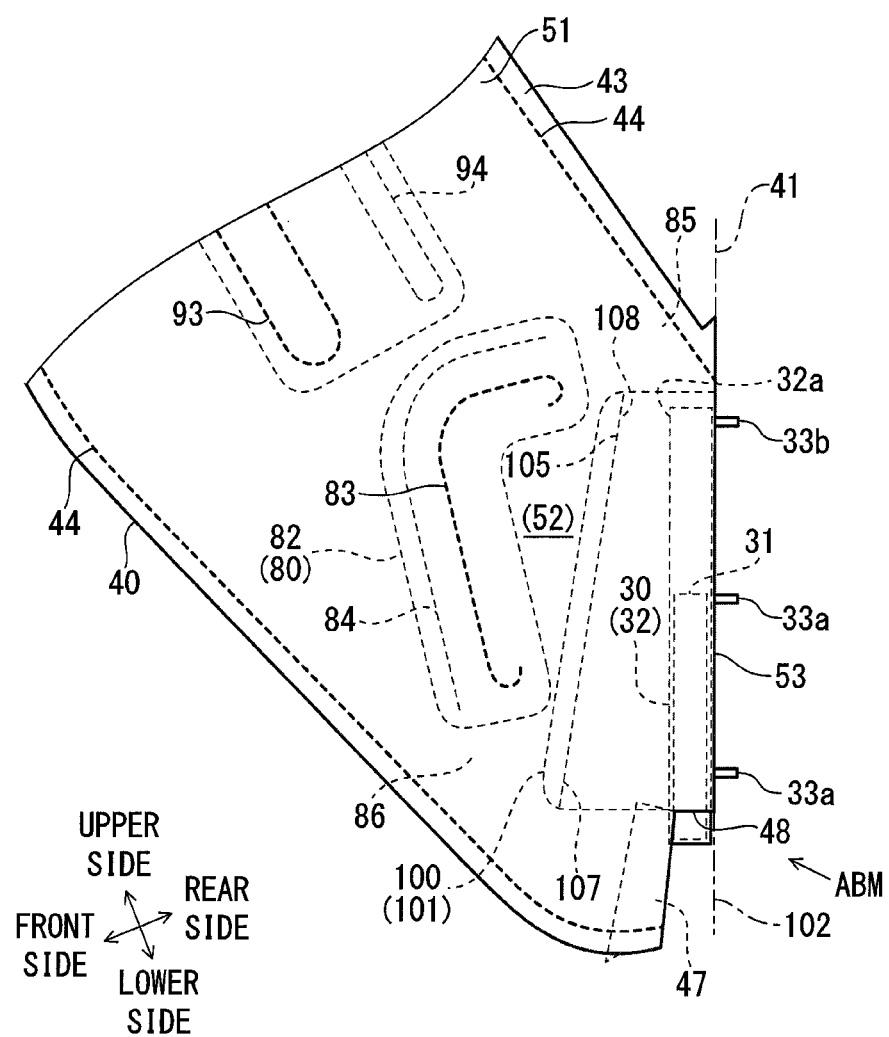
FIG. 23 is a partial side view of an airbag module in the sixth embodiment in which an airbag is not inflated, but is deployed.

(11) The gas generator 30 is attached to the attaching portion 36 and the additional attaching portion 38 with the bolts 33*a* and 33*b* which extend toward the rear side of the car 10 (refer to FIGS. 22 and 23).

As a result, the attaching portion 36 and the additional attaching portion 38 are capable of receiving a forward force applied to the airbag 40, and it is possible to effectively increase rigidity of the support portion 52 of the airbag 40.

Also, in the fifth embodiment in which the additional attaching portion 38 is not provided, it is possible to obtain effects which are not equal to those in the sixth embodiment, but are substantial.

Seventh Embodiment

Hereinafter, a seventh embodiment of a far-side airbag apparatus for a car will be described with reference to FIGS. 24 to 28.

The far-side airbag apparatus for a car in the seventh embodiment has a configuration which is a combination of the configurations of the fifth and sixth embodiments. For this reason, the same reference signs are assigned to the same elements as those in the fifth and sixth embodiments, and duplicated description will be suitably omitted.

Figure 24:
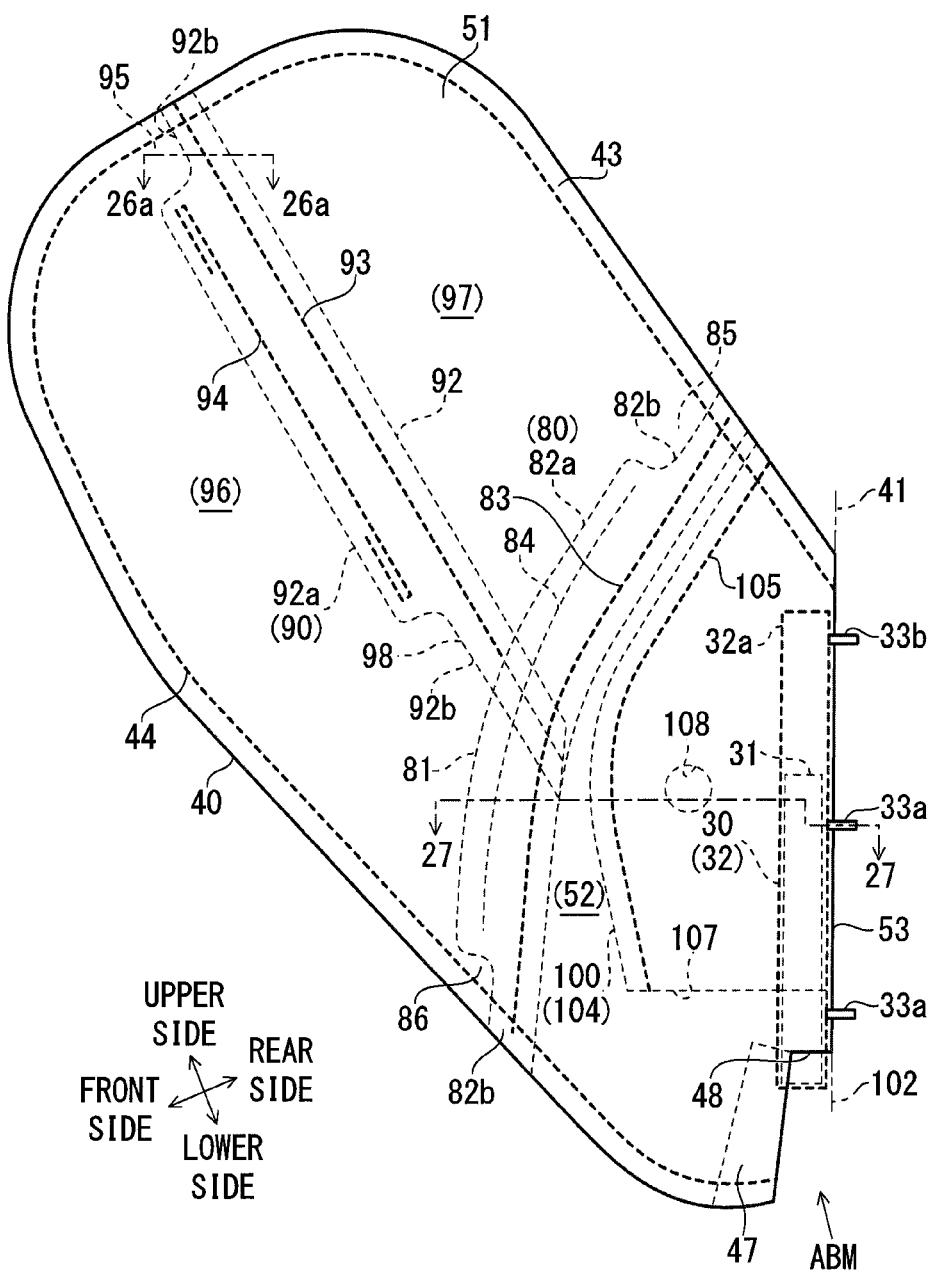
FIG. 24 is a view illustrating a seventh embodiment of a far-side airbag apparatus for a car, and is a side view of an airbag module in which an airbag is not inflated, but is deployed.
Figure 25:
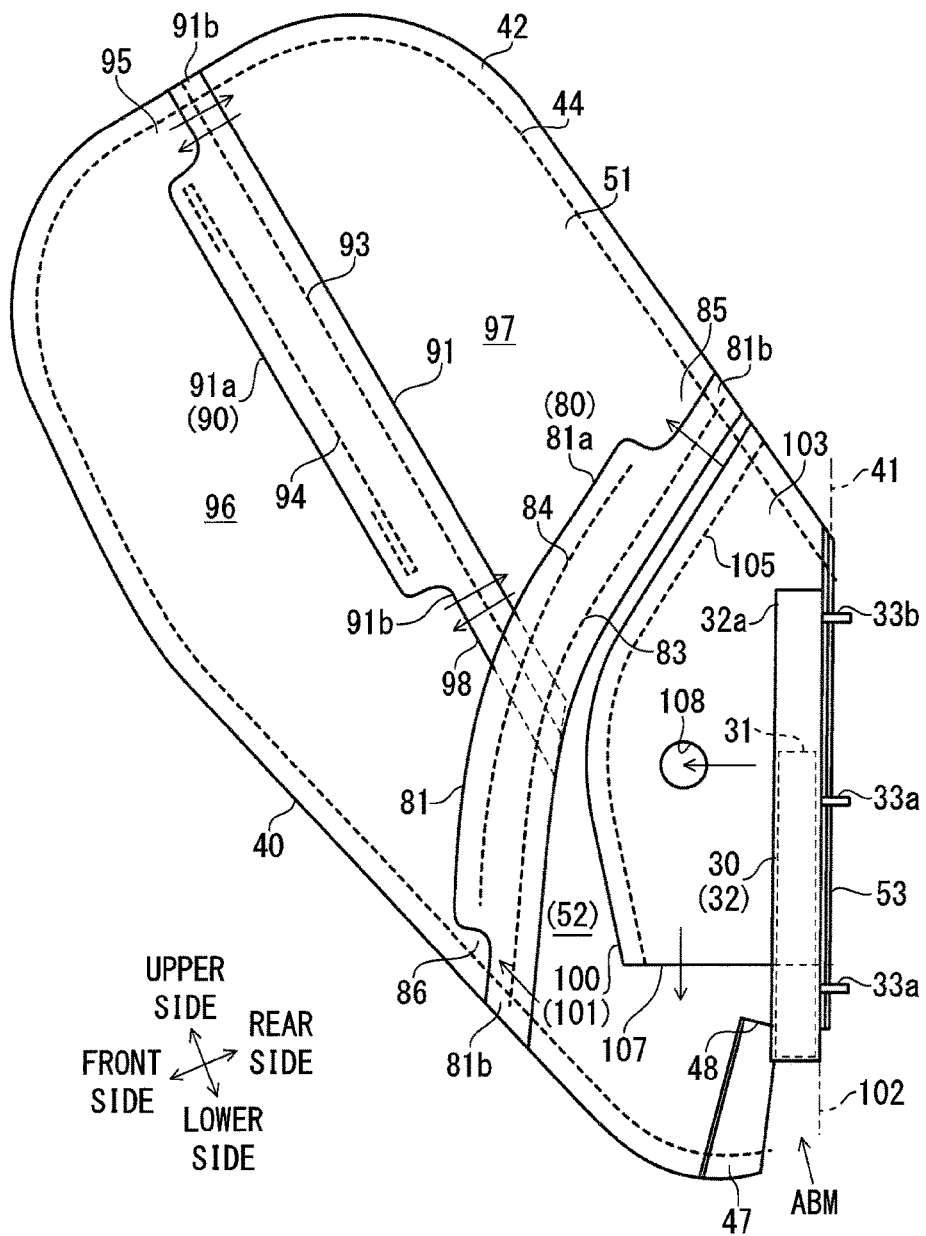
FIG. 25 is a side sectional view illustrating the internal structure of the airbag module illustrated in FIG. 24.
Figure 28:
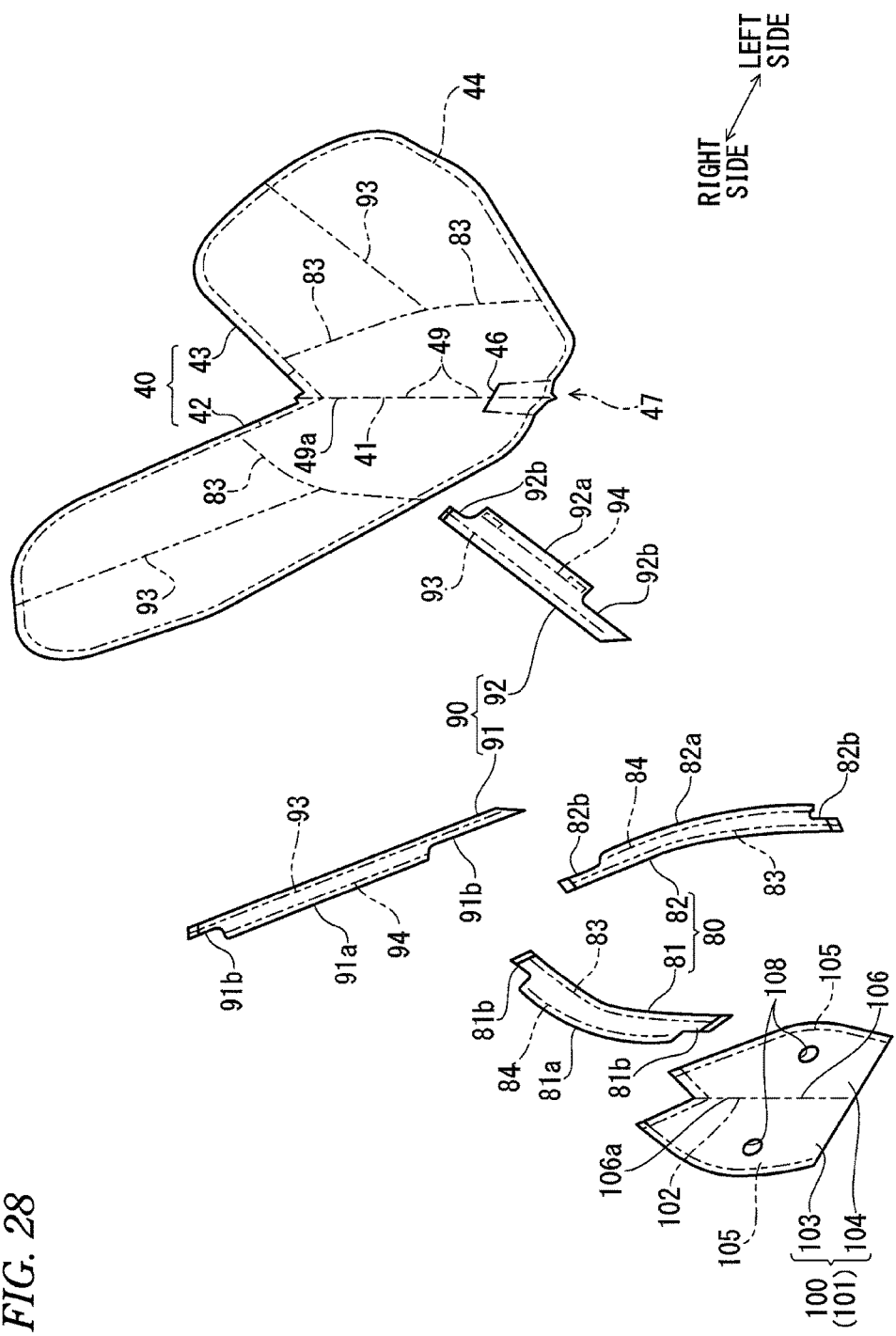
FIG. 28 is an exploded perspective view illustrating a state in which main configuration members of the far-side airbag apparatus are deployed, in the seventh embodiment.

FIG. 24 is a view corresponding to FIG. 10, and illustrates the airbag module ABM in which the airbag 40 is not inflated, but is deployed. FIG. 28 is a view corresponding to FIG. 17, and illustrates a state in which main configuration members of the airbag module ABM including the airbag 40 are deployed. FIG. 25 is a view corresponding to FIG. 12, and illustrates a state in which a central portion of the airbag 40 in FIG. 24 in the car width direction is cut to illustrate the internal structure of the airbag module ABM.

In FIGS. 24 and 25, for illustrative purposes, each portion of the airbag module ABM is illustrated in a state in which the gas generator 30 is postured to extend in the perpendicular direction.

As illustrated in FIGS. 24, 25, and 28, an airbag, which has the same shape and size as those in the fifth embodiment, is used as the airbag 40. The airbag 40 includes the occupant side fabric portion 42 and the non-occupant side fabric portion 43 which overlap each other in the car width direction, and are joined together via the circumferential edge joint portion 44. The insertion port 48 of the gas generator 30 and the bolt hole 49 (refer to FIG. 27) are formed in the airbag 40.

Figure 26A:
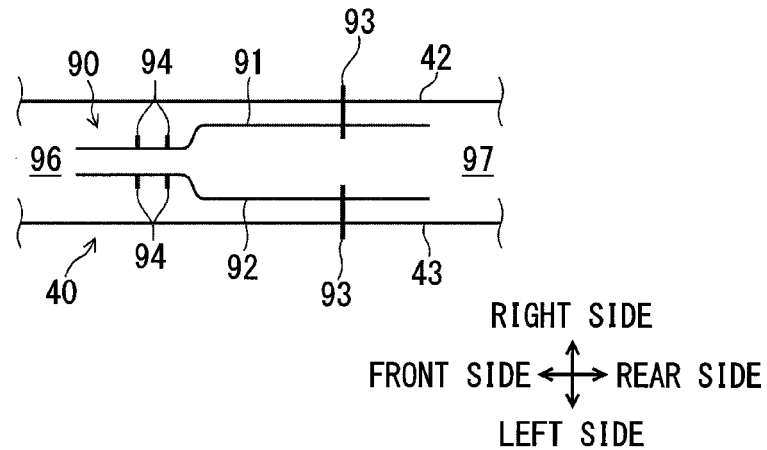
FIG. 26A is a sectional view taken along line 26a-26a in FIG. 24.
Figure 27:
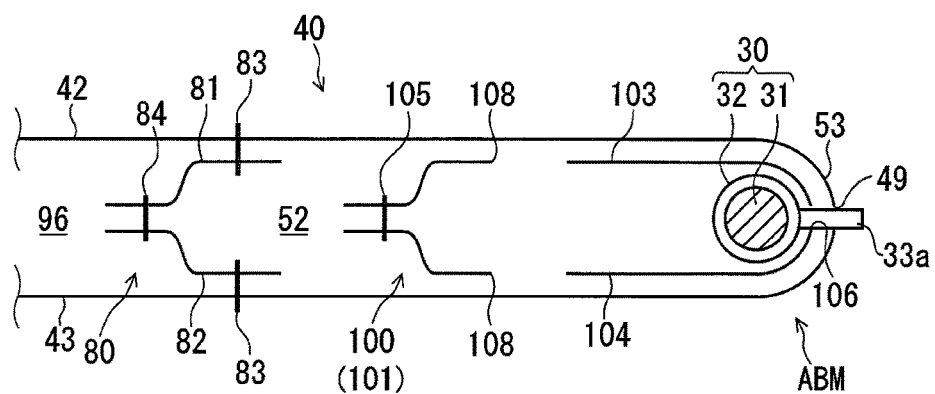
FIG. 27 is a sectional view taken along line 27-27 in FIG. 24.

The partition portions 80 and 90 are provided in the airbag 40 at two locations which are positioned apart from each other (refer to FIGS. 26A and 27). In this point, the seventh embodiment is the same as the fifth embodiment. The partition portions 80 and 90 used in the seventh embodiment have configurations different from those in the fifth embodiment.

The pair of fabric portions 81 and 82 of the partition portion 80 respectively include main body portions 81*a* and 82*a* which are respectively configured as main portions of the pair of fabric portions 81 and 82, and a pair of extension portions 81*b* and 82*b* for each of the main body portions 81*a* and 82*a*.

Each of the main body portions 81*a* and 82*a* is long and extends substantially in the vertical direction. The width of each of the main body portions 81*a* and 82*a* is the same at any location in a longitudinal direction thereof. Both upper and lower end portions of each of the main body portions 81*a* and 82*a* are positioned apart from the circumferential edge joint portion 44. A middle portion of each of the main body portions 81*a* and 82*a* in the vertical direction is not curved as much as the partition portion 80 in the fifth embodiment, but is gently curved such that the middle portion is bulged diagonally forward and upward.

Both extension portions 81*b* have widths narrower than that of the main body portion 81*a*. Both extension portions 81*b* extend from rear half portions at both ends of the main body portion 81*a* in the longitudinal direction such that both extension portions 81*b* are positioned away from the main body portion 81*a*. Both extension portions 82*b* have widths narrower than that of the main body portion 82*a*. Both extension portions 82*b* extend from rear half portions at both ends of the main body portion 82*a* in the longitudinal direction such that both extension portions 82*b* are positioned away from the main body portion 82*a*. As a result, the lengths of rear half portions of the fabric portions 81 and 82 are longer by the lengths of both extension portions 81*b* and 82*b* than those of front half portions of the fabric portions 81 and 82. In the seventh embodiment, the upper extension portions 81*b* and 82*b* extend to the outer circumferential portion (rear upper portion) of the airbag 40, and the lower extension portions 81*b* and 82*b* extend to the outer circumferential portion (rear lower portion) of the airbag 40.

The occupant side fabric portion 81 is joined to the occupant side fabric portion 42 adjacent thereto via the joint portion 83 (refer to FIG. 27). The occupant side joint portion 83 extends over the main body portion 81a and both the extension portions 81b along a rear edge portion of the fabric portion 81. Both upper and lower end portions of the occupant side joint portion 83 in the vertical direction respectively intersect a rear upper portion and a rear lower portion of the circumferential edge joint portion 44. Similarly, the non-occupant side fabric portion 82 is joined to the non-occupant side fabric portion 43 adjacent thereto via the joint portion 83 (refer to FIG. 27). The non-occupant side joint portion 83 extends over the main body portion 82a and both the extension portions 82b along a rear edge portion of the fabric portion 82. Both upper and lower end portions of the non-occupant side joint portion 83 in the vertical direction respectively intersect a rear upper portion and a rear lower portion of the circumferential edge joint portion 44.

Both the fabric portions 81 and 82 are joined together via the joint portion 84 that is provided at a location apart from both the joint portions 83. The joint portion 84 extends substantially in the vertical direction along front edge portions of both the main body portions 81a and 82a. Unlike the joint portions 83, the joint portion 84 is provided only in both the main body portions 81a and 82a, and is not provided in both the extension portions 81b and both the extension portions 82b.

In such a joint pattern, the partition portion 80 is provided across a gap between the occupant side fabric portion 42 and the non-occupant side fabric portion 43. When both the fabric portions 81 and 82 become rigid, the inflation thickness of the vicinity of the partition portion 80 in the airbag 40 in the car width direction is restricted.

A space, which is between upper end portions of the main body portions 81a and 82a and the rear upper portion of the circumferential edge joint portion 44 inside the airbag 40, forms the upper passage 85. Inflated portions in back of and in front of the main body portions 81a and 82b communicate with each other on the upper side of the partition portion 80 via the upper passage 85. A space, which is between lower end portions of the main body portions 81a and 82a and the rear lower portion of the circumferential edge joint portion 44 inside the airbag 40, forms the front passage 86. The inflated portions in back of and in front of the main body portions 81a and 82b communicate with each other on the lower side of the partition portion 80 via the front passage 86.

In contrast, the partition portion 90 has the same configuration as that of the partition portion 80. That is, the pair of fabric portions 91 and 92 of the partition portion 90 respectively include main body portions 91a and 92a partitioning the upper portion 51 into front and rear inflated portions 96 and 97, and a pair of extension portions 91b and 92b for each of the main body portions 91a and 92a. The partition portion 90 is provided a portion where the adjacent inflated portions 96 and 97 are divided to have an equal volume.

Each of the main body portions 91a and 92a is long and extends substantially in the vertical direction. The width of each of the main body portions 91a and 92a is the same at any location in a longitudinal direction thereof. The upper end portion of each of the main body portions 91a and 92a is positioned apart from a front upper end portion of the circumferential edge joint portion 44, and the lower end thereof is positioned apart from the partition portion 80. Unlike the main body portions 81a and 82a which are gently curved, each of the main body portions 91a and 92a is straight.

Both extension portions 91b have widths narrower than that of the main body portion 91a. Both extension portions 91b extend from rear half portions at both ends of the main body portion 91a in the longitudinal direction such that both extension portions 91b are positioned away from the main body portion 91a. Both extension portions 92b have widths narrower than that of the main body portion 92a. Both extension portions 92b extend from rear half portions at both ends of the main body portion 92a in the longitudinal direction such that both extension portions 92b are positioned away from the main body portion 92a. As a result, the lengths of rear half portions of the fabric portions 91 and 92 are longer by the lengths of both extension portions 91b and 92b than those of front half portions of the fabric portions 91 and 92. In the seventh embodiment, the upper extension portions 91b and 92b extend to the outer circumferential portion (front upper end portion) of the airbag 40, and the lower extension portions 91b and 92b extend to a middle portion of the partition portion 80 in the longitudinal direction.

The occupant side fabric portion 91 is joined to the occupant side fabric portion 42 adjacent thereto via the joint portion 93 (refer to FIG. 26A). The occupant side joint portion 93 extends over the main body portion 91a and both the extension portions 91b along a rear edge portion of the fabric portion 91. An upper end portion of the occupant side joint portion 93 intersect a front upper end portion of the circumferential edge joint portion 44. A lower end portion of the joint portion 93 intersects the occupant side joint portion 83. Similarly, the non-occupant side fabric portion 92 is joined to the non-occupant side fabric portion 43 adjacent thereto via the joint portion 93 (refer to FIG. 26A). The non-occupant side joint portion 93 extends over the main body portion 92a and both the extension portions 92b along a rear edge portion of the fabric portion 92. An upper end portion of the non-occupant side joint portion 93 intersect a front upper end portion of the circumferential edge joint portion 44. A lower end portion of the joint portion 93 intersects the non-occupant side joint portion 83.

Both the fabric portions 91 and 92 are joined together via the joint portion 94 that is provided at a location apart from both the joint portions 93. The joint portion 94 extends substantially in the vertical direction along front edge portions of both the main body portions 91a and 92a. The joint portion 94 is provided only in both the main body portions 91a and 92a, and is not provided in both the extension portions 91b and both the extension portions 92b.

In such a joint pattern, the partition portion 90 is provided across a gap between the occupant side fabric portion 42 and the non-occupant side fabric portion 43 (refer to FIG. 26A). When both the fabric portions 91 and 92 become rigid, the inflation thickness of the vicinity of the partition portion 90 in the airbag 40 in the car width direction is restricted (refer to FIG. 26B).

A space, which is between upper end portions of the main body portions 91a and 92a and the front upper end portion of the circumferential edge joint portion 44 inside the airbag 40, forms an upper communication path 95. The inflated portions 96 and 97 in front of and in back of the partition portion 90 communicate with each other on the upper side of the main body portions 91a and 92a via the upper communication path 95. A space, which is between lower end portions of the main body portions 91a and 92a and the partition portion 80 inside the airbag 40, forms a lower communication path 98. In other words, the lower communication path 98 is positioned at a location adjacent to a lower side in a lower end portion of the main body portions 91a and 92a. The inflated portions 96 and 97 in front of and in back of the partition portion 90 communicate with each other on the lower side of the main body portions 91a and 92a via the lower communication path 98.

The flow path area of each of the upper communication path 95 and the lower communication path 98 is set to such a size that when the deployment and inflation of the airbag 40 is complete, the inner pressures of the inflated portions 96 and 97 adjacent to each other via the partition portion 90 become equal.

Also, in the fifth and sixth embodiments, a portion equivalent to the upper communication path 95 is formed between the partition portion 90 and the front upper end portion of the airbag 40, and a portion equivalent to the lower communication path 98 is formed between the partition portion 90 and the partition portion 80. Description thereof are omitted.

The rear lower portion of the airbag 40, in other words, a portion in back of the partition portion 80 forms the support portion 52 that supports the upper portion 51 positioned higher than the rear lower portion. The inner tube 100 having the same basic structure as that described in the fifth embodiment is disposed inside the support portion 52. The inner tube 100 includes the fabric portion 103 positioned closed to the occupant, and the fabric portion 104 positioned apart from the occupant.

Front edge portions of both the fabric portions 103 and 104 have a shape corresponding to the partition portion 80, that is, the front edge portions are gently curved such that middle portions of both the fabric portions 103 and 104 in the vertical direction are bulged forward. Both the fabric portions 103 and 104 are joined together via the joint portion 105 that extends substantially in the vertical direction along the front edge portions thereof. An upper end portion of the joint portion 105 intersect a rear upper end portion of the circumferential edge joint portion 44. A lower end portion of both the fabric portions 103 and 104 are not joined together, and forms the opening 107.

The upper end portion of the inner tube 100 extends to the outer circumferential portion (rear upper end portion) of the airbag 40, and is joined (sewn together) to the outer circumferential portion (rear upper end portion) via the circumferential edge joint portion 44. Rigidity of the support portion 52 of the airbag 40 is increased via this joining (sewing together).

The opening 108, which is a circular hole, is formed in each of the fabric portions 103 and 104 at a location positioned higher than the opening 107. The inside and the outside of the inner tube 100 communicate with each other via the openings 107 and 108. A pair of the openings 108 are formed such that the sum of the opening areas of the openings 108 is smaller than the opening area of the lower opening 107 when the lower opening 107 is open. The bolt holes 106 for inserting the bolts 33a of the gas generator 30 are formed on the folding line 102 of the inner tube 100.

Bolt holes 106a and 49a, into which the additional bolt 33b is inserted, are respectively formed on the folding line 102 of the inner tube 100 and the folding line 41 of the airbag 40.

The inner tube 100 is joined to the airbag 40 via joining means (not illustrated) such as stitching, in a state where the bolt holes 106 and 106a are aligned with the bolt holes 49 and 49a of the airbag 40.

Similar to the sixth embodiment, the retainer 32 of the gas generator 30 includes the extension portion 32a in an upper portion thereof, and the bolts 33a and 33b at three locations which are positioned apart from each other in the vertical direction. In the gas generator 30, the inflator 31 is disposed lower than the extension portion 32a inside the retainer 32.

In a state where the gas generator 30 is postured to extend substantially in the vertical direction, the majority of the gas generator 30 apart from a lower portion thereof is inserted into the rear end portion of the airbag 40 and the cylindrical inner tube 100 substantially from the lower side via the insertion port 48. The bolts 33a are inserted into the bolt holes 106 and 49, and the bolt 33b is inserted into the bolt holes 106a and 49a such that the gas generator 30 is positioned and locked with respect to the inner tube 100 and the airbag 40.

The airbag module ABM including the gas generator 30 and the airbag 40 as main configuration members is brought into an accommodated form by folding the airbag 40.

Similar to the fifth embodiment, the airbag module ABM in an accommodated form is accommodated in the accommodation portion 22 (refer to FIG. 13). Similar to the sixth embodiment, in the bracket 35, as illustrated in FIG. 22, the additional attaching portion 38 is formed on the upper side of the attaching portion 36, and the bolt holes 37 and 39 pass through the bracket 35 at three locations which are positioned apart from each other in the vertical direction.

Both the bolts 33a, which have been inserted into the bolt holes 106 of the inner tube 100 and the bolt holes 49 of the airbag 40, are inserted into the bolt holes 37 of the attaching portion 36 from the front side. The bolt 33b, which has been inserted into the bolt hole 106a of the inner tube 100 and the bolt hole 49a of the airbag 40, is inserted into the bolt holes 39 of the additional attaching portion 38 from the front side.

As illustrated in FIG. 13, the airbag 40 is attached to the attaching portion 36 and the additional attaching portion 38 of the bracket 35 together with the inner tube 100 and the gas generator 30 by tightening the bolts 33a and 33b with the nuts 34.

Hereinafter, the operation of the seventh embodiment with the aforementioned configuration will be described.

In a case where an impact is applied to the side wall portion 12 due to side collision or the like, the impact sensor 71 detects the impact, and inflating gas is ejected from the gas ejection portion of the gas generator 30, a portion of the inflating gas flows outward in a radial direction of the inner tube 100 from both the openings 108. A portion of the inflating gas, which has flown downward along the wall surface of the inner tube 100, flows downward out of the opening 107. Since the opening 107 is larger than both the openings 108, the amount of inflating gas flowing into the lower side of the inner tube 100 is larger than that flowing into the front side of the inner tube 100.

A portion of inflating gas, which has flown from the inner tube 100 to the support portion 52, flows substantially upward through the upper passage 85. Another portion of inflating gas flows substantially forward through the front passage 86.

Inflating gas is supplied to each portion of the airbag 40 partitioned by the partition portions 80 and 90, and thus, pressure (inner pressure) increases, and the airbag 40 is inflated while the airbag 40 is unfolded (deployed). The tear-planned portion 24 of the seatback 17 is torn, and the airbag 40 bursts out of the side portion of the seatback 17 toward the front side of the car.

The airbag 40 is deployed and inflated diagonally forward and upward from the fixed portion 53 of the rear end portion of the airbag 40 between the adjacent car seats 13 and 14. As described above, since a larger amount of inflating gas than the amount of inflating gas supplied to the upper passage 85 is supplied to the front passage 86, forward deployment and inflation of the airbag 40 is more accelerated than upward deployment and inflation of the airbag 40. When the deployment and inflation of the airbag 40 is complete, the airbag 40 is positioned between the occupants P1 and P2 who respectively sit on both the car seats 13 and 14.

Figure 26B:
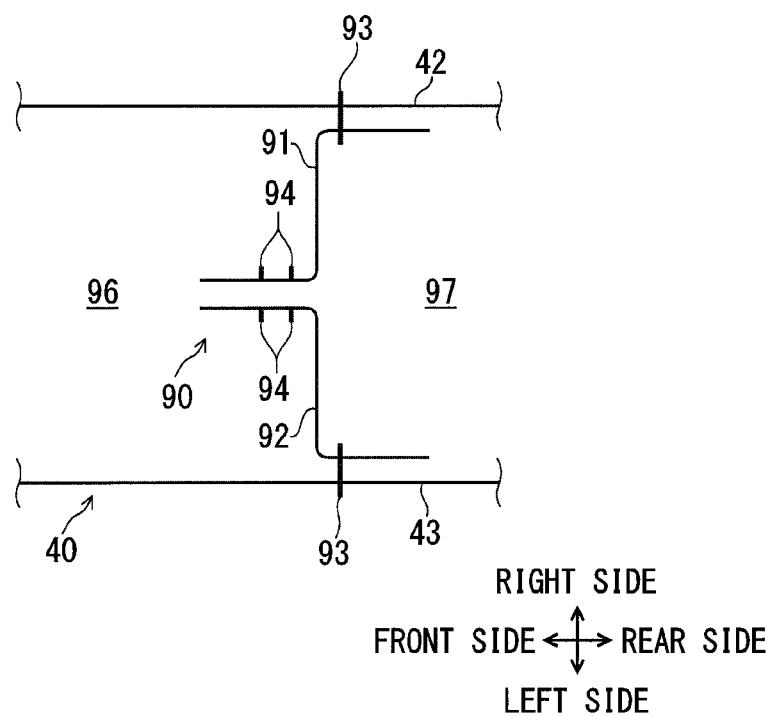
FIG. 26B is a sectional view illustrating a state in which the airbag is inflated from a state illustrated in FIG. 26A and a partition portion becomes rigid.

As illustrated in FIG. 26B, as the airbag 40 is being inflated, both the partition portions 80 and 90 are pulled toward both sides in the car width direction, and become rigid.

As illustrated in FIGS. 24 and 25, in the airbag 40, of which the upper portion 51 is partitioned into the front and rear inflated portions 96 and 97 by the partition portion 90, inflating gas from the upper passage 85 and the front passage 86 flows forward and upward inside the inflated portions 96 and 97. If an upper end portion of the main body portions 91a and 92a of the partition portion 90 is connected to the front upper end portion of the airbag 40, when the inflating gas, which flows forward and upward inside the inflated portions 96 and 97, reaches front end portions of the inflated portions 96 and 97, the flow direction is reversed. The reason for this is that the front end portions of the inflated portions 96 and 97 are blocked, and the inflating gas is not capable of flowing further forward and upward. The inflating gas, of which the direction has been changed, flows rearward and downward along the partition portion 90 inside the inflated portions 96 and 97, and then flows into the adjacent inflated portions 97 and 96. When the deployment and inflation of the airbag 40 is complete, a difference in inner pressure between the inflated portions 96 and 97 occurs. The inflated portions 97 and 96 having a low inner pressure may be pulled toward the inflated portions 96 and 97 having a high inner pressure, and the airbag 40 may vibrate, which is a problem.

In the seventh embodiment in which the upper communication path 95 is provided between the upper end portion of the main body portions 91a and 92a of the partition portion 90 and the front upper end portion of the airbag 40, the inflated portions 96 and 97 adjacent to each other via the partition portion 90 communicate with each other on the upper side of the main body portions 91a and 92a. For this reason, as illustrated by arrows in FIG. 25, inflating gas, which has reached the front end portions of the inflated portions 96 and 97, is capable of flowing into the adjacent inflated portions 97 and 96 by flowing through the upper communication path 95 without changing the flow direction to a rearward and downward direction. As a result, when the deployment and inflation of the airbag 40 is complete, a difference in inner pressure between the inflated portions 96 and 97 is unlikely to occur, and the airbag 40 is unlikely to vibrate.

In the seventh embodiment, the lower communication path 98 is provided between the lower end portion of the main body portions 91a and 92a of the partition portion 90 and the partition portion 80, and the inflated portions 96 and 97 adjacent to each other via the partition portion 90 communicate with each other on the lower side of the main body portions 91a and 92a. For this reason, as illustrated by arrows in FIG. 25, inflating gas of the inflated portions 96 and 97 is capable of flowing into the adjacent inflated portions 97 and 96 by flowing through the lower communication path 98. As a result, when the deployment and inflation of the airbag 40 is complete, a difference in inner pressure between the inflated portions 96 and 97 are more unlikely to occur, and the airbag 40 is more unlikely to vibrate.

As described above, inflating gas is capable of flowing between the inflated portions 96 and 97, which are adjacent to each other via the partition portion 90, via the upper communication path 95 and the lower communication path 98. The amount of inflating gas flowing through each of the upper communication path 95 and the lower communication path 98, or the inner pressure of each of the inflated portions 96 and 97 adjacent to each other via the partition portion 90 is determined by the flow path areas thereof.

In the seventh embodiment, the flow path area of each of the upper communication path 95 and the lower communication path 98 is set to such a size that when the deployment and inflation of the airbag 40 is complete, the inner pressures of both the inflated portions 96 and 97 become equal. For this reason, when the deployment and inflation of the airbag 40 is complete, the inner pressures of the inflated portions 96 and 97 are likely to become equal, and the airbag 40 is unlikely to vibrate.

In the seventh embodiment, the partition portion 90 is provided at a location at which the volumes of the inflated portions 96 and 97 become equal. As such, if the volumes of the inflated portions 96 and 97 are equal, when the deployment and inflation of the airbag 40 is complete, a difference in inner pressure between the inflated portions 96 and 97 are more unlikely to occur, and the airbag 40 is more unlikely to vibrate.

The airbag 40, which is unlikely to vibrate as described above, is reliably positioned between both the occupants P1 and P2. The airbag 40 encounters the upper body of the occupant P1 who falls toward the side wall portion 12 to which impact is applied. At this time, a forward force is applied to the airbag 40 as a component of a side force applied to the airbag 40.

As illustrated in FIGS. 25 and 13, the airbag 40 is attached to the attaching portion 36 of the bracket 35 together with the gas generator 30 via the fixed portion 53 of the rear end portion of the airbag 40. In addition, a portion of the airbag 40 is attached to the additional attaching portion 38 provided on the upper side of the attaching portion 36. The attaching portion 36 and the additional attaching portion 38 serve to increase rigidity of the support portion 52 of the rear lower portion of the airbag 40.

Since the inner tube 100 is inflated into a cylindrical shape by inflating gas, rigidity of the inner tube 100 increases. Accordingly, rigidity of the support portion 52 of the airbag 40, which is a location in the vicinity of the inner tube 100, increases.

Between the upper and lower end portions of the inner tube 100, the upper end portion, which extends to and is joined to the outer circumferential portion of the airbag 40 via the circumferential edge joint portion 44, serves to increase rigidity of the support portion 52.

For this reason, as described above, the airbag 40 is unlikely to be bent at the support portion 52 having a high rigidity. The majority of the airbag 40 is maintained in a state of being deployed and inflated next to the upper body of the occupant P1, and encounters the upper body of the occupant P1.

Also, in this case, since a majority portion of the airbag 40 is positioned next to the occupant P1, the airbag 40 encounters the occupant P1 who falls sideward due to impact, and impact applied to the occupant P1 is reduced.

As a result, in the seventh embodiment, in addition to being capable of obtaining the same effect described in (1), (6), (7) and (9) to (11), the following effects can be obtained.

(12) The upper communication path 95 is provided between the upper end portion of the main body portions 91a and 92a of the partition portion 90 and the front upper end portion of the airbag 40 such that the inflated portions 96 and 97 adjacent to each other via the partition portion 90 communicate with each other via the upper communication path 95. The lower communication path 98 is provided in the airbag 40 at a location adjacent to the lower side in the lower end portion of the main body portions 91a and 92a such that both the inflated portions 96 and 97 communicate with each other via the lower communication path 98 (refer to FIGS. 24 and 25).

For this reason, it is possible to reduce a difference in inner pressure between the adjacent inflated portions 96 and 97, and to prevent the vibration of the airbag 40 when the deployment and inflation of the airbag 40 is complete.

(13) The flow path area of each of the upper communication path 95 and the lower communication path 98 is set to such a size that when the deployment and inflation of the airbag 40 is complete, the inner pressures of the inflated portions 96 and 97. The partition portion 90 is provided at a location at which the volumes of the inflated portions 96 and 97 become equal. These equalize the inner pressures of both the inflated portions 96 and 97, and are effective in preventing the vibration of the airbag 40.

(14) The upper portion 51 of the airbag 40 is inflated at locations at which the thickness of the airbag 40 is restricted by the partition portion 90. The target locations include the upper communication path 95 and the lower communication path 98 in addition to including both the inflated portions 96 and 97. If the airbag 40 is inflated as described above, the partition portion 90 is pulled (refer to FIG. 26B). Due to the pressure of inflating gas, stress is applied to the joint portions 93 through which the fabric portions 91 and 92 are joined to the occupant side fabric portion 42 and the non-occupant side fabric portion 43. If the fabric portions 91 and 92 are formed of only the main body portions 91a and 92a which restrict the inflation thickness of the upper portion 51, and the joint portions 93 are provided in only the main body portions 91a and 92a, stress is likely to be concentrated in both end portions of the joint portions 93, and joining strength may be insufficient, which is a problem. It is necessary to take measures such as using a reinforcement fabric so as to compensate for the insufficiency of joining strength.

In the seventh embodiment, the extension portions 91b and 92b are provided in both end portions of the main body portions 91a and 92a in the longitudinal direction, and the extension portions 91b and 92b are respectively joined to the occupant side fabric portion 42 and the non-occupant side fabric portion 43 via the joint portions 93 (refer to FIGS. 24 and 25). For this reason, a portion of the fabric portions 91 and 92, which receives stress induced by the pressure of inflating gas, is increased by the addition of the extension portions 91b and 92b, and it is possible to reduce the concentration of stress. It is not necessary to provide a reinforcement member such as a reinforcement fabric, and to reduce the number of components and the cost.

(15) The extension portions 81b and 82b are provided in both end portions of the main body portions 81a and 82a in the longitudinal direction, and the extension portions 81b and 82b are respectively joined to the occupant side fabric portion 42 and the non-occupant side fabric portion 43 via the joint portions 83.

As such, since the partition portion 80 adopts the same configuration as that of the partition portion 90, the same effect as that in (14) can be obtained from the partition portion 80.

Modification examples of the embodiments which include the following changes can be realized.

Items Common to Embodiments

The airbag 40 may be fixed to a strength member other than the side frame portion 18 based on the condition that the strength member is a side portion of the car seat 13 which is close to the adjacent car seat 14 or a side portion of the car seat 14 which is close to the adjacent car seat 13.

The airbag 40 may be fixed to a member positioned in the vicinity of that side portion of the car seat 13 or 14, for example, may be fixed to the center console box 15.

As described in the embodiments, substantially the entire airbag 40 may be inflated, and in contrast, the airbag 40 may include a non-inflated portion to which inflating gas is not supplied.

A pulling member (strap) may be provided such that pulls the airbag 40 rearward by becoming rigid when the airbag 40 is deployed and inflated, and generating tensile force.

The far-side airbag apparatus can be applied to a car in which three or more car seats are provided side by side in the car width direction. In this case, the airbag is deployed and inflated between adjacent car seats according to a side impact applied to a side wall portion of the car.

A car to which the far-side airbag apparatus is applied is not limited to a private car, and the far-side airbag apparatus can be applied to various industrial cars.

The far-side airbag apparatus can be applied to vehicles such as airplanes and ships other than cars such that the far-side airbag apparatus installed protects an occupant, who sits on a vehicle seat, from impact induced by side collision or the like.

Items Common to First to Fourth Embodiments

The vertical position of each of the respective lower end portions 55d to 59d of the partition portions 55 to 59 may be changed. The change is desirably performed such that the angle of each of the straight lines 61 to 63 with respect to a horizontal line becomes 0° to 50°.

In a case where the angle is 0°, an upper portion of the airbag 40 positioned higher than the straight line 61, 62, or 63 is bent downward with respect to the straight line 61, 62, or 63.

In a case where the angle is greater than 0°, the upper portion of the airbag 40 positioned higher than the straight line 61, 62, or 63 is bent rearward with respect to the straight line 61, 62, or 63.

In a case where the angle is within the range (0° to 50°), a vertical length required to partition the airbag 40 can be also ensured in one of the partition portions 55 to 59, the lower end portion of which is positioned at the highest location.

Similar to the fifth embodiment, an airbag, in which the respective circumferential edge portions of the occupant side fabric portion 42 and the non-occupant side fabric portion 43 are joined together via the circumferential edge joint portion 44, may be used as the airbag 40. In this case, the partition portions 55 to 59 may be formed by joining together the occupant side fabric portion 42 and the non-occupant side fabric portion 43 via means such as stitching while being in contact with each other.

Five or more partition portions may be provided in the upper portion 51 of the airbag 40.

Item Related to Fourth Embodiment

The vertical position of at least one of the lower end portions 55d, 56d, 58d, and 59d may be changed based on the condition that the respective lower end portions 55d and 58d of the partition portions 55 and 58 in the front region 51f are positioned at locations lower than the respective lower end portions 56d and 59d of the partition portions 56 and 59 in the rear region 51r.

For example, in the front region 51f, the vertical position of the lower end portion 58d of the partition portion 58 may be changed to a location lower than the lower end portion 55d of the partition portion 55.

In the rear region 51r, the vertical position of the lower end portion 59d of the partition portion 59 may be changed to a location lower than the lower end portion 56d of the partition portion 56.

Items Common to Fifth to Seventh Embodiments

The opening 107 may be provided at a location different from that in the fifth to seventh embodiments, based on the condition that the opening 107 is positioned lower than the openings 108. The openings 107 may be provided at one location or multiple locations positioned higher than the lower end portion of the inner tube 100.

Similarly, the openings 108 may be provided at locations different from those in the fifth to seventh embodiments, based on the condition that the openings 108 are positioned higher than the opening 107. In this case, the opening 108 may be provided at one location or the openings 108 may be provided at multiple locations.

In a case where the openings 107 (108) are provided at multiple locations, the openings 107 (108) may be provided at the same height locations, or may be provided at different height locations. The sizes and shapes of the openings 107 (108) may be the same or may be different from each other.

The inner tube 100 may extend in the vertical direction in a state where the inner tube 100 surrounds the entirety (apart from the bolts 33a) of the gas generator 30 including the gas ejection portion.

Items Common to Fifth and Seventh Embodiments

In contrast to the fifth and seventh embodiments, rigidity of the support portion 52 may be increased by extending the lower end portion of the inner tube 100 to a lower outer circumferential portion (rear lower end portion) of the airbag 40, and joining the lower end portion to the outer circumferential portion (rear lower end portion).

The upper end portion of the inner tube 100 may extend to an upper outer circumferential portion (rear upper end portion) of the airbag 40 and be joined to the outer circumferential portion (rear upper end portion). In addition, the lower end portion of the inner tube 100 may extend to the lower outer circumferential portion (rear lower end portion) of the airbag 40 and be joined to the outer circumferential portion (rear lower end portion). In this case, it is possible to further increase rigidity of the support portion 52.

In contrast to the fifth and seventh embodiments, the gas generator 30 (inflator 31) may be disposed at a location that is biased upward from the central portion of the inner tube 100 (rear end portion of the airbag 40) in the vertical direction.

In this case, rigidity of the support portion 52 may be increased by extending the lower end portion, which is an end portion positioned away from the gas generator 30 (inflator 31) between the upper and lower end portions of the inner tube 100, to the lower outer circumferential portion (rear lower end portion) of the airbag 40 and joining the lower end portion to the outer circumferential portion (rear lower end portion).

Items Related to Fifth Embodiment

As described above, the inner tube 100 may be folded in half such that the folding line 102 is positioned in the front end portion of the inner tube 100. In this case, the opening 108 may be formed by forming a hole in the upper end portion of the inner tube 100.

An inner tube, which becomes slimmer from the upper end portion toward the lower end portion of the inner tube, may be used as the inner tube 100. In this case, only the lower end portion which is a slim end portion of the inner tube 100 is desirably joined to the lower outer circumferential portion (rear lower end portion) of the airbag 40. Similar to the fifth embodiment, this is to decrease a change in the rigidity of the support portion 52 in the vertical direction.

Items Common to Sixth and Seventh Embodiments

In contrast to the sixth and seventh embodiment, the additional attaching portion 38 may be provided on the lower side of the attaching portion 36 in the bracket 35.

The additional attaching portions 38 may be provided on both the upper side and the lower side of the attaching portion 36 in the bracket 35.

In contrast to the sixth and seventh embodiment, the inflator 31 of the gas generator 30 may be attached to the attaching portion 36 while being disposed at a location that is biased upward from the central portion of the rear end portion of the airbag 40 in the vertical direction.

In this case, the additional attaching portion 38 is desirably provided on only one side of the upper and lower sides of the attaching portion 36 to which the inflator 31 is not biased as the lower side.

The airbag 40 may be attached to the additional attaching portion 38 with a fixing member other than the bolt 33b of the gas generator 30.

Items Related to Seventh Embodiment

Figure 29:
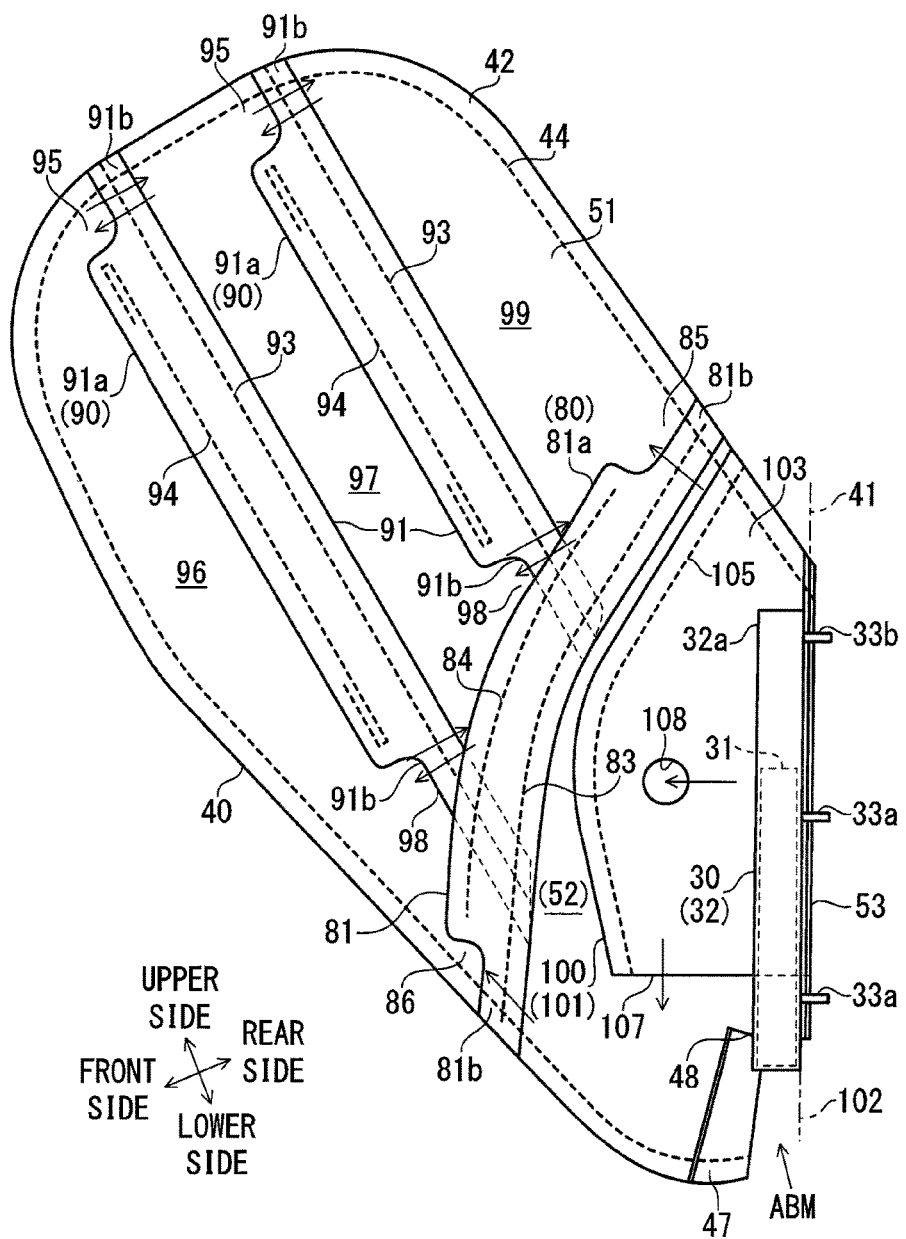
FIG. 29 is a view illustrating a modification example of the seventh embodiment, and is a side sectional view corresponding to FIG. 25.

Multiple partition portions 90 may be provided in the upper portion 51 of the airbag 40. FIG. 29 illustrates an example in which two partition portions 90 are provided.

In this case, the upper portion 51 is partitioned into three inflated portions 96, 97, and 99. The partition portions 90 are preferably disposed at locations at which the volumes of the adjacent inflated portions 96 and 97 or the volumes of the adjacent inflated portions 97 and 99 become equal. The flow path area of each of the upper communication path 95 and the lower communication path 98 for each of the partition portions 90 is preferably set to such a size that when the deployment and inflation of the airbag 40 is complete, the inner pressures of the inflated portions 96 and 97 adjacent to each other via the partition portion 90 or the inner pressures of the inflated portions 97 and 99 adjacent to each other via the partition portion 90 become equal. In any case, it is possible to reduce a difference in inner pressure between the adjacent inflated portions 96 and 97 or between the adjacent inflated portions 97 and 99, and it is possible to prevent the vibration of the airbag 40.

One of "the extension of the upper end portion of the inner tube 100 to the outer circumferential portion (rear upper end portion) of the airbag 40, and the joining of the upper end portion to the outer circumferential portion" and "the use of the bracket 35 including the attaching portion 36 and the addition attaching portion 38" may be omitted. Also, in this case, it is possible to increase rigidity of the support portion 52.

The extension portions 81b and 82b of the partition portions 80 may be omitted. In the same manner, the extension portions 91b and 92b of the partition portions 90 may be omitted. Even in the latter situation, the same effect described in (12) and (13) can be obtained.

Similar to the fifth embodiment, an inner tube, which becomes slimmer from the upper end portion toward the lower end portion of the inner tube, may be used as the inner tube 100. In this case, only the lower end portion which is a slim end portion of the inner tube 100 may be joined to the lower outer circumferential portion of the airbag 40.

What is claimed is:

1. A far-side airbag apparatus comprising:
an airbag which is fixed via a fixed portion set in a rear end portion of the airbag, and protects an upper body of an occupant, who sits on a vehicle seat positioned apart from a side wall portion of a vehicle in which multiple vehicle seats are provided side by side in a width direction, by deploying and inflating the airbag diagonally forward and upward from the fixed portion between adjacent vehicle seats via inflating gas which is supplied from a gas generator according to a side impact applied to the side wall portion of the vehicle, wherein:
a rear lower portion of the airbag is formed as a support portion that has a high rigidity and supports an upper portion positioned higher than the rear lower portion of the airbag;
an inner tube is disposed inside the airbag, extending in a vertical direction in a state where the inner tube surrounds at least a gas ejection portion of the gas generator;
openings are formed with the inner tube in a plurality of portions located at the vertical direction;
the gas generator is disposed at a location that is biased upward or downward from a central portion of the inner tube in the vertical direction;
the rigidity of the support portion is further increased by extending an end portion of the inner tube, positioned apart from the gas generator, which is one of an upper end portion and a lower end portion of the inner tube, to an outer circumferential portion of the airbag, and joining the end portion positioned apart from the gas generator to the outer circumferential portion; and
one of the upper end portion and the lower end portion toward the other end portion of the inner tube is slimmer than the other in the vertical direction, and a slim end portion is joined to the outer circumferential portion of the airbag;
the inner tube further includes a pair of fabric portions and a joint portion;
the joint portion extends in a vertical direction along a front edge of each of the pair of fabric portions, and joins front edges of the pair of fabric portions together; and
an inflator is disposed such that the inflator projects downward further than a lower end of the joint portion.

2. The far-side airbag apparatus according to claim 1, wherein:
as thickness restriction portions which restrict the inflation thickness of the airbag, multiple partition portions are provided in the upper portion of the airbag, extend in a vertical direction, and partition the upper portion into multiple regions in a forward and rearward direction;
the multiple partition portions are provided in each of a front region and a rear region which are respectively positioned in front of and in back of a central portion of the upper portion in the forward and rearward direction;
a lower end portion of the partition portion in the front region is positioned at the same height as that of a lower end portion of the partition portion in the rear region, or at a location lower than the lower end portion; and
rigidity of the support portion is increased by not providing a partition portion in the support portion.

3. The far-side airbag apparatus according to claim 1, wherein:
as thickness restriction portions which restrict the inflation thickness of the airbag, multiple partition portions are provided in the upper portion of the airbag at three locations which are positioned apart from each other in a forward and rearward direction, extend in a vertical direction, and partition the upper portion into multiple regions in the forward and rearward direction;
a lower end portion of a partition portion at a foremost position is positioned at the same height as that of a lower end portion of a partition portion at a rearmost position, or at a location lower than the lower end portion;
a lower end portion of a partition portion, which is positioned in a middle portion in the forward and rearward direction, is positioned on a straight line which connects the lower end portion of the partition portion at the foremost position to the lower end portion of the partition portion at the rearmost position, or is positioned higher than the straight line; and
rigidity of the support portion is increased by not providing a partition portion in the support portion.

4. The far-side airbag apparatus according to claim 2, wherein
tensile force is generated due to the airbag becoming rigid when being deployed and inflated, and a pulling member which pulls the airbag rearward is not provided.

5. The far-side airbag apparatus according to claim 2, wherein:
the airbag includes a pair of fabric portion which are disposed in the vehicle width direction; and
the partition portions are formed integrally with both of the fabric portions, and both of the fabric portions are joined together while being in contact with each other.

6. The far-side airbag apparatus according to claim 1, wherein:
the fixed portion of the airbag is attached to the vehicle together with the gas generator.

7. The far-side airbag apparatus according to claim 1, wherein:

the vehicle is provided with an attaching portion to which the gas generator is attached together with the fixed portion of the airbag;

an additional attaching portion is provided on at least one of an upper side and a lower side of the attaching portion, and a portion of the airbag is attached to the additional attaching portion; and rigidity of the support portion is increased by the attaching portion and the additional attaching portion.

8. The far-side airbag apparatus according to claim 7, wherein:

the gas generator includes an inflator that ejects inflating gas;

the gas generator is attached to the attaching portion in a state where the inflator is biased toward one of an upper side and a lower side from a central portion of a rear end portion of the airbag in the vertical direction; and the additional attaching portion is provided on only one side of an upper side and a lower side of the attaching portion to which the inflator is not biased.

9. The far-side airbag apparatus according to claim 7, wherein:

the gas generator is attached to the attaching portion and the additional attaching portion with a fixing member that extends toward a rear side of the vehicle.

10. The far-side airbag apparatus according to claim 6, wherein:

one or multiple partition portions are provided in the upper portion of the airbag;

the multiple partition portions include a main body portion being extend in the vertical direction and partitioning the upper portion into front and rear inflated portions; and an upper communication path is provided between an upper end portion of the main body portion and a front upper end portion of the airbag such that the inflated portions adjacent to each other via the partition portion communicate with each other via the upper communication path.

11. The far-side airbag apparatus according to claim 10, wherein a lower communication path is provided in the airbag at a location adjacent to a lower side in a lower end portion of the main body portion such that the inflated portions adjacent to each other via the partition portion communicate with each other via the lower communication path.

12. The far-side airbag apparatus according to claim 11, wherein the flow path area of each of the upper communication path and the lower communication path is set to such a size that when the deployment and inflation of the airbag is complete, the inner pressures of the inflated portions adjacent to each other via the partition portion become equal.

13. The far-side airbag apparatus according to claim 10, wherein the partition portion is provided at a location at which the volumes of the inflated portions adjacent to each other via the partition portion become equal.

14. The far-side airbag apparatus according to claim 1, wherein:

the airbag is folded into an accommodated form in which the size of the airbag is smaller than that in a non-inflated but deployed state in which the airbag is deployed flat without being filled with inflating gas, and the folded airbag is accommodated in a lower portion of a side portion of a seatback of a vehicle seat which is close to an adjacent vehicle seat, and is fixed to the seatback via the fixed portion; and when the airbag is deployed and inflated, the support portion is disposed such that if an occupant were sitting on the vehicle seat, the support portion would be next to the occupants waist, and an upper end of the airbag is disposed such that if the occupant were sitting on the vehicle seat, the upper end of the airbag would be at a location higher than a head portion of the occupant.

* * * * *